US008271251B2

(12) United States Patent
Schwartz et al.

(10) Patent No.: US 8,271,251 B2
(45) Date of Patent: Sep. 18, 2012

(54) AUTOMATED IMAGING SYSTEM FOR SINGLE MOLECULES

(75) Inventors: David Charles Schwartz, Madison, WI (US); Rodney Runnheim, Madison, WI (US); Daniel Forrest, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1591 days.

(21) Appl. No.: 11/052,836

(22) Filed: Feb. 9, 2005

(65) Prior Publication Data

US 2005/0234656 A1    Oct. 20, 2005

Related U.S. Application Data

(60) Provisional application No. 60/542,469, filed on Feb. 9, 2004.

(51) Int. Cl.
G06G 7/58    (2006.01)
G06G 7/48    (2006.01)
(52) U.S. Cl. .............................................. 703/12; 703/6
(58) Field of Classification Search .................. None
See application file for complete search history.

(56) References Cited

U.S. PATENT DOCUMENTS

| 5,133,022 A | * | 7/1992 | Weideman | ..................... 382/172 |
| 5,796,861 A | * | 8/1998 | Vogt et al. | ..................... 382/128 |
| 6,294,136 B1 | | 9/2001 | Schwartz | |

OTHER PUBLICATIONS

Jing et al., Automated High Resolution Optical Mapping Using Arrayed, Fluid-fixed DNA Molecules, PNAS, 1998, 85, 8046-8051.*
Zhang et al. Automated Data Collection with a Tecnai 12 Electron Microscope: Applications for Molecular Imaging by Cryomicroscopy, J. Struct. Biol. 2001, 135, 251-261.*
Ott, Acquisition of High-Resolution Digital Images in Video Microscopy: Automated Image Mosaicking on a Desktop Microcomputer, Microscopy Research and Technique, 1997, 38, 335-339.*
Burt et al., (ACM Transactions on Graphics, 1983, 2(4), 217-236).*
Grades, (Doctoral Dissertation, 1999, Fachbereich Geosciences, Johannes Gutenberg University, Landau, Germany, 1-150).*
Larkin et al. (Optics Communications, 1997, 139, 99-106).*
Sugiyama et al. (MVA, IAPR Workshop on Machine Vision Applications, Dec. 13-15, 1994, 127-130).*
Jaroslav Kaustky et al., "A new wavelet-based measure of image focus", Pattern Recognition Letters, 2002, pp. 1785-1794, vol. 23.
Eric Krotkov et al., "Focusing", International Journal of Computer Vision, 1987, pp. 223-237, vol. 1.

(Continued)

Primary Examiner — Larry D Riggs, II
(74) Attorney, Agent, or Firm — Quarles & Brady LLP

(57) ABSTRACT

There is provided a high throughput automated single molecule image collection and processing system that requires minimal initial user input. The unique features embodied in the present disclosure allow automated collection and initial processing of optical images of single molecules and their assemblies. Correct focus may be automatically maintained while images are collected. Uneven illumination in fluorescence microscopy is accounted for, and an overall robust imaging operation is provided yielding individual images prepared for further processing in external systems. Embodiments described herein are useful in studies of any macromolecules such as DNA, RNA, peptides and proteins. The automated image collection and processing system and method of same may be implemented and deployed over a computer network, and may be ergonomically optimized to facilitate user interaction.

9 Claims, 6 Drawing Sheets

OTHER PUBLICATIONS

N. Ng. Kuang Chern, et al., Proceedings of the 2001 IEEE International Conference on Robotics and Automation, Seoul, Korea, May 21-26, 2001.
Lai et al., Nature Genetics, 23:309-313, 1999.
Zhu et al., Science 293(5537): 2101-05, 2001.
Cluster W (http:/www.ebi.ac.uk/clustalw/index.html).
Fragment Assembler (http://bio.ifomfirc.it/ASSEMBLY/assemble.html.).
The International Ergonomics Association (http://www.iea.cc/).
(http://www.fftw.org/).

* cited by examiner

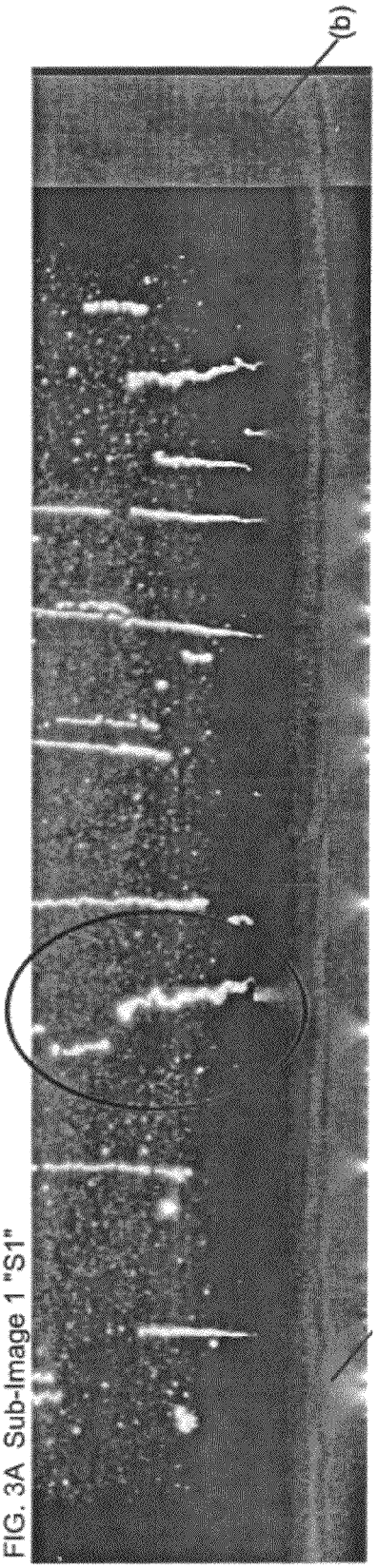
FIG. 3A Sub-Image 1 "S1"

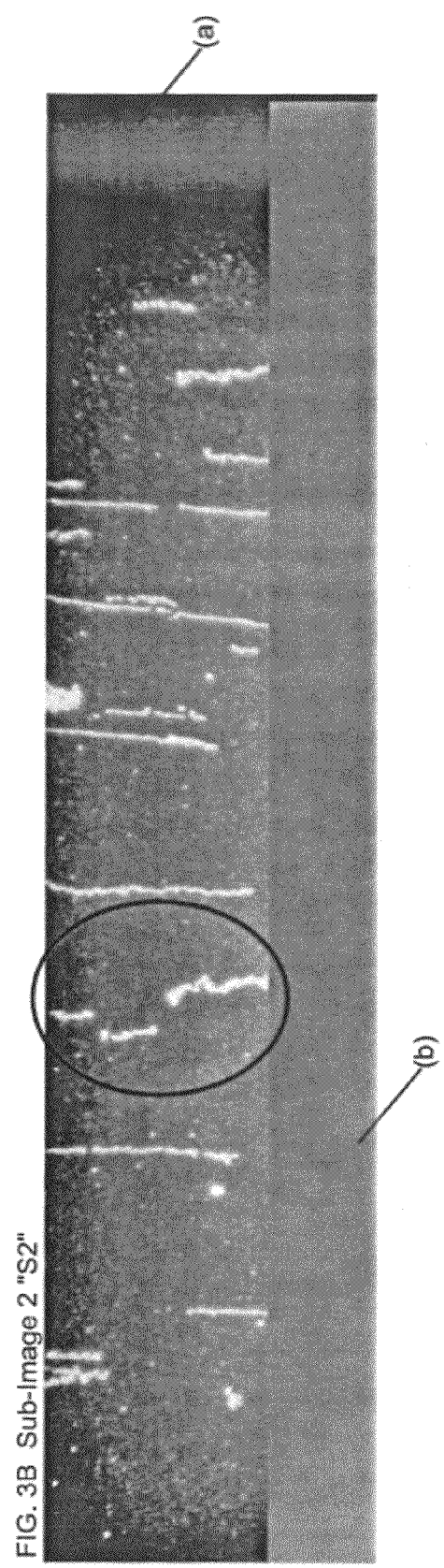
FIG. 3B Sub-Image 2 "S2"

AUTOMATED IMAGING SYSTEM FOR SINGLE MOLECULES

CROSS-REFERENCE TO RELATED APPLICATIONS

This application claims the benefit of U.S. Provisional Application Ser. No. 60/542,469 filed Feb. 9, 2004, incorporated herein by reference as if set forth in its entirety. This application also relates to U.S. patent application Ser. No. 10/777,850 filed Feb. 13, 2004; U.S. patent application Ser. No. 10/888,517 filed Jul. 12, 2004; and U.S. patent application Ser. No. 10/888,516 filed Jul. 12, 2004, each of which is incorporated herein by reference as if set forth in its entirety.

STATEMENT REGARDING FEDERALLY SPONSORED RESEARCH OR DEVELOPMENT

The work described in this disclosure was conducted with United States Government support, grant number DE-FG02-99ER62830, awarded by the Department of Energy. The United States Government has certain rights in the invention(s) of this disclosure.

BACKGROUND OF THE DISCLOSURE

1. Field of the Disclosure

The present disclosure relates to a high throughput automated single molecule image collection and processing system that requires minimal or limited initial user input. Optical images of single molecules and fragments elongated and fixed within microfluidic channels can be automatically collected, maintaining correct focus, and the images prepared for further data processing. A computer-based analysis can be performed on each image thereby obviating the problem of uneven illumination in fluorescence microscopy, and providing an overall robust imaging operation. Embodiments described herein are thus useful in studies of any macromolecules such as DNA, RNA and proteins.

2. Description of the Related Art

Modern biology, particularly molecular biology, has focused itself in large part on understanding the structure, function, and interactions of essential macromolecules in living organisms such as nucleic acids and proteins. For decades, researchers have developed effective techniques, experimental protocols, and in vitro, in vivo, or in situ models to study these molecules. Knowledge has been accumulating relating to the physical and chemical traits of proteins and nucleic acids, their primary, secondary, and tertiary structures, their roles in various biochemical reactions or metabolic and regulatory pathways, the antagonistic or synergistic interactions among them, and the on and off controls as well as up and down regulations placed upon them in the intercellular environment. The advance in new technologies and the emergence of interdisciplinary sciences in recent years offer new approaches and additional tools for researchers to uncover unknowns in the mechanisms of nucleic acid and protein functions.

The evolving fields of genomics and proteomics are only two examples of such new fields that provide insight into the studies of biomolecules such as DNA, RNA and protein. New technology platforms such as DNA microarrays and protein chips and new modeling paradigms such as computer simulations also promise to be effective in elucidating protein, DNA and RNA characteristics and functions. Single molecule optical mapping is another such effective approach for close and direct analysis of single molecules. See, U.S. Pat. No. 6,294,136, the disclosure of which is fully incorporated herein by reference. The data generated from these studies—e.g., by manipulating and observing single molecules—constitutes single molecule data. The single molecule data thus comprise, among other things, single molecule images, physical characteristics such as the length, shape and sequence, and restriction maps of single molecules. Single molecule data provide new insights into the structure and function of genomes and their constitutive functional units.

Images of single molecules represent a primary part of single molecule datasets. These images are rich with information regarding the identity and structure of biological matter at the single molecule level. It is however a challenge to devise practical ways to extract meaningful data from large datasets of molecular images. Bulk samples have conventionally been analyzed by simple averaging, dispensing with rigorous statistical analysis. However, proper statistical analysis, necessary for the accurate assessment of physical, chemical and biochemical quantities, requires larger datasets, and it has remained intrinsically difficult to generate these datasets in single molecule studies due to image analysis and file management issues. To fully benefit from the usefulness of the single molecule data in studying nucleic acids and proteins, it is essential to meaningfully process these images and derive quality image data.

Effective methods and systems are thus needed to accurately extract information from molecules and their structures using image data. For example, a large number of images may be acquired in the course of a typical optical mapping experiment. To extract useful knowledge from these images, effective systems are needed for researchers to evaluate the images, to characterize DNA molecules of interest, to assemble, where appropriate, the selected fragments thereby generating longer fragments or intact DNA molecules, and to validate the assemblies against established data for the molecule of interest. This is particularly relevant in the context of building genome-wide maps by optical mapping, as demonstrated with the ~25 Mb *P. falciparum* genome (Lai et al, *Nature Genetics* 23:309-313, 1999.

In the Lai et al. publication, the *P. falciparum* DNA, consisting of 14 chromosomes ranging in size from 0.6-3.5 Mb, was treated with either NheI or BamHI and mounted on optical mapping surfaces. Lambda bacteriophage DNA was co-mounted and digested in parallel to serve as a sizing standard and to estimate enzyme cutting efficiencies. Images of molecules were collected and restriction fragments marked, and maps of fragments were assembled or "contiged" into a map of the entire genome. Using NheI, 944 molecules were mapped with the average molecule length of 588 Mb, corresponding to 23-fold coverage; 1116 molecules were mapped using BamHI with the average molecule length of 666 Mb, corresponding to 31-fold coverage (Id at FIG. 3). Thus, each single-enzyme optical map was derived from many overlapping fragments from single molecules. Data were assembled into 14 contigs, each one corresponding to a chromosome; the chromosomes were tentatively numbered 1, the smallest, through 14, the largest.

Various strategies were applied to determine the chromosome identity of each contig. Restriction maps of chromosomes 2 and 3 were generated in silico and compared to the optical map; the remaining chromosomes lacked significant sequence information. Chromosomes 1, 4 and 14 were identified based on size. Pulsed field gel-purified chromosomes were used as a substrate for optical mapping, and their maps aligned with a specific contig in the consensus map. Finally, for chromosomes 3, 10 and 13, chromosome-specific YAC clones were used. The resulting maps were aligned with specific contigs in the consensus map (Id at FIG. 4). Thus, in this experiment multi-enzyme maps were generated by first constructing single enzyme maps which were then oriented and linked with one another. For a number of chromosomes that are similar in size, such as chromosomes 5-9, there are many possible orientations of the maps. Such maps may be linked together by a series of double digestions, by the use of available sequence information, by mapping of YACs which are located at one end of the chromosome, or by Southern blotting.

In short, optical mapping is powerful tool used to construct genome-wide maps. The data generated as such by optical mapping may be used subsequently in other analyses related to the molecules of interest, for example, the construction of restriction maps and the validation of DNA sequence data. There is accordingly a need for systems for visualizing, annotating, aligning and assembling single molecule fragments. Such systems should enable a user to effectively process single molecule images thereby generating useful single molecule data; such systems should also enable the user to validate the resulting data in light of the established knowledge related to the molecules of interest. Robustness in handling large image datasets is desired, as is rapid user response.

A prior system relating to the present disclosure contained scale and angle values that were stored within the system. The correlation of images to determine precise alignment was accomplished by comparing "bright spots" in the images—a very slow process that entailed identification of the bright regions in each successive overlapping region, all in "image space."

Although the use of a Laplacian filter algorithms have been used previously in automatic focusing applications (E. Krotkov. Focusing. International. Journal of Computer Vision. 1 (3):223-237, 1997; N. Ng Kuang Chern, et al. Practical issues in pixel-based autofocusing for machine vision. Proceedings of the 2001 IEEE International Conference on Robotics and Automation. Seoul, Korea, May 21-26, 2001; J. Krautsky, et al. A new wavelet-based measure of image focus. Pattern Recognition Letters 23:1785-1794, 2002) they were not optimized for the purpose of imaging single molecules in an optical mapping application and were not available in a code library form that could be used in this laboratory. This may be due to the fact that varying types of tissues (cells, DNA, etc.) each present their own set of automatic focusing challenges making a robust general purpose automatic focus algorithm impractical. Moreover, most cameras are sold independent of microscopes and vendors are not aware of the type of translation gear necessary for various applications. Thus, innovative solutions applying the most current technology to the automatic focus concept was necessary; the system according to the present disclosure integrates cameras, translation equipment and software—together which are not available as a package for this particular application. An example of this is the "tiling" step; it is uniquely designed to solve the specific problem of automatically focusing "out of focal plane bright fluorescent objects." Recently, Zeiss offered an automatic focusing routine that works solely with a Hamamatsu camera; this system remains inadequate for an optical mapping application such as the one described herein, however. Zeiss focusing hardware also appears to relate only to intensity focusing.

In summary, the present disclosure describes a novel, automated solution to a single molecule optical mapping application.

SUMMARY OF THE DISCLOSURE

This disclosure provides devices and methods for automated collection of images of single molecules and their assemblies, and for preparation of these single molecule images for further processing in external system(s). Both the devices, such as computer systems, and the methods for automated collection and processing provide for an overall robust imaging operation. The systems may include one or more of the following features, or may utilize all of them. Focus is advantageously automatically maintained during image collection. During the image processing step, the uneven illumination of fluorescence microscopy may be substantially reduced or eliminated by a flattening process. Offset of overlap may be determined between images and adjusted. Overly-exposed (bleached) region of overlap on one image of each pair of overlapping images may be automatically overwritten with stronger (unbleached) data from the identical region of overlap from the second image in the pair, the second image having been exposed to a light source only once. The resulting overwritten images then may be virtually merged to form a superimage or montage for visualization in the systems, yet remain as separate image files for further processing elsewhere. Following a collection, the quality of automated focusing process during that collection may be assessed using a diagnostic tool. The automated collection and processing systems may be implemented and deployed over a computer network. Further, the systems and methods of these embodiments may be ergonomically optimized to facilitate both required and optional user interactions.

In accordance with the embodiments, there are provided automated image collection and processing computer systems and methods for collection of single molecule images, wherein the single molecule images comprise signals derived from single molecules or single molecular assemblies or polymers, any or all of which may be elongated and fixed. The systems may comprise single molecule image collection computer system with a user interface capable of displaying one or more areas on a surface, (e.g., a microscope slide) for preparation of automated collection of images. The user interface may allow a user to select one or more areas to be imaged and to initiate automated image collection. User selection of one or more areas for imaging, as well as initiation of automated image collection and processing, may be ergonomically optimized. The methods may comprise one or more of the steps: visualization and selection within a user interface of a computer system of one or more microchannels or other areas on a surface such as a microscope slide containing single molecules, their assemblies or polymers; and initiation of automated image collection and processing with no further user intervention if desired. Such processing may include one or more of the following steps or processes: automated focusing during automated image collection; automated image flattening; image overlapping and image overwriting and merging. The flattening and overlapping steps are order independent following collection provided they precede the overwriting and merging step.

In other embodiments there are provided computer systems and methods for automated image collection and processing of single molecule images in which single molecule images are derived from optical mapping of single molecules, and in which single molecules are individual molecules or individual molecular assemblies or polymers. In various embodiments the single molecule is a DNA molecule. In yet other embodiments the single molecule is an RNA molecule, a peptide or a protein.

In other embodiments there are provided computer systems and methods in which a user may locate and define control points and pass depth for one or more areas on a surface containing single molecules and fragments, both of which define the boundaries of the image collection given the magnification setting, the image size and the size of each area selected. In various embodiments, the surface is a microscope slide.

In other embodiments there are provided computer systems and methods in which a series of overlapping optical images of the single molecules or single molecular assemblies or polymers is automatically collected within the area(s) defined by the control points and pass depth. In other embodiments within the computer systems and methods, the series of overlapping optical images is automatically collected maintaining correct focus. In other embodiments image processing methods following automated collection may comprise one or more of the following steps and/or the following computer system components: automated image flattening using the automated image flattening component; image overlapping using the automated image overlapping component; and overwriting and merging using the overwriting and merging component. The order of the image flattening and overlapping steps is unimportant provided both occur prior to automated image overwriting and merging.

According to other embodiments, there are provided computer systems and methods in which automated focus may be achieved by one or more of the following steps or processes: application of a Laplacian filter to small regions within reach of the optical images to define areas of focus based on contrast in image intensity; generation of point-of-focus values representing varying focal planes for the image which, when accompanied by corresponding Gaussian distribution curves, together may represent focal planes of single molecule image data in sharpest focus; retention of the most frequently observed point-of-focus values and removal of remaining, outlying values from the analysis; and application of a smoothing spline function to the most frequently observed point-of-focus values to interpolate a final focus solution, a calculated focus value, for the image.

According to other embodiments, there are provided computer systems and methods in which the most frequently observed point-of-focus values may comprise a predetermined number (e.g., five) of the most frequently observed point-of-focus values. According to yet other embodiments, there are provided computer systems and methods in which each of the small regions of an image may comprise a region small enough to accommodate at least a predetermined number of tiles, e.g., 100, in each image. According to yet other embodiments each of the small regions of an image may range from 8 by 8 pixels to 16 by 16 pixels, yet within each of the images the size the small region may be uniform throughout. According to yet other embodiments each of the small regions of an image may comprise a 10 by 10-pixel region.

According to other embodiments there are provided computer systems and methods in which the series of overlapping optical images is automatically flattened or substantially flattened, during which background and other illumination that is not generated primarily from the single molecules, single molecular assemblies or polymers is substantially reduced or removed from the images and the remaining illumination is normalized for further processing. A series of flattened optical images may result from this process. The automated image flattening step may comprise automated lessening or removal of dark noise from the total image intensity of each image; automated interpolation and substantial or complete removal of the image background noise of each image; and automated normalization of remaining image intensity using a sum image if a light source other than a laser light source is used. If a laser light source is used, normalization of the remaining image intensity of each image may be achieved using a single image of the background illumination pattern instead of a sum image. The dark noise reflects image intensity present with no illumination source, and is determined automatically from an image taken at the beginning of every collection with the camera shutter closed.

In other embodiments there are provided computer systems and methods for automated image flattening in which the background illumination pattern of each image is automatically modeled in an iterative process including one or more of the steps: application of a smoothing spline function to interpolate the low frequency components and to remove the high frequency components, and removal from the analysis of any pixel intensity values above two standard deviations from the mean following the fit. The iterative process is terminated when the standard deviation reaches its nadir. In these or other embodiments the automated image flattening component may be used for this process.

In other embodiments there are provided computer systems and methods in which the initial offset estimate for alignment within each pair of adjacent overlapping optical images may be determined automatically within the series of overlapping optical images using the automated image overlapping component. In these embodiments, the resulting sub-offsets may be used to determine error of initial offset estimate and to adjust offset estimate for more precise alignment within each pair of overlapping images.

In other embodiments there are provided computer systems and methods for automated image overlapping using the automated image overlapping component which may comprise one or more of the following: determination of initial offset estimate of alignment between each pair of adjacent overlapping optical images; revision of scale and angle values; calculation of sub-offsets to determine error of initial offset estimate; and addition of the sub-offsets to the initial offset estimate to yield adjusted element and line (E/L) distances for more precise alignment within each pair of adjacent overlapping optical images.

According to yet other embodiments there are provided computer systems and methods in which adjacent overlapping images include those collected sequentially within a row or column that overlap one another, as well as images in series that are flanked on either or both sides and overlap with images in the adjacent columns or rows.

In another embodiments there are provided computer systems and methods for automated image overlapping in which the initial offset estimates are based on the LUDL motor movement, the skew between the axes of the microscope state and the camera detector, and scaling. Scaling is the difference in size between one step of motor movement and the number of pixels the image moves.

According to yet other embodiments, there are provided computer systems and methods in which sub-offsets are employed, and within each pair of sequential flattened optical images within the series of flattened optical images, flattened image intensity data within a region of overlap exposed to a light source more than once may be automatically overwritten with data from the identical region of overlap on an adjacent flattened image exposed to the light source only once; the resulting series of overwritten optical images replaces the series of flattened optical images.

In another embodiment of the present disclosure there are provided computer systems and methods for automated image overlapping in which calculation of sub-offsets may comprise location of the best correlation (peak) within the data patterns of the overlapping regions of adjacent images, which method comprises one or more of the ordered steps: preparation of the image data within sub-images for transformation and correlation analysis; and computation of a Cross- Correlation Function (CCF) through a Fast Fourier Transformation (FFT). Computation of a CCF through an FFT comprises transformation of image data from intensity to frequency space, point-wise multiplication of the transform coefficients; frequency whitening of the results of the point-wise multiplication process; application of a Laplacian filter to the results of the frequency whitening; and execution of an inverse FFT of the product to yield the CCF. The CCF provides a pair of sub-offsets defining the relative error from the initial offset estimate.

In other embodiments there are provided computer systems and methods for automated image overlapping in which preparation of the image data for transformation and correlation analysis may comprise one or more of the ordered steps: copying overlapping regions of each pair of adjacent overlapping optical images into separate work areas to produce a copy of each of these regions (sub-images); calculating the average intensity of each of the sub-images and normalizing pixel intensity values within each of the sub-images; adding a pad-area and a fill-area, respectively, along two edges of each of the sub-images, filling of each of the pad- and fill-areas with predetermined values in a predetermined manner.

In other embodiments there are provided computer systems and methods for automated image overlapping in which the addition of pad-areas and fill-areas and filling these areas as part of the preparation of image data may comprise one or more of the ordered steps. A pad-area and a fill-area, respectively, are appended along two adjacent sides of each sub-image such that the pad-area extends as a border along the edge of one side of the first sub-image and abuts and is adjacent to the fill-area bordering along the entire, adjacent, second side of that sub-image; the positions of the adjacent pad- and fill-areas on the first sub-image are switched with respect to each other on the second sub-image. For the one of the sub-images, the pad-area is filled vertically with smoothly interpolated values that range between those along the top and bottom edges of the sub-image, and the fill-area of that sub-image is filled with zeros. For the second sub-image, the pad-area is filled horizontally with smoothly interpolated values that range between those along the right and left edges of the sub-image, and the fill-area of the second sub-image is filled with zeros.

In yet other embodiments there are provided computer systems and methods for automated image overlapping in which the pad- and fill-areas represent borders wherein the width of the border is equal to no more than twice the mechanical error associated with optical image collection in the system.

According to other embodiments there are provided computer systems and methods for automated image overlapping in which normalization of pixel intensity values within each of the sub-images is achieved, when the intensity value of each of the pixels is greater than the average intensity, through a natural log-transformation of the ratio of each pixel intensity value to the average intensity; when pixel intensity is less than the average intensity, normalization is achieved by subtraction of 1.0 from the ratio of the pixel intensity value to the average intensity.

In other embodiments there are provided computer systems and methods for automated image overwriting and merging, using the automated overwriting and merging component, with the use of the sub-offsets and within each pair of adjacent overlapping flattened optical images, may include the automatic overwriting of bleached pixel intensity data within a region of overlap exposed to a light source more than once, with the stronger pixel intensity data from the identical region of overlap on an adjacent overlapping image exposed to the light source only once; the resulting series of overwritten optical images containing overwritten regions may replace the series of flattened optical images. The methods of automated image overwriting and merging also may include automated merging of the overwritten regions within each pair of adjacent overwritten optical images to produce a single virtual superimage for visualization in the system; the series of overwritten optical images may be merged in the sequential order the raw images were initially collected.

In yet another embodiment of the present disclosure there are provided computer systems and methods for automated image overwriting and merging in which a linear blending of intensity values may be achieved in a transition region between the overwritten regions and non-overwritten regions, in which the intensity values at the edge of the overwritten regions are identical or substantially identical to those in the non-overwritten regions and in which the transition region is of a predetermined width, e.g., 20 pixels wide.

In yet another embodiment of the present disclosure there is provided a method for automated image overwriting and merging in which, despite merging for visualization of contents of the entire microchannel or other area imaged, each overwritten image may be retained as a separate file on a processing computer.

In another embodiment of the present disclosure there are provided computer systems and methods for automated image collection and processing of single molecule images, in which a diagnostic computer tool that is not a required component of said system may be utilized to manually assess, after image collection is complete, the quality of image focusing performed by the automated image focusing component of the system during image collection. In yet other embodiments there are provided computer systems and methods in which manual assessment of image focusing performed by the automated image focusing component may be ergonomically optimized.

BRIEF DESCRIPTION OF DRAWINGS

FIGS. 3A and 3B are screenshots taken during the overlapping process. These sub-images—copies of only the overlapping regions of two adjacent optical images—show fluorescing single molecules and fragments in a microscope slide channel. Pad-areas and fill-areas have been added as borders as described below to perform the CCF through a FFT.

DETAIL DESCRIPTION OF DISCLOSURE

Relevant Terms

Figure 1:
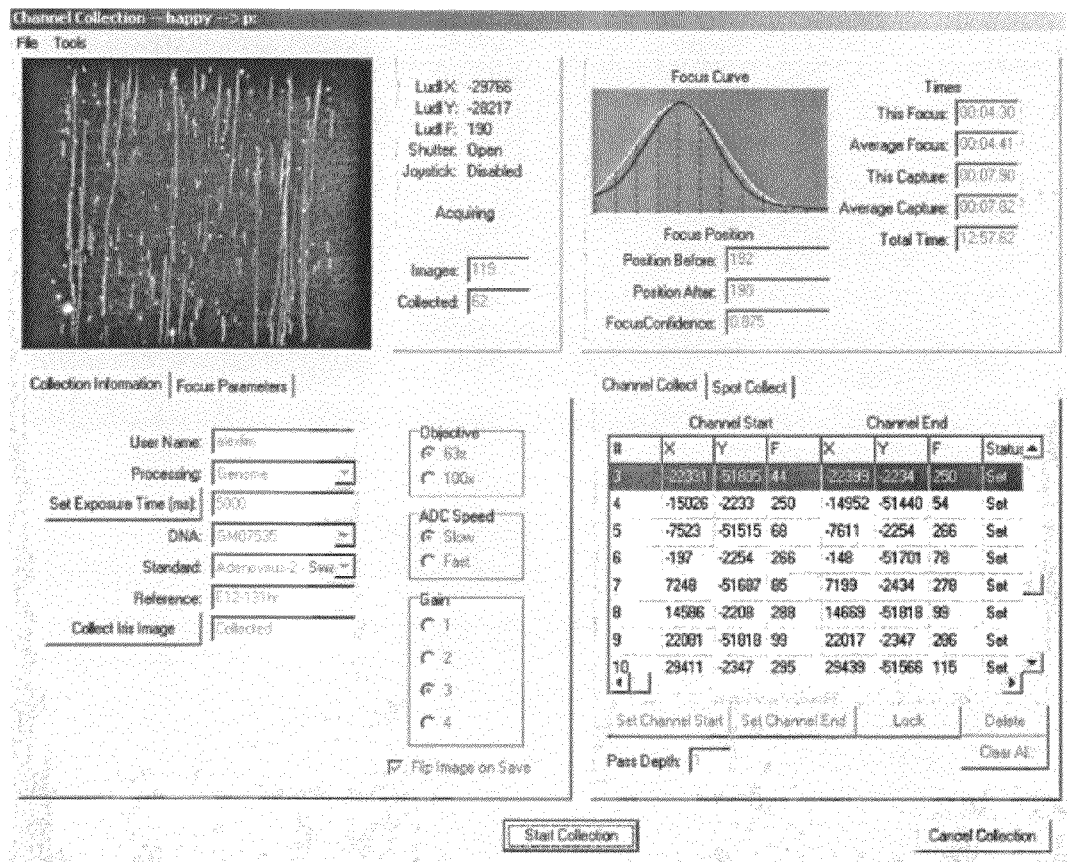
FIG. 1 is a screenshot showing the user interface used for initiating image collection. It depicts inputting control point information from the microchannels.

The following disciplines, molecular biology, microbiology, immunology, virology, pharmaceutical chemistry, medicine, histology, anatomy, pathology, genetics, ecology, computer sciences, statistics, mathematics, chemistry, physics, material sciences and artificial intelligence, are to be understood consistently with their typical meanings established in the relevant art.

As used herein, genomics refers to studies of nucleic acid sequences and applications of such studies in biology and medicine; proteomics refers to studies of protein sequences, conformation, structure, protein physical and chemical properties, and applications of such studies in biology and medicine.

The following terms: proteins, nucleic acids, DNA, RNA, genes, macromolecules, restriction enzymes, restriction maps, physical mapping, optical mapping, optical maps (restriction maps derived from optical mapping), hybridization, sequencing, sequence homology, expressed sequence tags (ESTs), single nucleotide polymorphism (SNP), CpG islands, GC content, chromosome banding, and clustering, are to be understood consistently with their commonly accepted meaning in the relevant art, i.e., the art of molecular biology, genomics, and proteomics.

The following terms, atomic force microscopy (AFM), scan tunneling microscopy (STM), flow cytometry, optical mapping, and near field microscopy, etc., are to be understood consistently with their commonly accepted meanings in the relevant art, i.e., the art of physics, biology, material sciences, and surface sciences.

The following terms, database, database server, data warehouse, operating system, application program interface (API), programming languages, C, C++, Extensible Markup Language (XML), SQL, as used herein, are to be understood consistently with their commonly accepted meanings in the relevant art, i.e., the art of computer sciences and information management. Specifically, a database in various embodiments of this disclosure may be flat data files and/or structured database management systems such as relational databases and object databases. Such a database thus may comprise simple textual, tabular data included in flat files as well as complex data structures stored in comprehensive database systems. Single molecule data may be represented both in flat data files and as complex data structures.

As used herein, single molecules refer to any individual molecules, such as macromolecule nucleic acids and proteins. A single molecule according to this disclosure may be an individual molecule or individual molecular assembly or polymer. That is, for example, a single peptide molecule comprises many individual amino acids. Thus, the terms "single molecule," "individual molecule," "individual molecular assembly," and "individual molecular polymer" are used interchangeably in various embodiments of this disclosure. Single molecule data refers to any data about or relevant to single molecules or individual molecules. Such data may be derived from studying single molecules using a variety of technology platforms, e.g., flow cytometry and optical mapping. The single molecule data thus comprise, among other things, single molecule images, physical characteristics such as lengths, heights, dimensionalities, charge densities, conductivity, capacitance, resistance of single molecules, sequences of single molecules, structures of single molecules, and restriction maps of single molecules. Single molecule images according to various embodiments comprise signals derived from single molecules, individual molecules, or individual molecule assemblies and polymers; such signals may be optical, atomic, or electronic, among other things. For example, a single molecule image may be generated by, inter alia, atomic force microscopy (AFM), flow cytometry, optical mapping, and near field microscopy. Thus, electronic, optical, and atomic probes may be used in producing single molecule images according to various embodiments. In certain embodiments, various wavelengths may be employed when light microscopy is used to generate single molecule images, including, e.g., laser, UV, near, mid, and far infrared. In other embodiments, various fluorophores may be employed when fluorescent signals are acquired. Further, single molecule images according to various embodiments of this disclosure may be multi-spectral and multi-dimensional (e.g., one, two, three-dimensional).

As used herein, genomics and proteomics data refers to any data generated in genomics and proteomics studies from different technology platforms; and biomedical data refers to data derived from any one or more biomedical technology platforms.

As used herein, the term "contig" refers to a nucleotide (e.g., DNA) whose sequence is derived by clustering and assembling a collection of smaller nucleotide (e.g., DNA) sequences that share certain level of sequence homology. Typically, one manages to obtain a full-length DNA sequence by building longer and longer contigs from known sequences of smaller DNA (or RNA) fragments (such as expressed sequence tags, ESTs) by performing clustering and assembly. Various clustering programs are known; some of which are publicly available. See, e.g., "CluserW" and "Fragment Assembler", each of which is available on the World Wide Web.

As used herein, the term "single molecule assembly" refers to larger single molecule fragments assembled from smaller fragments. In the context of nucleic acid single molecules, "assembly" and "contig" are used interchangeably in this disclosure.

The term "array" of "microarray" refers to nucleotide or protein arrays; "array," "slide," and "chip" are interchangeable where used in this disclosure. Various kinds of nucleotide arrays are made in research and manufacturing facilities worldwide, some of which are available commercially. (e.g., GENECHIP microarray system by Affymetrix, Inc., LIFE-ARRAY microarray system by Incyte Genomics). Protein chips are also widely used. See Zhu et al., Science 293 (5537): 2101-05, 2001.

The terms "microfluidic channel," "microchannel" and "channel" may be used interchangeably in various embodiments of the disclosure, and refer to the individual lanes on a microscope slide on which single molecules and single molecule fragments have been deposited, elongated and fixed for optical imaging and mapping. A microchannel may contain several single molecules and fragments. Furthermore, single molecules may be fixed in areas that are not in the shape of channels but, instead, as spots, blots, wells, or any other shape that will allow optical imaging of its contents, and may nonetheless be referred to as channels and the like in this disclosure.

The terms "image" and "frame" may be used interchangeably and refer, with each exposure, to the entire area captured by the camera.

The term "overlap" or "overlapping" refers to 1) the process of determining the offset or relative distance between images adjacent to one another, or 2) a region common to adjacently-positioned images within a channel. The term "offset" refers to the relative shift in position, in terms of the number of pixels in X/Y coordinates, that the first image must be moved to align it to overlap with a second image, i.e., (0,0) in the first image is located at location (X,Y) in the second image.

The term "sub-image" is the area within each image of a pair of adjacent images that roughly overlap as determined with an "initial offset estimate" based on LUDL movement. The initial offset estimate is then corrected to achieve a more perfect alignment between overlapping images when sub-images from adjacent images are compared by a Fast Fourier Transformation (FFT) process. The term "sub-offset" refers to the number of pixels that the first sub-image must be moved to align it for overlapping with the second sub-image, correcting the initial offset estimate.

The term "pad-area" refers to an artificial extention of a sub-image filled with interpolated data values. The term "fill area" relates to the artificial extension of a sub-image filled with zeroes. The typical size of the fill-area increases the dimensions of the sub-image on all four of its sides. The FFT performed in this system requires the preparation of both pad-areas and fill-areas.

The phrase "adjacent overlapping optical images" includes pairs of images collected in series within a column or row that overlap one another, as well as images in series that are flanked on either or both sides and overlap with images in the adjacent columns or rows.

The term "frequency whitening" refers to normalization of FFT coefficients to unit magnitude (length).

The terms "overwriting" and "merging" may be used interchangeably in the context of the component of the system described below in which the bleached data from an overlapping region of the microscope slide exposed to a light source more than once is overwritten with stronger, i.e., more intense, data from an identical region of overlap from the an adjacent imaging area on the microscope slide.

The terms "automated" and "automatic" may be used interchangeably in various embodiments of the present disclosure, and refer to 1) the components of the computer system of this disclosure—either collectively or individually—that describe a system for image collection requiring, once initiated, no human intervention, or 2) processing steps disclosed herein that require, once initiated, no human intervention for completion.

The terms "tile" and "image" in certain portions (merging step) of the autocollection process may be used interchangeably and refer to the 1316 by 1032-pixel image of the microfluidic channel produced by the CCD camera. However, within the automated focusing component "tiling step" portion of the autocollection process, a tile is a 10 by 10 group of pixels within an image for the purpose of calculating a focus (energy change) value for that region.

The terms "flattening" or "flat fielding" may be used interchangeably and refer generally to the processes of removing the effect of the background illumination and controlling for the brightness of the image.

The "tiling step" in the automated focusing process described in this disclosure refers to the application of a Laplacian filter to small regions within each image to define areas of focus based on contrast in image intensity.

The term "identical" in "identical region of overlap on an adjacent, sequential image exposed to a light source only once" means the area of overlap between two adjacent images that is defined by collection of the second of the two images.

The term "primarily" as used when referring to illumination generated from images of single molecules and their assemblies relates specifically to the illumination from the genomic molecule itself as opposed to light reflected from the camera lens or surface such as a glass microscope slide, the intensity signal present in an image with no illumination source, or the uneven illumination due to the intensity shift of the illumination source from the center to the edge of the image.

The term "dark noise" refers to the intensity signal present in an image with no illumination source. The term "multiplicative noise" refers to the uneven illumination due to the intensity shift of the illumination source from the center to the edge of the image; the terms "bright" image and "sum" image may be used interchangeably and represent multiplicative noise. The term "additive noise" refers to light reflected from the glass surface and glass slide.

A user interface, or a view, as used herein and interchangeably, refers to any kind of computer application or program that enables interactions with a user. A user interface or viewer may be a graphical user interface (GUI), such as a browser. Examples of such a browser include MICROSOFT INTERNET EXPLORER internet browser and NETSCAPE NAVIGATOR internet browser. A user interface also may be a simple command line interface in alternative embodiments. A user interface of the invention(s) of this disclosure may also include pug-in tools that extend the existing applications and support interaction with standard desktop applications. A user interface in certain embodiments of the invention(s) of this disclosure may be designed to best support users' browsing activities according to ergonomic principles.

"Ergonomically optimized," as used herein, refers to optimization on the design and implementation of the assembly system based on ergonomics principles. The International Ergonomics Association defines ergonomics as both the scientific discipline concerned with the understanding of interactions among humans and other elements of a system, as well as the profession that applies theory, principles, data and methods to design in order to optimize human well-being and overall system performance. Ergonomists contribute to the design and evaluation of tasks, jobs, products, environments and systems to make them compatible with a user's needs, abilities and limitations. Ergonomically optimized systems according to this disclosure provide reduced error rate and improved efficiency and quality in user interaction.

Automated Image Acquisition System

Overview. Optical mapping data collections for single molecules may easily exceed 1000 images per microscope slide; it has therefore become impractical for a technician to oversee the capture of each image. Described herein are embodiments of an automated single molecule image acquisition and processing computer system and method that allows a user to select control points and pass depth defining one or more areas to be imaged, and to initiate the automated image collection process without further intervention if desired. During automated image collection within a microchannel according to one embodiment of the present disclosure, a straight-line path is traversed between the selected control points (e.g., beginning and ending) for each channel, automatically focusing at each location and acquiring the image. Currently, more than 100 images per microchannel are collected and as much as 20 percent of each image frame is overlapped with the previous and subsequent (or adjacent) images within the defined imaging area, although the number of images per microchannel can be varied from 1-20, 21-50, 51-75, 76-100, 101-125, 126-150, 151-200, and greater than 200. Likewise, the overlap may vary from 1-5 percent, 6-10 percent, 11-15 percent, 16-20 percent, 21-25 percent, 26-30 percent, 31-40 percent, or greater than 40 percent. The automated focusing component of this system permits and facilitates automated optical mapping of single molecules.

Following collection, the images are routed to processing cluster where analysis is initiated. Image processing of the system disclosed below is comprised of substantial or complete removal of background intensity and normalization of the remaining intensity ("flattening") of the images, determination of precise alignment between adjacent, overlapping images, the overwriting of data in overly exposed regions of overlap, and the virtual merging of overwritten images ("mosaicing") to produce a superimage for visualization. Individual raw and overwritten images resulting from the collection and processing system disclosed are maintained as separate files. The overwritten image files are routed for further processing in external systems not the subject of this disclosure.

Suitable equipment. A LUDL MAC5000 may be used to control the movement of the ZEISS inverted fluorescence microscope state as well as the shutter (i.e., XY translation (movement of the stage) the Z axis (focus)). Other stage controllers, such as the LUDL MAC 2000, may be used. Advantageously, the controller should be rapid and accurate, i.e., must translate for location to location both quickly and with a minimum of error (±5000 nm X and Y, ±100 in focus). Rapid, high-resolution (with CCD chip) and highly-sensitive cameras that allow the imaging of dim objects are advantageously used; currently available examples include the used; currently available examples include the PENTAMAX CCD camera, the HAMAMATSU CCD camera and the ROPER COOLSNAP HQ camera; the latter two are capable of producing at least two images per second. The camera advantageously has low noise, i.e., it substantially represents shape and size of the molecule, as well as intensity of the image. Most microscopes currently useful in the automated image acquisition system use a HBO 100 Watt mercury lamp as a light source, but a laser light source is preferred since it provides more consistent illumination, avoiding the consequences of dimming bulbs. A Spectra-Physics water-colled laser may be used at one image collection station but diode lasers currently are believed to provide advantageous results. The type of laser chosen will depend upon wavelength required for illumination. A substance such as OLYMPUS immersion oil is advantageously used to reduce the refractive index to view the image. A person computer equipped with an operating system, e.g., MICROSOFT WINDOWS NT operating system, may be connected to both the LUDL controller (computer interface: coordinates mechanical motions on the microscope) and the CCD camera, and advantageously may coordinate both systems, transferring collected images to the processing cluster.

Embodiments of User Input and Automated Image Collection.

To prepare for automated image collection, the user advantageously should first identify control points defining, for example, the upper and lower (outer) boundaries of an area on a surface (e.g., microscope slide) to be imaged. Collection may be customized to an area of any shape, although in an advantageous embodiment, the area is rectangular-shaped in the form of a microfluidic channel or "microchannel" ("channel") in which single molecules are elongated and fixed, e.g., within a molten or nonpolymerized gel composition on the surface (e.g. slide).

If the single molecules are fixed on the surface in the form of channels, as in one advantageous embodiment of the present disclosure, the lanes are approximately 100 µm in width. Acceptable lanes can be fewer than 50 µm, from about 50 to 75 µm, from about 75 to 100 µm, from about 100 to about 125 µm, from about 125 to about 150 µm, and greater than about 150 µm. Numbers of channels per slide may vary from 1-10, 10-20, 20-30, 30-40, 40-50, 50-60, 60-70, 70-80, 80-90, 90-100, and greater than 100. It is appreciated that some surfaces other than glass slides may facilitate higher numbers of channels. At this time there are on average ten channels per slide; it is currently possible to place between about 48 and about 100 channels per slide although higher numbers of channels require greater care. Advantageously, there should be some empty buffer zone between channels for data collection because bleed between channels may disturb flow of the DNA and makes the surface (e.g., slide) unusable. The user should identify the control points—here, for example, the beginning and ending points on each of the channels—by approximating the location of the center point at both the top and the bottom of each channel or other area to be imaged. These points define the upper and lower boundaries of a channel or other area within which images are captured. In addition, depending on the level of magnification, more than one column or row of images may be required to image the entire contents of the channel or area. Therefore, the user advantageously should also estimate and specify a pass depth indicating the number of columns or rows of images to be captured. The system will then center the number of columns or rows chosen along the line defined by the two control points, overlapping images in adjacent columns or rows as necessary. The pass depth thus defines the boundaries on opposite sides of the channel or area. These sequential images in a single column whose path is defined along a channel or in several adjacent columns or rows within a channel or collection area of an alternative shape or magnification, comprise a "group" of images.

The user must supply certain information in the user interface (FIG. 1), e.g., for data tracking purposes: identification of the user, single molecule sample, sizing standard and restriction enzyme. Most importantly, however, the user should specify exposure time of the slide to the light source to provide capture of usable image according to embodiments of this disclosure. Specifically, the user should select an exposure time that optimizes the number of gray levels in an acquired image. These values can be optimized with routine experimentation. Using the PENTAMAX camera the exposure time is typically 5000ms; using COOLSNAP HQ or ORCA camera with the laser system, the exposure time is typically 150ms. The CCD chip for each of these cameras returns the captured image data in a range between 0 (dark) and 4095 (fully saturated) gray levels. Therefore, the optimal mean background level is approximately 100 gray levels. The optimal difference between mean background and mean data level is 1000 gray levels or more, but the maximum gray level of any data point must be less than saturation (4095).

Once the control points and pass depth are chosen for each channel or area, and the sample and user information and desired exposure time are added to the queue in the user interface, the user can initiate automated image collection and processing as disclosed herein with no additional user input required. Images are collected first within the first of one or more defined areas with as much as a 20 percent overlap between frames (images). In an advantageous embodiment of the present disclosure, collection of images within a microchannel may take place in a single column or, in alternative embodiments and depending on the level of magnification chosen, collection may take place in two or more adjacent, overlapping columns or rows of images. As an example, particularly when a greater magnification is used for collection along a channel and thus more than one image is required to capture the contents of the width of the channel, images are collected first along the length of one side of the channel, continuing from the level of the second control point, generally at the end of the channel, along the length of the opposite side of the channel: overlapping frames in the adjacent column as they are captured, to the level of the first control point, generally the top of the channel. In this way two (or more if necessary) adjacent columns or rows of sequential images are collected for each channel. A similar approach may be followed to image a larger or different shaped area according to various embodiments of this disclosure. Once one channel or area is imaged completely, collection continues on with the next area in the user-specified order. However, the user may, after collection is complete, examine collection problems or ensure that there were no problems with image collection using The automated focus diagnostic tool, a software program according to one embodiment of the present disclosure. The automated focus diagnostic tool, although not itself required for automated image collection and processing, may be used to verify that the automated focus component has functioned properly during prior image collection.

Following preparation of the user list of control points, the first channel or area to be imaged specified on the list may be "initialized." Initialization of the channel or other area involves generation of both a log file containing information about the collection run itself, and an information file containing identification information for the sample and user. It also involves preparation of space on the storage device, (e.g. hard drive) in which to store the images and further, defines within the channel or alternative size area to be imaged the coordinates of each image along the collection route.

To determine these coordinates for a channel according to one embodiment, and given the pass depth, the width of the channel, the (three-dimensional coordinates of the) control points and the magnification setting, the program can make multiple determinations, e.g., the upper left hand corner of the first image to be made as well as the lower left and corner of the last image in the first column, centering the columns or rows within the area to be imaged between the control points. Along the straight-line path that connects these two points runs the left border of all sequential images in that column. The coordinates of each of these planned images, allowing for at most a 20 percent overlap between successive images, is communicated via the LUDL controller to the stepper motor which controls movement of the stage and, thus, advancement of image collection along a channel. After one image has been collected or captured the stepper motor moves the stage the appropriate distance for focusing and collection of the next image, and so on until the last image in the channel is collected. Then collection either continues with one or more adjacent columns or rows of images within the same area until the entire group of images is captured for that area, or begins for the next channel or area after its initialization. A surface such as a microscope slide with ten channels, for example, will require approximately five hours to image given a mercury lamp used as a light source. In contrast, using a system with a laser light source, ten channels can be completed at this time in approximately 40 minutes. Once images have been collected, their files are placed in a folder on another processing computer.

Automated Focus System Overview. The automated image collection system can be optimized to take advantage of the fact that single molecule data lie in a distinct focal plane. One of the primary aims of the embodiments disclosed herein is to maintain focus throughout image collection, despite the limitation that even illumination in fluorescence microscopy is nearly impossible. The standard method of focusing by image intensity requires an assumption that an image is in focus if it is the brightest of a continuous set (i.e., Z-stack,) comprising sequential images taken throughout the range of focal viewpoints, beginning with out-of-focus to in-focus, transitioning again to out-of-focus. This method, however, allows the algorithm to focus on bright regions which may in fact be out of the primary focal plane. In addition, focus resolution is not especially sharp. An automated focus system that may be used with the present image collection system improves upon the standard method by using Laplacian filtered image values, solving the latter problem. To address the initial problem, also in embodiments of the present disclosure, images may be divided and analyzed in small regions referred to as "tiles" as a way of adjusting for bright regions out of the primary focal plane (i.e., the "tiling step"). According to an advantageous embodiment of the present disclosure given the type of cameras currently in use, tiles are composed of 10 by 10 pixel regions within an image. The main factor influencing tile size is the image area of the camera after binning. Other embodiments may reflect tiles of varying size; in practice, again given current equipment capabilities, an acceptable range of tile size is between 8 by 8 and 16 by 16-pixels. Generally, a uniform tile size is used throughout the image, and within and between full collections, although this is a fully adjustable feature. Ideally, the image should be segmented into enough tiles such that outliers disturb the fewest number of tiles. A tile size that results in more than 100 tiles per image allows an adequate number of them, for example, 50, to remain for statistical analysis given the fact that many may contain outlier data and therefore will not be usable.

The point-of-focus value—the first approximation of focus—of each tile is determined, with larger values representing tiles in better focus. A histogram is generated with these values. The peak value (i.e., the most frequently observed point-of-focus value), in addition to the four next most frequently observed in-focus values (two values representing image positions on either side of the peak value in the histogram) are used to compute a final focus solution, the calculated focus value. The remaining, outlying values are removed from the analysis, considered to be intensity sources out of focus. Although the automated focus component is fully-automated, the user may verify, after the fact, that in-focus image collection has proceeded smoothly at each step using An automated focus diagnostic tool, as described below. Furthermore, this software provides a useful format with which to describe in more detail the automated focus component of the system. Example 1 below demonstrates an automated focus component routine.

Automated focus diagnostic tool. The automated focus component can be a fully-automated element of the automated collection process. The automated focus diagnostic tool may be used to aid examination of the automated focus process, although this tool is not itself required for the automated focus component to function according to this disclosure. As discussed above, the automated focus component automatically selects the best focal plane for small regions or tiles within the image, then compiles the best image from the tiles that are in sharpest focus. This is based on the application of a Laplacian filter to the intensity data to find the "edge energy" or "focus value" for each tile in each of the focal planes or views. This approach highlights regions in the image of a rapid intensity change between pixels. The greater this calculated energy value, the sharper focus of the image for that tile and, thus, for the image.

Figure 2A:
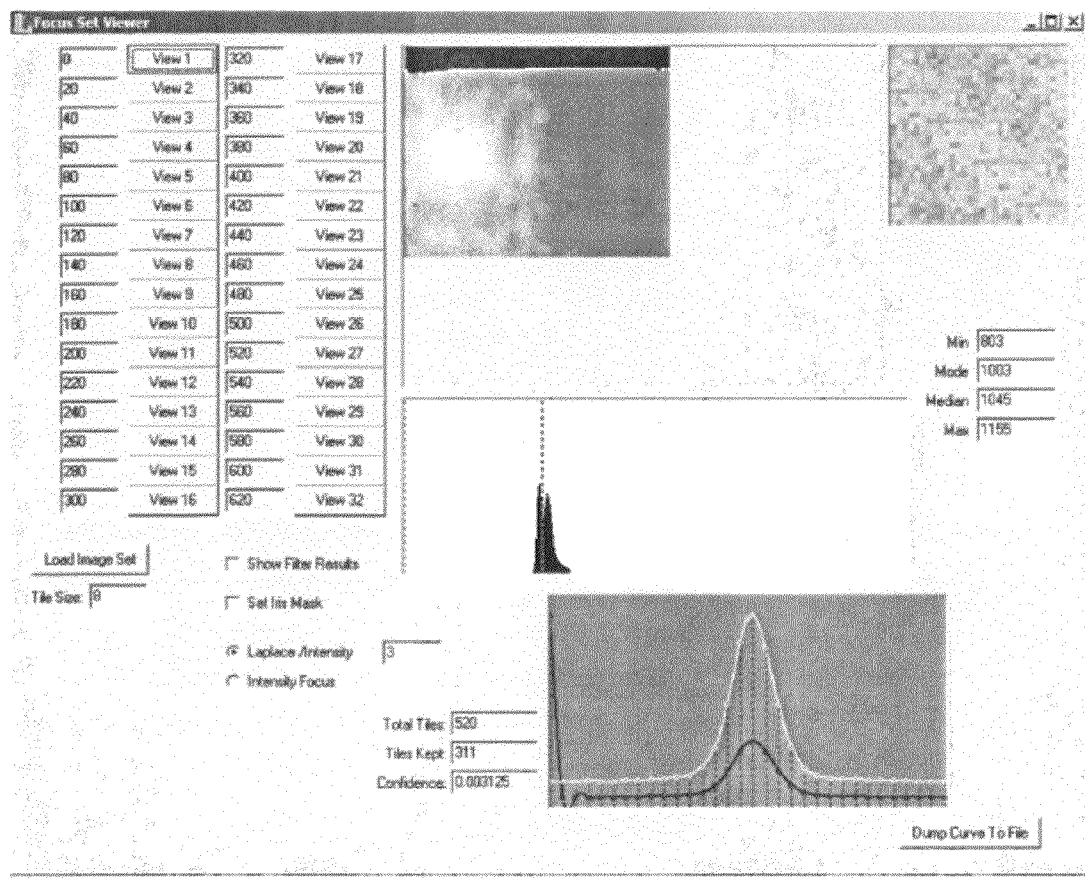
FIG. 2A is a screenshot showing the automated focus diagnostic tool interface, indicating LUDL position (in steps) at each view prior to application of the algorithm for focus analysis.
Figure 2B:
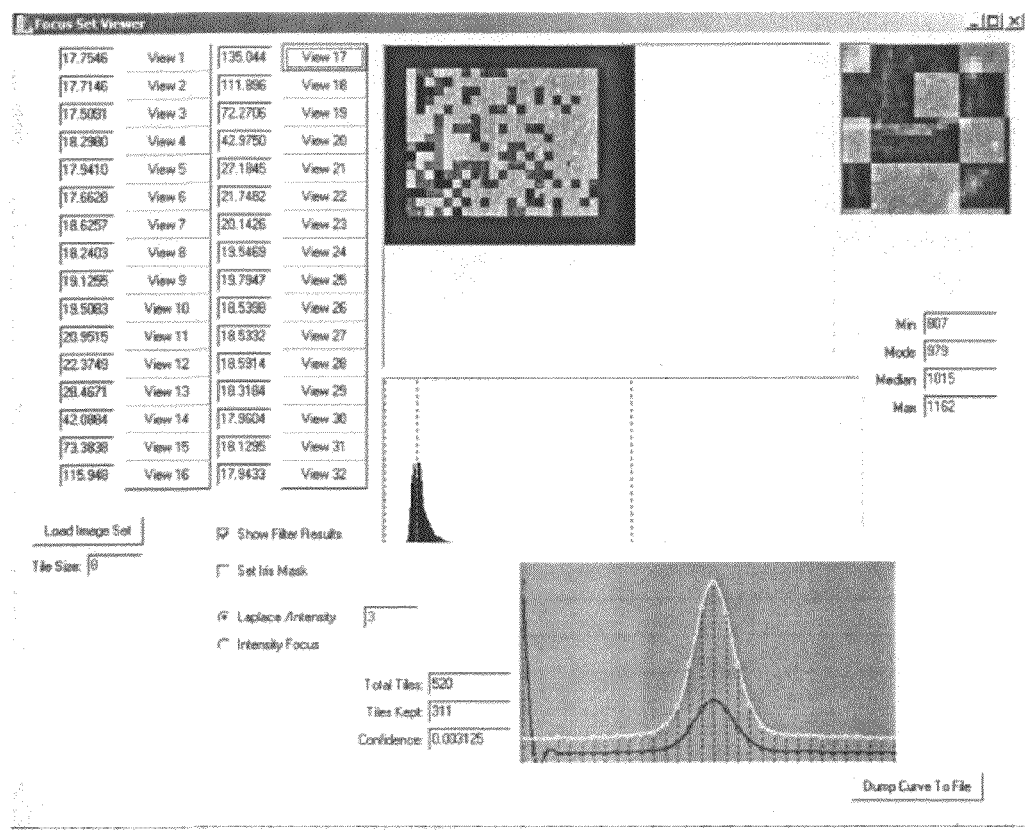
FIG. 2B is a screenshot showing the automated focus diagnostic tool interface, following application of the algorithm for focus analysis. Areas of green represent an increase in contrast, while areas of red represent a decrease in contrast.

In the automated focus diagnostic tool interface (FIG. 2A), one of the windows shows, as specified by the user and for each focal plane view, the number of LUDL steps between these views. This value is set to 20 LUDL steps in embodiments of this disclosure although this is a fully adjustable feature. Other values as low as one or as many as about 100 may be used with intermediate values of at least 5, at least 10, at least 20, at least 30, at least 40, at least 50, at least 60, at least 70, at least 80 and at least 90. Positioned next to each number of LUDL steps is the view button that allows the image for that focal plane to be viewed. Using the automated focus diagnostic tool, the user can manually initiate the algorithm that applies the Laplacian filter at each of the focal planes in an image. Once the filter is applied, the number of LUDL steps at each view is changed in the user interface to the calculated focus value for the image at that view (FIG. 2B). The largest of these energy values in the list corresponds to the view (or within several LUDL steps of it) with the sharpest overall focus for the image. When the view; button is selected next to this value, the image is shown with regions (tiles) of color—for example, green tiles may indicate an increase in contrast; red tiles may indicate a decrease in contrast. Each tile can generate a corresponding curve so that a "family" of curves is created. For most of the tiles the curve will be bell-shaped (i.e., a normal distribution), but some may show an aberrant shape which may indicate a feature in the image that is positioned in other than the primary focal plane. A histogram is generated, predicting the view (focus locations for the image) at or near which the actual focus location lies for that image. Any views greater than or less than two units from this view are eliminated and are represented as black-colored tiles in the image in the automated focus diagnostic tool window. Finally, since the in-focus image may actually lie at one of the 20 LUDL steps between each of the views shown in the automated focus diagnostic tool interface, a smoothing spline fit is applied and the interpolated focus location is identified. Once this process has been completed, the image is captured.

Image Processing Overview

The image processing function of the automated image collection and processing system of this disclosure may consist of one or more of four processes: flattening, overlapping, overwriting and merging. Flattening and overlapping may both be performed on the raw optical images and are order-independent with respect to each other.

Flattening refers to removing as much background noise as possible and/or normalizing for the level of illumination in the raw image. The latter part of this step is advantageous due to the effect of uneven illumination from the (non-laser) lamp and objective lens. This has important implications for determining molecule length since length is determined from the molecule's integrated fluorescence intensity. Without image flattening, a bright object at the center of the image may be interpreted as having high fluorescence intensity values, leading to an overestimation in molecule size. Likewise, the size of an object at the outer edge of an image—perhaps a standard used for sizing of single molecules and fragments—may be underestimated without image flattening because it would appear dim by virtue of its position at this less-illuminated area of the image.

Overlapping relates to determination of offset of the alignment between adjacent, overlapping images. Initial offset estimates for alignment are made based on LUDL movement; sub-offsets resulting from a Cross Correlation Function (CCF) performed through a Fast Fourier Transformation (FFT) refine the initial estimates, more precisely aligning these overlapping regions.

Overwriting and merging use the results of the overlapping and flattening processes to overwrite pixels in any portions of images exposed to a light source more than once (and thus bleached), with the stronger unbleached image data from identical regions of overlap of immediately adjacent images exposed to a light source only once. Overwriting and merging also virtually blend the flattened images into a single super-image or montage for visualization in this system. A super-image is a virtual (not physical) image that appears to reflect the entire, continuous contents of the microchannel or other area imaged. Individual overwritten image files are maintained in the system for further processing in an external system not disclosed herein.

Embodiments of Image Processing

Flattening. The following description illustrates an image flattening or flat fielding process in accordance with the embodiments of this disclosure. The image flattening process is used to remove optical artifacts in the collected raw image set; it may be performed before or after the overlapping process. The raw images contain four main components: dark, additive and multiplicative noise, and the signal generated from the genomic data itself. The flattening process consists of the following steps according to embodiments of the present disclosure. First, the dark noise—the intensity present in an image with no illumination source—is removed or substantially lessened from the total image intensity. The dark noise is determined from an image taken at the beginning of every collection with the camera shutter closed. Next, an interpolated image of the background is built. To correctly model this background illumination pattern which includes additive noise—light reflected from the glass surface and glass slide—a substantial or large number (for example, greater than the 90th percentile) of the bright pixels from the image are removed. However, since a number of the remaining bright pixels in the image represent not background but single molecule fluorescence, an iterative process may be executed to interpolate the low frequency components and to remove these high frequency components. Specifically, a smoothing spline function is applied to the data and any pixels with intensity values above two standard deviations from the mean following the fit are removed. The remaining data are re-fit and, once again, values above two standard deviations are removed. This process is continued until the standard deviation reaches its nadir. The remaining intensity shape is an estimation of the raw image background.

It has been determined empirically that between four and 16 images can be used to mitigate the error associated with the use of a lamp versus a laser as the light source. Thus, for each series of 16 raw images collected, 16 interpolated background images are generated as described above. From this series of background images a single sum or bright image is produced that satisfactorily represents the background illumination in the corresponding set of raw images—including the multiplicative noise—uneven illumination due to the intensity shift of the illumination source from the center to the edge of the image. Thus, the sum image represents the shape of the non-laser illumination source. The sum image is in fact a median composite image of the interpolated background images (with dark noise removed), generated by using the median of the intensity values at each pixel location from the 16 images. No sum image is produced when using a laser light source since a laser removes the error associated with differences in illumination; instead, a single background image is used in place of the sum image. Regardless of light source, the interpolated background image is subtracted from its raw data image; the result is then divided by the sum image intensity which has been normalized to a mean of 1.0. The background and sum images are applied to complete the calculation:

$$I_{total} = (I_{Object} + I_{AdditiveError}) * I_{Sum\ (Object=Corrected)}$$

$$I_{total} = (I_{Object})(I_{Sum}) + (I_{AdditiveError})(I_{Sum})$$

Subtract off the background image illumination, where this is represented as the product of $I_{Additive\ error} * I_{Sum}$ $$I_{total} - ((I_{AdditiveError})(I_{Sum})) = (I_{Object})(I_{Sum})$$

Divide by the normalized bright image (with mean=1.0) to recover just the "correct" intensity term:

$$I_{total} - ((I_{AdditiveError})(I_{Sum}))/(I_{Sum}) = (I_{Object})$$

The product of image flattening is a series of flattened images, stored in individual files, corresponding to the original raw images. Example 2 describes the flattening component of the system according to one embodiment of this disclosure.

Determination of sub-offsets. The stepper motor drive LUDL controls movement of the microscope stage and this, along with the magnification of the objective lens, provides a rough alignment estimate (initial offset estimate) between overlapping images along a microchannel or within an area of alternative size or shape. The initial offset estimate may be in error, e.g., by 50 or more pixels, but is sufficient to estimate the overlapping areas of adjacent images. Furthermore, even if there is no slippage of the microscope slide over time, the slide on the stage and the detector in the camera themselves are not perfectly aligned. Either before or after flattening, an overlap step corrects for the mechanical errors (slipping of gears between motor and microscope stage) during image collection. As with the flattening process, the overlapping process is performed using the original raw images. The product of the overlapping process is a pair of sub-offsets, values more precisely indicating the position of one image's area of overlap relative to the other's; the sub-offsets thus correct the initial offset estimate which is based on LUDL movement, possible skew between the axes of stage and camera detector, and scaling—the difference in size between one step of motor movement and the number of pixels the image moves. Thus, each of the sub-offsets comprises the initial displacement of the stage movement plus the mechanical error associated with its slipping.

Correction for Skew of Camera and Stage Axes and Mechanical Error. Overlapping regions of the raw images may be aligned initially with the assumption that there is no geometry distortion present—that is, they differ by only linear shifts of the microscope stage which require only linear adjustments for precise alignment. Although the E/L (Element/Line) distances that the image moves across the camera detector are analogous to the X and Y axes distances moved by the microscope stage, a correction must be made to account for the possible skew between the axes of stage and detector, as well as scaling. These factors vary between—not within—collections due to physical movement of the camera, such as after cleaning, and selection of magnifying power, for example. Since the scale and coordinates of the stage are known, E and L are calculated as follows:

$$E = \text{element} = \text{scale} * (X * \cos\theta + Y * \sin\theta)$$

$$L = \text{line} = \text{scale} * (-X * \sin\theta + Y * \cos\theta),$$

where the scale is given in pixels/step and its initial value is determined by the magnification of the microscope (e.g., 63X=1.89, or 100X=3); the angle is initially considered to be 180 degrees. Scale and angle are recalculated for each channel or other area when determining the conversion from LUDL movement to estimate the degree of image overlap. For example, if the microscope stage moved a distance X/Y, one can compute a corresponding distance E/L, calculate overlap, adjust E/L based on the overlap calculation results and convert the results into a revised scale and angle for that channel. Several of these calculations are performed and consistent values in both scale and angle denote good overlaps. The number of calculations required for the revised scale and angle values, used subsequently in the overwriting and merging process, are based on the following: These values are saved to a list that is sorted by angle; the standard deviation of the sale values from the middle one-third of entries is compared to a predetermined threshold value (empirically determined, 0.002 multiplied by the total number of entries and the average scale value). When the standard deviation falls below this threshold, the final revised scale and angle are calculated as:

$$\text{scale} = \sqrt{(\text{SUM}(E*E+L*L)/\text{SUM}(X*X+Y*Y))}$$

$$\theta = \arctan(\text{SUM}(E*Y-L*X)/\text{SUM}(E*X+L*Y)),$$

where SUM refers to the sum of the results of this calculation from each of the entries in the middle one-third of the list.

The process of calculating the revised scale and angle values relies on the collection of at least some images that contain well-defined features such that they can be overlapped with only a rough estimate of scale and angle. The more precisely scale and angle are estimated, the better the correlation between overlapping images and, further, the more likely the system will be able to process poor-quality images such as those somewhat out of focus or with few unique features.

Determining Offsets. The process of determining relative offsets from the initial estimate of alignment between adjacent images comprises, in general, a comparison of shapes—as opposed to intensity—of data within each region of overlap. This may be achieved with a Cross-Correlation Function (CCF) performed through a Fast Fourier Transformation (FFT). A Laplacian filter is first applied to the data. The FFT for each of the overlapping areas in adjacent images is computed and the transform (frequency) coefficients are multiplied in a point-wise manner, frequency whitening is performed (i.e., normalization of transform coefficients to unit magnitude (length)); finally, an inverse FFT of this product is performed to yield the CCF in image space. The CCF is thus based only on phase information and is less sensitive to changes in image intensity. If only intensity data were used, the correlation could be dominated by a few very bright spots and not represent the best alignment of other features in the images. The transformation thus ensures that all features are used for correlation while minimizing the effects of extreme intensity variation for purposes of precisely positioning two images with respect to one another.

Because of the large number of images being processed, calculating the CCF through a FFT is rapid and less laborious than calculating the normalized CCF in image space. The latter calculation, dividing the CCF by the local root mean square (RMS) energy at each point, is conventionally used to grade the CCF result. Performing the calculation in frequency space instead, according to embodiments of the present disclosure, allows other filters such as frequency (spectral) whitening to be applied. While it has been used successfully, a disadvantage to this approach alone is that all transform components are weighted equally, rather than being weighted based on their significance. The best prefiltering has been found to be approximately Laplacian rather than pure whitening, thus a Laplacian filter is applied before the inverse FFT is performed to generate the CCF. Several enhancements to this basic method are used to increase robustness and accuracy according to various embodiments of the disclosure.

The FFT and CCF. To prepare the data for the FFT and CCF, image data in the overlapping regions (no more than 20 percent) of two images are copied into separate work areas, thus creating from each full image a separate sub-image of its overlapping region.

The average intensity within each sub-image itself is calculated and is used to normalize the pixel intensity values in each of the respective sub-images. Pixel intensity values greater than the average intensity for the sub-image are normalized to an average value of zero by taking the natural logarithm of the ratio of the pixel intensity to average intensity, while pixel intensity values smaller than the average intensity have the average intensity subtracted from and then divided into them:

If Intensity Value>Ave [i.e., brighter than average]: ln(Value/Ave), and if Intensity Value<Ave [i.e., dimmer than average]: (Value/Ave)−1.0 where Value is the pixel intensity value and Ave is the average intensity of the sub-image in which that pixel is located. The result is a transformation with continuous first derivative which minimizes the effects of very bright features while preserving all features.

To overcome the periodic nature of the FFT, a standard procedure employed to prepare the data for this procedure is to add fill-areas containing zeros around the sub-images being compared. An algorithm has been designed to improve upon this standard method by preventing the creation of an artifact pattern which could lead to a falsely high correlation and, thus, imprecisely determine alignment position. In particular, the algorithm addresses the substitution of pad-areas containing artificial data for some of the fill-areas containing zeros in the standard procedure.

For each of the sub-images, a pad-area—a border, e.g., of up to about 100 pixels in width—is added to the sub-image along the two edges that, in the full image, would appear as a boundary between overlapping and non-overlapping data. (For purposes of the FFT which assumes the data are periodic, however, it is as if this boarder extends from all four sides of the sub-image, and the border and sub-image data repeat in all directions to infinity.) FIGS. 3A and 3B depict two sub-images (S1 and S2, respectively). As shown in FIG. 3A, the pad-area along the lower edge of S1 (a) is filled vertically with smoothly-interpolated values that range between those along top and bottom in S1. The adjacent fill-area in S1, (b), is filled with zeros; this area extends the length of the sub-image, displacing any interpolated values in (a). The same treatment is applied in the second sub-image (S2, FIG. 3B), with the exception that the locations of the zero-fill-area (b) and the pad-area filled horizontally with interpolated-values (a) are switched. Filling one area vertically and the other horizontally minimizes any contribution of these border areas to the size of the correlation peak while simultaneously removing most of the problems associated with the discontinuities in energy at the edges of the overlapping regions.

Each of the fill- or pad-areas represents a border of a width that may vary depending upon size of sub-image and mechanical error of the system. For speed of processing, the sub-image and border together should be as small as possible to minimize the number of calculations performed yet account for existing mechanical error. For example, given a full image width of 1316 pixels, the border may be 100 pixels wide along the adjacent sides of overlapping regions of the sub-image; this accommodates an error of plus or minus 50 pixels which represents typical mechanical error in the system. This error represents the difference between initial offset estimate and sub-offset calculation due to, for example, slight movement of a microscope slide. Ideally, the border should be no greater than twice the mechanical error. In no case should the border width be larger than that of the sub-image. However, the border width may be greater than 100 pixels if the combined sub-image and border width does not sum to a maximum of 20 percent of the full image. The 20 percent value was chosen because the present system disclosed requires at least 15% of the pixels within the iris area to overlap, in which case there is coincident data for merging the images. The requirement for this degree of overlap virtually guarantees that the area contains some unique features, even on a "clean" slide, to facilitate precise alignment. In a system without an iris, the amount of overlap would need to be roughly twice the mechanical error in the system. For example, if the present system were without an iris a 10 percent overlap (about 100±50 pixels) would suffice, but if mechanical error could be reduced further (plus or minus 25 pixels), a 5 percent overlap would also be sufficient. A lower limit given the current technology is roughly 10 pixels (i.e., 10 rows of full image width or 10 columns of full image height) of true overlap provided the overlapping region contains unique features.

Data in each sub-image work space including the pad- and fill-areas are then transformed from intensity- to frequency space using a subroutine library. The library, which is available on the World Wide Web, provides a very fast implementation of the procedure, for example. The resulting transform coefficients are multiplied point-wise, frequency "whitening" is performed followed by application of a Laplacian filter, and an inverse transformation of the product from frequency to intensity space yields the CCF solution.

Figure 3C:
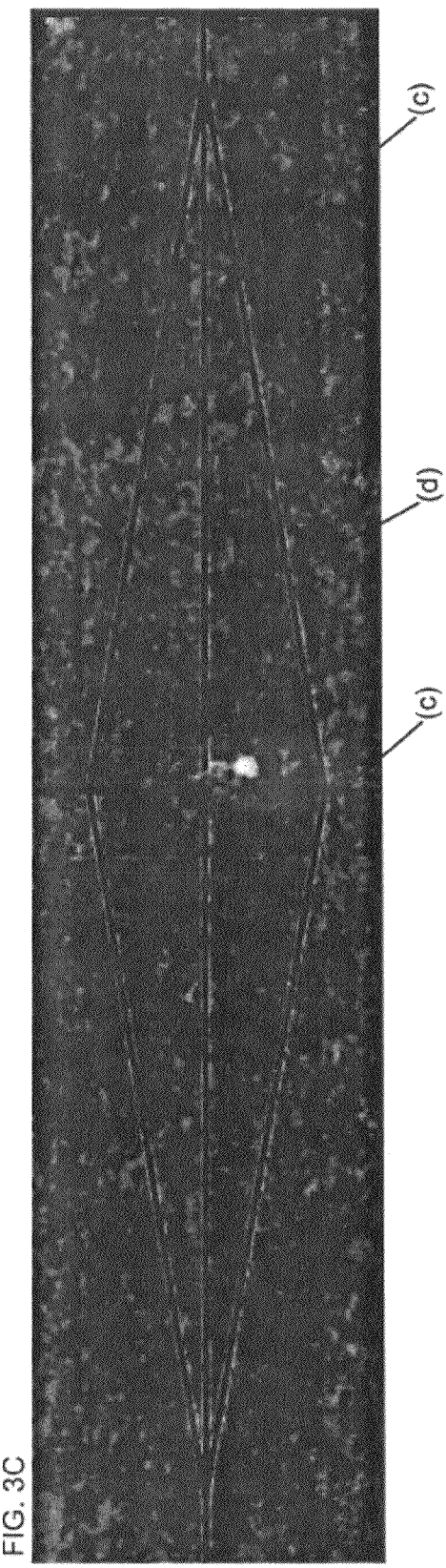
FIG. 3C is a screenshot of the CCF diamond-shaped region that is searched for the correlation peak in the overlapping process as described below.

Search for Correlation Peak. Following the inverse FFT, the resultant CCF image is searched to locate the correlation peak. Peak values (intensities ranging from the true peak value to one half of this value) and initial offset estimates are collected and then fit with a two-dimensional parabola, a model chosen for both its speed and its close approximation to the shape of a Gaussian peak. Application of the Laplacian filter before the inverse FFT "spreads out" the peak to a Gaussian shape allowing its location to be precisely determined to sub-pixel resolution. A pair of sub-offsets is produced, indicative of relative distance in pixels from the (0, 0) position, defining the correlation peak position of best alignment for the images. For example, if the initial LUDL estimate of the offset is (980, 850) and the true offset is (987, 844), the location of this peak is represented by the pair of sub-offsets (−7, 6) vis-à-vis the initial offset estimate, represented by the (0, 0) position. The bounds placed on the search for the correlation peak are such that at least half of the real image data in the two sub-images would still overlap if the initial offset estimate varied by the displacement of the peak within the CCF; this creates a diamond-shaped region to be searched. FIG. 3C shows a screenshot of this region (d), the open area where the cross hairs (c) would intersect at the center representing two images requiring no change in alignment. The bright spot to the lower-right of the intersection represents the Gaussian-shaped correlation peak. The direction and magnitude of the difference between the two represents the error in the initial offset estimate, indicating the shift necessary to bring the two images into more precise alignment. Example 3 provides the code for the overlap program used to align the subimages shown in FIGS. 3A and 3B; the program reads in the "raw" (full) images (not shown) and displays the results as indicated in the introduction to code. The encircled single molecule fragments shown in FIGS. 3A (S1) and 3B (S2) may be used as a sighting reference to illustrate this shift in alignment. Note that a greater portion of the upper of the three encircled fragments is shown in S2 (FIG. 3B) compared to the same fragment in S1 (FIG. 3A)—that greater portion of the fragment being indicative of the direction and magnitude of the shift of S1 to align with S2. The shift is, however, relative since S2 could also be shifted to align with S1. The peak value of the parabolic fit and the deviation (RMS) of the fit from the peak values are used to determine if the correlation is valid. A very good correlation is considered to be greater than or equal to 0.2. A nearly perfect correlation between unique images would be about 0.8. Thus, initial offset estimates are determined for each pair of overlapping images in a group. The CF-corrected (sub-) offsets are added to the initial offset estimate to yield the adjusted E/L distances, calculated for each image using only the revised scale and angle values as discussed below and used in the overwriting and merging process.

Overwriting and merging. The Overwriting and merging component of the autocollection system directs overwriting and virtual merging (mosaicing) of the overlapped areas, resulting in a set of individual overwritten images replacing the flattened images. It also allows a single virtual superimage or montage to be visualized; this superimage reflects the length of the microchannel or other imaged area on the microscope slide, which extends beyond the microscope field of vision. Original raw images are retained for re-processing if necessary.

As each image is collected in succession, an area of the microchannel or other area on the slide containing single molecules and fragments is exposed to a light source. Because there is an overlap up to about 20 percent of the length of the image along both the upper and lower edges of most image frames, if not also along one or both sides of the images, one or more of these overlapped areas is exposed to the light source more than once, leaving the signal in this area "bleached." Thus the intensity values at each pixel within these areas are reduced due at least two if not more exposures. For example, in one embodiment of the present disclosure, if the width of a single microchannel and magnification setting are such that imaging of the entire channel can be achieved with a single column of images, the overlap (upper about 20 percent) portion of all but the first image is exposed to the light source twice, while the lower overlap portion of all images in the column is exposed only once. Overwriting of the pixels restores the strength of the signal to the bleached area(s) of an image by using the sub-offset information to precisely align the regions of overlap. In this example, for each pair of sequential images, this results in the signal from the lower unbleached overlap area of the earlier-collected image replacing the bleached signal in the upper area of the subsequently-collected image. This process is repeated for all images of a group in the overwriting and merging step in embodiments of the present disclosure. As the bleached pixels are overwritten, each overwritten image is saved as an individual file; subsequently, the images are virtually—but not physically—merged with one another to display them in a continuous superimage in this system, reflecting the contents of the microchannel or other imaged area. The overwriting process ensures that the overlapping regions, for example within pairs of sequential images, contain equivalent pixel intensity values.

In addition, to ensure that no abrupt differences between overlapped and non-overlapped regions are introduced in the overwriting process, the data are smoothed in the about 20-pixel-wide transition region surrounding the overlapped regions. This transition region is measured perpendicularly inward from the edge of the non-bleached image which is overwriting the bleached image. Within the transition region, a linear blending of intensity values is achieved such that the values at the edge of the overwritten region are identical to those in the non-overwritten region of the image. This is an important feature of embodiments of the present disclosure, since it ensures that subsequent (newer, more sensitive) software programs used on these images will not detect a difference at this interface to be a restriction site (i.e., cut by a nuclease).

The final set of files resulting from the method and automated collection and processing system includes the original raw images as well as individual merged (overwritten) images, the absolute coordinates of each image, the relative offset values used in the merging step and any other identifying or relevant information for the sample, user or processing of the sample.

The automated collection and processing system according to this disclosure is ergonomically optimized. Established ergonomic principles may be followed as discussed supra. This optimization reduces user response time and increases the overall system efficiency in processing large datasets.

According to this disclosure, the automated collection and processing system in various embodiments may be implemented in different programming languages, including, e.g., C, C++ used in Examples 1-3 and any other comparable languages. Additional embodiments of this disclosure are further described by the following examples, which are only illustrative of the embodiments but do not limit the underlining invention(s) in this disclosure in any manner.

EXAMPLE 1

The Automated Focus Component Routine

The automated focus component routine is written to work with an interface to a CCD camera. Since more than one type of CCD camera may be used, C++ was used to develop an abstract class to encompass a variety of camera classes. During the setup phase the type of camera is queried from the object to determine both allowed binning values and optimal exposure times. The automated focus component object also assumes the existence of a translatable Z axis (motorized objective column), in various embodiments with LUDL access. Some classes that the automated focus component object uses are not documented here (SmoothingSplines for example) but are well understood in the art. The specifics of the LUDL stage controller and varying CCD camera drivers are also accessed through classes (as mentioned supra) and provide for a clearer and more flexible solution.

```
#include <math.h>
#include "AutoFocus.h"
// backlash correction for the focus motor in Motor steps ~10 ludl steps
  #define FOCUS_BACKLASH_COMPENSATION 100

// The default image border edge culling -- often have bad pixels along the
// border -- especially when binning.
  #define DEFAULT_FOCUS_BORDER_SIZE 3

//--------------------------------------------------------------//
// AutoFocus(LuldAccess,CCDAccess,TileSize) -- Constructor     //
//    LudlAccess -- The ludl object -- this allows us to move the focus motor //
//    CCDAccess -- Access to the imaging system. Allows us to capture small //
//           focus images.                                      //
// Algorithm: The basic approach of the autofocus object is to find the edge//
//           energy in each of a series of images. The image with the most//
//           energy in the sequence is the most in focus. The best method //
//           (to date) is to use a Laplacian convolution filter to detect //
//           these edges. The approach is to apply a convolution kernel //
//           to each pixel in the image and divide this result by the   //
//           "energy" under the kernel. Square the answer and you have  //
//           your edge energy.                                  //
//                                                              //
//         -1 -1 -1     1 1 1                                   //
//         -1  8 -1     1 1 1    Result = (Laplacian * Laplacian) / //
//         -1 -1 -1     1 1 1            (Intensity * Intensity)  //
//       Laplacian kernel  Intensity Sum Kernel                 //
//                                                              //
//         A 3*3 kernel works best on a fine focus, where a 5*5 seems to //
//         work better when doing a coarse focus -- it generates a   //
//         smoother curve, thus suppressing background noise which can be //
//         significant in the coarse focus case. It will also suppress //
//         the edge energy that we are looking for, so don't use this //
//         kernel in a fine focus.                              //
//                                                              //
// Second Stage: Due to the fact that clumped DNA, floaters, or scratches //
//         in either the slide or cover slip may result in data //
//         outside of the target focal plane, the results of the //
//         above algorithm are grouped into tiles. Each image in the //
```

```
//          z-stack is placed into a grid of N*M tiles. The convolution results //
//          for each tile in the grid are stored separately. This way,//
//          data that comes into focus in separate focal planes can  //
//          be filtered out. The tiles that contain the "maxima" of //
//          hits are used to generate a focus curve. From this curve, //
//          the target focus location is interpolated.         //
//                                                 //
//-----------------------------------------------------------------//
AutoFocus::AutoFocus(Ludl* LudlAccess, CCD_CAMERA* CCDAccess)
{
// save our Ludl and CCD handles
   this->LudlAccess = LudlAccess;
   this->CCDAccess = CCDAccess;
// Tile and Border size
   this->BorderSize = DEFAULT_FOCUS_BORDER_SIZE;
   this->AppliedBorderSize = DEFAULT_FOCUS_BORDER_SIZE;
// ludl backlash compensation -- leave as a variable so it can be tweaked
   this->FocusBackLashCompensation = FOCUS_BACKLASH_COMPENSATION;
// clear the tiles
   TileLists = NULL;
   TilePeakLocations = NULL;
   TilesWide = 0;
   TilesHigh = 0;
   SlicesAllocated = 0;

// Mask
   TileMask = NULL;
   MaskLeft = 0;
   MaskRight = 0;
   MaskTop = 0;
   MaskBottom = 0;
   CenterOn = true;
// movement targets
   TargetOffsets = NULL;
// Focus Kernel
   NeighborOffsets = NULL;
   NeighborCount = 0;
// final curve results
   LaplacianResults = NULL;
   LaplacianTiledResults = NULL;
   DY = NULL;
   PeakHistogram = NULL;

// make sure our splines are cleared
   LaplacianSpline = NULL;
   LaplacianTiledSpline = NULL;

// set our focus parameters based on the CCD Camera type
   if(CCDAccess)
   {
     switch(CCDAccess->GetCameraType())
     {
      case CCD_CAMERA_NONE:    // No camera found
        break;
      case CCD_CAMERA_PENTAMAX: // Pentamax
        this->TileSize = 8;
        this->ExposureTime = 0.100;
        this->Binning = 6;
        break;
      case CCD_CAMERA_PVCAM:
      case CCD_CAMERA_ORCA:
        this->TileSize = 8;
        this->ExposureTime = 0.020;
        this->Binning = 4;
        break;
     }
   }

// set up some default ludl speeds
   if(LudlAccess && LudlAccess->Valid())
```

```
    {
    // using smaller numbers actually does NOT effect times as much as you would think
    // as the ludl motors never really reach "high speed" except at the beginning and end
    // of the routine (large traversal distances there)
        LudlAccess->SpeedFocusWrite(2500);     // default is 20000 -- setting max speed
        LudlAccess->StartSpeedFocusWrite(250); // default is 5000  -- setting start speed
    }
// Error Log -- stderr unless otherwise specified
    ErrorLog = stderr;

}
//-----------------------------------------------------------//
// ~AutoFocus() -- destructor                              //
//-----------------------------------------------------------//
AutoFocus::~AutoFocus()
{
  // wipe out the allocated focus buffers
  CleanFocusBuffers();
}
//-----------------------------------------------------------//
// double SetFocusExposureTime(double FocusExposureTime)    //
// returns - returns the value that we were able to set     //
//-----------------------------------------------------------//
double AutoFocus::SetFocusExposureTime(double FocusExposureTime)
{
  // verify based on camera -- some have a min focus time
  if(CCDAccess)
    {
    switch(CCDAccess->GetCameraType())
      {
      case CCD_CAMERA_NONE:    // No camera found
        return 0.100;
      case CCD_CAMERA_PENTAMAX: // Pentamax -- less than 100ms (~90 actually) will cause a Hardware/driver lock up
        this->ExposureTime = max(0.100, FocusExposureTime);
        return this->ExposureTime;
      case CCD_CAMERA_PVCAM:
      case CCD_CAMERA_ORCA:
        this->ExposureTime = max(0.001, FocusExposureTime);
        return this->ExposureTime;
      }
    }
  return 0.0;
}
//-----------------------------------------------------------//
// IntializeBuffers() -- initializes the Autofocus buffers, returns if the //
//              buffers are already allocated correctly        //
//-----------------------------------------------------------//
bool AutoFocus::InitializeBuffers(int FocusStepsRequested, int RequestedKernelWidth)
{
  // The CCD must be initialized accurately before running this step
  // 1) determine how many tiles we have in X and Y based on the CCD buffer
  //    dimensions, TileSize and BorderSize
  // 2) Allocate space to store the EdgeEnergy results for each image grid
  // 3) Allocate space to store the tracking info to construct the focus curves // 1) determine how many tiles we have in X and Y based on the CCD buffer
  //    dimensions, TileSize and BorderSize
  if(!CCDAccess->Valid()) return false;

// adjust the border size to work with the kernel width, also adust the kernel to be ODD
    if(!(RequestedKernelWidth % 2))
      RequestedKernelWidth++;

// now the border size
    AppliedBorderSize = max(RequestedKernelWidth / 2, BorderSize);

// so how many tiles
    int RequestedTilesWide = (CCDAccess->GetFocusBufferWidth() - (2 * AppliedBorderSize))
            / TileSize;
```

```
  int RequestedTilesHigh = (CCDAccess->GetFocusBufferHeight() - (2 * AppliedBorderSize))
            / TileSize;

// so, do we need to re-allocate?
 if((RequestedTilesWide != TilesWide) ||
   (RequestedTilesHigh != TilesHigh) ||
   (FocusStepsRequested > SlicesAllocated))
  {
  // clear it all
    CleanFocusBuffers();
  // re-allocate everything....
    TilesWide = RequestedTilesWide;
    TilesHigh = RequestedTilesHigh;
    SlicesAllocated = FocusStepsRequested;
  // List of Grids
    typedef double* lpdouble;
    TileLists = new lpdouble[SlicesAllocated];
    for(int GridNumber = 0; GridNumber < SlicesAllocated; GridNumber++)
     TileLists[GridNumber] = new double[TilesWide * TilesHigh];
  // Focus peak calc's
    TilePeakLocations = new int[TilesWide * TilesHigh];
  // Motor move offsets
    TargetOffsets = new double[SlicesAllocated];
    DY = new double[SlicesAllocated];
  // Final Laplacian results to be splined
    LaplacianResults = new double[SlicesAllocated];
    LaplacianTiledResults = new double[SlicesAllocated];
  // Peak tracking (can view count here now)
    PeakHistogram = new int[SlicesAllocated];
  // flag to reset the rest as well
    KernelWidth = -1;
    ResetFocusMask = true;
  }

// Focus Kernel alteration
 if(RequestedKernelWidth != KernelWidth)
  {
  // define the focus kernel
    KernelWidth = RequestedKernelWidth;
    delete NeighborOffsets;
    int FocusBufferWidth = CCDAccess->GetFocusBufferWidth();
    NeighborCount = KernelWidth * KernelWidth - ((KernelWidth - 2) * (KernelWidth - 2));
    NeighborOffsets = new int[NeighborCount];
    int index = 0;
    int KernelRadius = KernelWidth / 2;
    for(int y = -KernelRadius; y <= KernelRadius; y++)
     for(int x = -KernelRadius; x <= KernelRadius; x++)
       {
       if(y == KernelRadius || x == KernelRadius || y == -KernelRadius || x == -KernelRadius)
        {
        NeighborOffsets[index] = y * FocusBufferWidth + x;
        index++;
        }
       }
  }
// Set up the focus mask
 if(ResetFocusMask)
  {
  // Masking
    delete TileMask;
    TileMask = new bool[TilesWide * TilesHigh];
  // has it been set? If not default to full screen
    if(!MaskRight && !MaskBottom)
     {
     MaskLeft = 0;
     MaskRight = TilesWide - 1;
     MaskTop = 0;
     MaskBottom = TilesHigh - 1;
     CenterOn = true;
     }
```

```
    int MaskWidth = MaskRight - MaskLeft + 1;
    int MaskHeight = MaskBottom - MaskTop + 1;
    if(CenterOn)
      UnMaskedCells = MaskWidth * MaskHeight;
    else
      UnMaskedCells = TilesWide * TilesHigh - MaskWidth * MaskHeight;

for(int y = 0; y < TilesHigh; y++)
      for(int x = 0; x< TilesWide; x++)
      {
        if((y >= MaskTop) && (y <= MaskBottom) &&
          (x >= MaskLeft) && (x <= MaskRight))
        {
          TileMask[y * TilesWide + x] = CenterOn;
        }
        else
          TileMask[y * TilesWide + x] = !CenterOn;
      }
  // Done
    ResetFocusMask = false;
  }
// done
  return true;
}
//----------------------------------------------------------//
// CleanFocusBuffers() -- clean up the current focus buffers.   //
//----------------------------------------------------------//
void AutoFocus::CleanFocusBuffers(void)
{
// List of Grids
  if(TileLists)
  {
    for(int GridNumber = 0; GridNumber < SlicesAllocated; GridNumber++)
      delete TileLists[GridNumber];
    delete TileLists;
    TileLists = NULL;
  }
// Tile masking
  delete TileMask;
  TileMask = NULL;
// clear the neighbors array
  delete NeighborOffsets;
  NeighborOffsets = NULL;
// Focus peak calc's
  delete TilePeakLocations;
  TilePeakLocations = NULL;
// Motor move offsets
  delete TargetOffsets;
  TargetOffsets = NULL;
// Final Laplacian results to be splined
  delete LaplacianResults;
  LaplacianResults = NULL;
  delete LaplacianTiledResults;
  LaplacianTiledResults = NULL;
  delete DY;
  DY = NULL;
// clean the splines
  delete LaplacianSpline;
  LaplacianSpline = NULL;
  delete LaplacianTiledSpline;
  LaplacianTiledSpline = NULL;
// no more peak histogram
  delete PeakHistogram;
  PeakHistogram = NULL;
}
//----------------------------------------------------------//
// SetFocusMask(float IndentPercent, bool CenterValue)          //
// Tile in the range of LEFT--RIGHT and TOP--BOTTOM are set to CENTERVALUE, //
// the remaining tiles are set to !CENTERVALUE                  //
//----------------------------------------------------------//
```

```
void AutoFocus::SetFocusMask(float IndentPercent, bool CenterValue)
{
// don't let it range too far! And convert to a fraction
   IndentPercent = max( 0.0f, min(IndentPercent, 100.0f)) / 100.0f;

// validate ranges
   MaskLeft = max(0, (int)((TilesWide - 1) * IndentPercent));
   MaskRight = min(TilesWide - 1, (int)((TilesWide - 1) * (1.0 - IndentPercent)));
   MaskTop = max(0, (int)((TilesHigh - 1) * IndentPercent));
   MaskBottom = min(TilesHigh - 1, (int)((TilesHigh - 1) * (1.0 - IndentPercent)));
   CenterOn = CenterValue;
   ResetFocusMask = true;
}
//----------------------------------------------------------//
// LaplacianFocusAlgorithm(ImageNumber) -- does a Laplacian filter on the   //
//    ImageNumber buffer in the CCDAccess object. The results are stored in //
//    the Tile array associated with that ImageNumber.                      //
// -1 -1 -1                                                                 //
// -1  8 -1  LaPlacian Filter on each pixel -- with some small border to    //
// -1 -1 -1       omit edge noise of CCD chip                               //
//    Square the result for each pixel. Also keep a sum of the squares of   //
//    the intensities of each pixel for normalization.                      //
//    now Divide the SumofSquares of the filtered pixels by the SumOfSquares//
//    of the intensity pixels to remove the illumination dependence         //
//----------------------------------------------------------//
void AutoFocus::LaplacianFocusAlgorithm(int ImageNumber)
{
// access the CCDBuffer
   unsigned short* FocusData = CCDAccess->GetFocusData(ImageNumber);
   int FocusBufferWidth = CCDAccess->GetFocusBufferWidth();
   int FocusBufferHeight = CCDAccess->GetFocusBufferHeight();
// padding from edges (center in image as much as possible)
   int LeftPad = AppliedBorderSize + ((FocusBufferWidth - AppliedBorderSize * 2) % TileSize) / 2;
   int TopPad = AppliedBorderSize + ((FocusBufferHeight - AppliedBorderSize * 2) % TileSize) / 2;
   int LineAdjust = FocusBufferWidth - TileSize;

// which is our Target Grid?
   double* Grid = TileLists[ImageNumber];

// Traverse the image
   int Cell = 0;
   for(int h = 0; h < TilesHigh; h++)
   {
   for(int w = 0; w < TilesWide; w++)
   {
   // skip if masked off
      if(!TileMask[Cell])
      {
         Grid[Cell] = 0.0;
         Cell++;
         continue;
      }
   // variables to track in our algorithm
      double EdgeEnergy = 0.0;
   // offset tracking
      int TileCornerOffset = ((h * TileSize + TopPad) * FocusBufferWidth) +
                             (w * TileSize + LeftPad);
   // raw data pointer is then...
      unsigned short* Data = &FocusData[TileCornerOffset];

// calc the laplacian values for the entire tile space.
      for(int Height = 0; Height < TileSize; Height++)
      {
      for(int Width = 0; Width < TileSize; Width++)
      {
      // energy below this tile
         int IntensityEnergy = 1 + (*Data);
         int Value = NeighborCount * (*Data);
         for(int n = 0; n < NeighborCount; n++)
         {
```

```
            int I = *(Data + NeighborOffsets[n]);
            IntensityEnergy += I * I;
            Value -= I;
          }
       // Add up the energy
          EdgeEnergy += ((double)Value * (double)Value) / (double)IntensityEnergy;
       // Next data point
          Data++;
        } // Width (tile)
       // advance to next row
          Data += LineAdjust;
        } // Height (tile)
     // set the tiles value into the grid
        Grid[Cell] = EdgeEnergy;
        Cell++;
      } // TilesWide
    } // TilesHigh
}
//------------------------------------------------------------//
// IFocusAlgorithm(ImageNumber) -- focus by intensity only    //
//------------------------------------------------------------//
void AutoFocus::IFocusAlgorithm(int ImageNumber)
{
// access the CCDBuffer
   unsigned short* FocusData = CCDAccess->GetFocusData(ImageNumber);
   int FocusBufferWidth = CCDAccess->GetFocusBufferWidth();
   int FocusBufferHeight = CCDAccess->GetFocusBufferHeight();
// padding from edges (center in image as much as possible)
   int LeftPad = AppliedBorderSize + ((FocusBufferWidth - AppliedBorderSize * 2) % TileSize) / 2;
   int TopPad = AppliedBorderSize + ((FocusBufferHeight - AppliedBorderSize * 2) % TileSize) / 2;
   int LineAdjust = FocusBufferWidth - TileSize;

// which is our Target Grid?
   double* Grid = TileLists[ImageNumber];

// Traverse the image
   int Cell = 0;
   for(int h = 0; h < TilesHigh; h++)
   {
    for(int w = 0; w < TilesWide; w++)
    {
     // skip if masked off
      if(!TileMask[Cell])
        {
          Grid[Cell] = 0.0;
          Cell++;
          continue;
        }
     // offset tracking
        int TileCornerOffset = ((h * TileSize + TopPad) * FocusBufferWidth) +
                    (w * TileSize + LeftPad);
     // raw data pointer is then...
        unsigned short* Data = &FocusData[TileCornerOffset];
        int TotalIntensity = 0;
     // calc the laplacian values for the entire tile space.
        for(int Height = 0; Height < TileSize; Height++)
        {
          for(int Width = 0; Width < TileSize; Width++)
          {
           // energy below this tile
            int Value = *(Data + FocusBufferWidth + 1);
            TotalIntensity = max(Value, TotalIntensity);
           // Next data point
            Data++;
          } // Width (tile)
         // advance to next row
            Data += LineAdjust;
        } // Height (tile)
     // set the tiles value into the grid
        Grid[Cell] = TotalIntensity;
```

```
     Cell++;
    } // TilesWide
   } // TilesHigh
 }
//---------------------------------------------------------//
// AnalyzeSlopes() analyzes the TileLists[] to determine between slices,  //
// where the energy terms are headed.                                     //
// We want to track all of the tiles that form a majority and are headed  //
// into focus (rising slope) or out of focus(decreasing slope) together.  //
// An absolute slope check is too variable, so calculate a standard deviation//
// and call anything within an SDev of 0.0 a 0 slope (indeterminate)      //
//---------------------------------------------------------//
bool AutoFocus::AnalyzeSlopes(void)
{
 // use the following throughout -- how many cells are there in our image?
   int Cells = TilesWide * TilesHigh;
 // Step one -- analyze each slice looking for a distinct peak, as more than
 //         one peak is giving us ambiguous information.
 //      -- this peak is found by finding a point with a lesser value on it's left
 //         and a lesser value on it's right
 // Step 2 -- Find the most common peak location -- this is the definition of
 //         being in focus. Keep anything that has a peak within 1 bin of
 //         our mode in the "Histogram"
 // For now we're taking the location of "THE" peak, as removing information tends to be
 // dangerous and is causing strange results in extreme cases. The algorithm tends
 // to be more stable if we just use step 2 to remove outliers.
   for(int Cell = 0; Cell < Cells; Cell++)
    {
    // skip if masked off
     if(!TileMask[Cell])
        {
        TilePeakLocations[Cell] = -1;
        continue;
        }
    // where is the peak FOR THIS CELL
      int PeakIndex = -1;
    // the intensity value of that peak
      double Peak1 = -99999.0;
    // the intensity value of the runner up
      double Peak2 = -99999.0;
    // "Left" is the valud in the slice at index - 1
    // "Center" is the value in the slice at index
    // "Right" is the value in the slice at index + 1
      double Left;
      double Center = TileLists[0][Cell];
      double Right = TileLists[1][Cell];
    // are we starting with a "Left most" peak
      if(Center > Right)
        {
        Peak1 = Center;
        PeakIndex = 0;
        }
    // progress through this slice
      for(int ImageNumber = 1; ImageNumber < ImagesCaptured - 1; ImageNumber++)
        {
        // shift over one unit
         Left = Center;
         Center = Right;
         Right = TileLists[ImageNumber + 1][Cell];
        // are we a peak?
         if(Left < Center && Right < Center)
           {
           if(Center > Peak2) // bigger than our runner up?
              {
              if(Center > Peak1) // than our first peak?
                {
                Peak2 = Peak1; // yup so shift down one and place
                Peak1 = Center; // the new center as the peak
                PeakIndex = ImageNumber; // track our peak
                }
```

```
            else Peak2 = Center; // just replace the runner up
          } // larger then the runner up peak value (peak2)
        } // it's a peak
      } // traverse the entire slice
      // are we ending with a "Right most" peak
      Left = Center;
      Center = Right;
      if(Center > Left)    // right side has a rising slope
      {
        if(Center > Peak1) // is the height greater than our first found peak?
        {
          // Peak1 = Center; // the new center as the peak
          PeakIndex = ImagesCaptured - 1; // track our peak (index)
        } // have a stonger peak (than peak1)
      } // have a right most peak
      // Store the index of the peak for this slice in the image
      TilePeakLocations[Cell] = PeakIndex;
    } // Cell // Step 2 -- Find the most common peak location -- this is the definition of
    //       being in focus. Keep anything that has a peak within 1 bin of
    //       our mode in the "Histogram".
    ValidPeakTiles = 0;
    memset(PeakHistogram, 0, sizeof(int) * ImagesCaptured);
    // fill the Histogram with our index values
    for(int Cell = 0; Cell < Cells; Cell++)
    {
      // skip if masked off
      if(!TileMask[Cell]) continue;
      // otherwise tabulate the peak
      if(TilePeakLocations[Cell] != -1) // skip the "no-peak" case -- pretty close to impossible?
      {
        PeakHistogram[TilePeakLocations[Cell]]++;
        ValidPeakTiles++;
      }
    }
    // find the peak
    int MaxHits = 0;
    int MaxIndex = -1;
    for(int ImageNumber = 0; ImageNumber < ImagesCaptured; ImageNumber++)
    {
      if(PeakHistogram[ImageNumber] > MaxHits)
      {
        MaxHits = PeakHistogram[ImageNumber];
        MaxIndex = ImageNumber;
      }
    }
    // remove anything that isn't a peak or adjacent to the peak
    for(int Cell = 0; Cell < Cells; Cell++)
    {
      if(!TileMask[Cell]) continue;
      if(((TilePeakLocations[Cell] < MaxIndex - 1) ||
          (TilePeakLocations[Cell] > MaxIndex + 1)) &&
          (TilePeakLocations[Cell] != -1))
      {
        TilePeakLocations[Cell] = -1;  // invalidate it
        ValidPeakTiles--;
      }
    }

// if there are any tiles left return true -- has to be true actually, but
    // keep this return value in, in case we alter the algorithm more in the future
    if(ValidPeakTiles)
      return true;

// otherwise this algorithm has failed
    return false;
  }

//---------------------------------------------------------------//
```

```
// int DoFocus(Steps, StepSize)                                    //
// Steps -- number of focus slices to take (depth of z-stack)      //
// StepSize -- how many ludl micro-steps between each slice        //
// returns FOCUS_FAIL on failure                                   //
// Otherwise it returns the number of steps that the stage had to be moved //
// to bring the image into focus. (dFocus steps between last location and //
//                      this location)                             //
//---------------------------------------------------------------//
int AutoFocus::DoFocus(int Steps,int StepSize,int RequestKernelWidth, bool UseTiledSpline)
{
// #define FOCUS_TIMING_ECHO 1
// #define FOCUS_TIMING_ECHO_2
#ifdef FOCUS_TIMING_ECHO
  LARGE_INTEGER PerformanceFrequency;
  LARGE_INTEGER StartFirstMove, StartSetup, DoneFocusSetup;
  LARGE_INTEGER DoneFocusSequence, DoneAnalysis, DoneFinalMove;
  #ifdef FOCUS_TIMING_ECHO_2
    LARGE_INTEGER SendTrigger, VValidReceived, FrameEndReceived, AnalysisDone, LudlMoveDone;
    double VValidTime = 0;
    double FrameEndTime = 0;
    double AnalysisDoneTime = 0;
    double LudlMoveDoneTime = 0;
  #endif
  PerformanceFrequency.QuadPart = 0;
  QueryPerformanceFrequency(&PerformanceFrequency);
endif // just beginning, so clear the count
  ImagesCaptured = 0;

// First move to place us at the start of our run -- half the distance covered
  int FirstMotorMove = -((Steps - 1) * StepSize) / 2;

// Timing of our capture
// 1) Move to Start position + BackLashCompensationDistance  (LUDL)
// 2) Initiate move to real Focus Start Position             (LUDL)
//  2a) Initialize Focus mode -- paramaters set already      (CCD)
//  2b) Poll wait for move complete                          (LUDL)
// 3) Start focus image exposure                             (CCD)
//  3a) Wait for the FocusMoveSafe() signal                  (CCD)
//  3b) Full move to next focus location                     (LUDL)
//  3c) Analyze tile - 2 (we are sure this ones in buffer)   (AUTOFOCUS)
//  3d) Make sure ludl done moveing
//  3e) loop to 3 until all images acquired
// 4) Wait and analyze final image                           (CCD/AUTOFOCUS)
// 5) Stop Focus Sequence                                    (CCD)
// 6) Construct the Focus curve and pick the target point    (AUTOFOCUS)
// 7) Move to the predicted point and return                 (LUDL)
//   DONE // 1) Move to Start position + BackLashCompensationDistance  (LUDL)
  #ifdef FOCUS_TIMING_ECHO
    QueryPerformanceCounter(&StartFirstMove);
  #endif
  LudlAccess->MoveFocusMotorPulses(FirstMotorMove - FocusBackLashCompensation, true);
// 2) Initiate move to real Focus Start Position             (LUDL)
  LudlAccess->MoveFocusMotorPulses(FocusBackLashCompensation, false);
//  2a) Initialize Focus mode                                (CCD)
  #ifdef FOCUS_TIMING_ECHO
    QueryPerformanceCounter(&StartSetup);
  #endif
  CCDAccess->SetFocusParameters(Binning, ExposureTime, Steps);
  if(!CCDAccess->StartFocus())
    return FOCUS_FAILED;

#ifdef FOCUS_TIMING_ECHO
    QueryPerformanceCounter(&DoneFocusSetup);
  #endif
// Initialize internal buffers -- if needed
```

```
  InitializeBuffers(Steps, RequestKernelWidth);
// 2b) Poll wait for move complete              (LUDL)
  int LudlBusy = 1;
  while(LudlBusy) LudlAccess->BusyFocus(&LudlBusy);
// 3) Start focus image exposure                (CCD)
  while(ImagesCaptured < Steps)
  {
  // Capture the image
    #ifdef FOCUS_TIMING_ECHO_2
       QueryPerformanceCounter(&SendTrigger);
    #endif
    CCDAccess->CaptureFocusImage();
  // 3a) Wait for the FocusMoveSafe() signal    (CCD)
    if(!CCDAccess->FocusMoveSafe())
    {
    // event failed for some reason -- try again
    // ORCA -- trigger error
    // PENTAMAX -- Shouldn't happen -- CCD_PENTAMAX should be waiting for return signal
      if(!CCDAccess->Valid())
      {
      fprintf(ErrorLog, "AUTO_FOCUS::Camera failed during focus sequence.\n");
      return FOCUS_FAILED;
      }
      continue;
    }
  // make sure camera is still okay!
    #ifdef FOCUS_TIMING_ECHO_2
       QueryPerformanceCounter(&VValidReceived);
    #endif // 3b) Full move to next focus location       (LUDL)
    if(ImagesCaptured < Steps - 1)
      LudlAccess->MoveFocusMotorPulses(StepSize, false);

// 3c) Analyze the image
  // i) wait for it to be in buffer (for sure)
  //    this assumes the MoveFocusMotorPulses will take longer
  //    than the CCD transfer + analysis
  //    Analysis ~20 ms (on 433mHZ pentium) and transfer the same or less
  //    Move ~60 ms so assumption seems to be safe since transfer on a binned
  //    image is less than 40ms
  // ii) analyze it
    // i) wait
    if(ImagesCaptured > 0)
    {
    // make sure it's in!
      while(!CCDAccess->FocusImageCaptured(ImagesCaptured - 1));
      #ifdef FOCUS_TIMING_ECHO_2
        QueryPerformanceCounter(&FrameEndReceived);
      #endif
    // ii) analyze
      LaplacianFocusAlgorithm(ImagesCaptured - 1);
      #ifdef FOCUS_TIMING_ECHO_2
        QueryPerformanceCounter(&AnalysisDone);
      #endif
    }

// 3d) Make sure ludl done moving
    LudlBusy = 1;
    while(LudlBusy) LudlAccess->BusyFocus(&LudlBusy);
    #ifdef FOCUS_TIMING_ECHO_2
      QueryPerformanceCounter(&LudlMoveDone);
    // concatenate the times
      if(ImagesCaptured > 0)
      {
      VValidTime += (double)((VValidReceived.QuadPart - SendTrigger.QuadPart) * 1000) / (double) PerformanceFrequency.QuadPart;
      FrameEndTime += (double)((FrameEndReceived.QuadPart - VValidReceived.QuadPart) * 1000) / (double) PerformanceFrequency.QuadPart;
      AnalysisDoneTime += (double)((AnalysisDone.QuadPart - FrameEndReceived.QuadPart) * 1000) / (double) PerformanceFrequency.QuadPart;
```

```
        LudlMoveDoneTime += (double)((LudlMoveDone.QuadPart - AnalysisDone.QuadPart) * 1000) / (double)
PerformanceFrequency.QuadPart;
        }
        else
        {
            VValidTime += (double)((VValidReceived.QuadPart - SendTrigger.QuadPart) * 1000) / (double) PerformanceFrequency.QuadPart;
            LudlMoveDoneTime += (double)((LudlMoveDone.QuadPart - VValidReceived.QuadPart) * 1000) / (double)
PerformanceFrequency.QuadPart;
        }
    #endif // 3e) loop to 3 until all images acquired
        ImagesCaptured++;
    }
    // 4) Wait and then analyze final image
    while(!CCDAccess->FocusImageCaptured(ImagesCaptured - 1));
    #ifdef FOCUS_TIMING_ECHO_2
        QueryPerformanceCounter(&FrameEndReceived);
        FrameEndTime += (double)((FrameEndReceived.QuadPart - LudlMoveDone.QuadPart) * 1000) / (double)
PerformanceFrequency.QuadPart;
    #endif
        LaplacianFocusAlgorithm(ImagesCaptured - 1);
    #ifdef FOCUS_TIMING_ECHO_2
        QueryPerformanceCounter(&AnalysisDone);
        AnalysisDoneTime += (double)((AnalysisDone.QuadPart - FrameEndReceived.QuadPart) * 1000) / (double)
PerformanceFrequency.QuadPart;
    #endif // 5) Stop the focus sequence
    CCDAccess->StopFocusCapture();
    #ifdef FOCUS_TIMING_ECHO
        QueryPerformanceCounter(&DoneFocusSequence);
    #endif // 6) Construct the Focus curve and pick the target point    (AUTOFOCUS)
    // 7) Move to the predicted point and calculate confidence        (LUDL)
    int FocusTarget = ReturnFocusTarget(Steps, StepSize, UseTiledSpline);

// Finally done with all of that mess.... so now go ahead and move to new position
    #ifdef FOCUS_TIMING_ECHO
        QueryPerformanceCounter(&DoneAnalysis);
    #endif
    LudlAccess->MoveFocusMotorPulses(FocusTarget - FocusBackLashCompensation, true);
    LudlAccess->MoveFocusMotorPulses(FocusBackLashCompensation, true);

#ifdef FOCUS_TIMING_ECHO
        QueryPerformanceCounter(&DoneFinalMove);
    // Now echo the times
        double FirstMoveTime = (double)((StartSetup.QuadPart - StartFirstMove.QuadPart) * 1000) / (double) PerformanceFrequency.QuadPart;
        double SetupTime = (double)((DoneFocusSetup.QuadPart - StartSetup.QuadPart) * 1000) / (double) PerformanceFrequency.QuadPart;
        double FocusSequenceDone = (double)((DoneFocusSequence.QuadPart - DoneFocusSetup.QuadPart) * 1000) / (double)
PerformanceFrequency.QuadPart;
        double AnalDone = (double)((DoneAnalysis.QuadPart - DoneFocusSequence.QuadPart) * 1000) / (double) PerformanceFrequency.QuadPart;
        double FinalMoveDone = (double)((DoneFinalMove.QuadPart - DoneAnalysis.QuadPart) * 1000) / (double)
PerformanceFrequency.QuadPart;
        double TotalTime = (double)((DoneFinalMove.QuadPart - StartFirstMove.QuadPart) * 1000) / (double) PerformanceFrequency.QuadPart;
        fprintf(ErrorLog,"Mv1 %4i Set %4i FS %4i Anal %4i Mv2 %4i  Total %4i\n",
            (int)FirstMoveTime, (int)SetupTime, (int)FocusSequenceDone,
            (int)AnalDone, (int)FinalMoveDone, (int)TotalTime);
    #ifdef FOCUS_TIMING_ECHO_2
        fprintf(stdout,"Focus Break Down -- VValid %4i FrameEnd %4i AnalysisDone %4i LudlDone %4i\n",
            (int)VValidTime, (int)FrameEndTime, (int)AnalysisDoneTime, (int)LudlMoveDoneTime);
    #endif
    #endif // and return the amount we've changed
    return (FocusTarget +((Steps - 1) * StepSize) / 2);
}
//--------------------------------------------------------------//
```

```
// ReturnFocusTarget(Steps, StepSize) -- Find the best location to call    //
//                      "In Focus" based on the two curves  //
//---------------------------------------------------------------//
int AutoFocus::ReturnFocusTarget(int Steps, int StepSize, bool UseTiledSpline)
{
// Also calculate the confidence.
// Find the Max (point of best focus) in both curves
// If the two curves are in agreement select the TILED result
// If the two curves disagree, Move to the point with the smallest delta from center
  bool FocusResult = AnalyzeSlopes();
// build curves regardless of success or failure (has both)
  BuildCurves(StepSize);

double EndX = (Steps - 1) * StepSize;
  double CurveMax = 0.0;
  double BestFocus = 0.0;
  double CurveMaxTiled = 0.0;
  double BestFocusTiled = 0.0;
// Full Spline
  for(double x = 0.0; x <= EndX; x += 1.00)
    {
    double value = LaplacianSpline->GetValue(x, 0);
    if(value > CurveMax)
      {
      CurveMax = value;       // keep our current max
      BestFocus = x;          // peak located at
      }
    }
// Tiled Spline
  for(double x = 0.0; x <= EndX; x += 1.00)
    {
    double value = LaplacianTiledSpline->GetValue(x, 0);
    if(value > CurveMaxTiled)
      {
      CurveMaxTiled = value;       // keep our current max
      BestFocusTiled = x;          // peak located at
      }
    }
// calculate how much we shifted from our last position -- assumes the center
// of our curve was the last focal plane
  int ChangeFromCenter = BestFocus - ((Steps - 1) * StepSize) / 2;
  int ChangeFromCenterTiled = BestFocusTiled - ((Steps - 1) * StepSize) / 2;
// default target if we fail
  int FocusTarget = -((Steps - 1) * StepSize) / 2;
// If the tiled spline is valid proceed by analyzing the results based on both curves
  if(FocusResult && UseTiledSpline)
    {
    // how close to agreeing are they?
    int dFocus = BestFocusTiled - BestFocus;
    dFocus = max(dFocus, -dFocus);
    // Confidence
    FocusConfidence = 1.0 - (float)dFocus / (float)(StepSize * Steps / 2);
    // if within a step, pick the TILED solution
    if(dFocus < StepSize)
      FocusTarget = -(((Steps - 1) * StepSize) - BestFocusTiled);
    else
      {
      // which is closest to center?
      if(ChangeFromCenter < ChangeFromCenterTiled)
        FocusTarget = -(((Steps - 1) * StepSize) - BestFocus);
      else
        FocusTarget = -(((Steps - 1) * StepSize) - BestFocusTiled);
      }
    }
// if the TilesSpline is invalid, use the fall back spline.
// or if we are forced to use this mode (iris/bright image focus)
  else
    {
    // from the Full mask spline
    FocusTarget = -(((Steps - 1) * StepSize) - BestFocus);
```

```
    }
// so the Target is
    return FocusTarget;
}
//―――――――――――――――――――――――――//
// BuildCurves(StepSize) -- how large is each step to set the position array //
//                       correctly.                                          //
//―――――――――――――――――――――――――//
void AutoFocus::BuildCurves(int StepSize)
{
// now fill the array -- (used to build spline)
    TargetOffsets[0] = 0; // obviously no offset here!
    for(int StepIndex = 1; StepIndex < ImagesCaptured; StepIndex++)
        TargetOffsets[StepIndex] = TargetOffsets[StepIndex - 1] + StepSize;

// how many cells?
    int Cells = TilesWide * TilesHigh;

// set our result arrays
    for(int Image = 0; Image < ImagesCaptured; Image++)
    {
    // clear to start
        LaplacianResults[Image] = 0.0;
        LaplacianTiledResults[Image] = 0.0;
    // add up each slice
        double* List = TileLists[Image];
        for(int Cell = 0; Cell < Cells; Cell++)
        {
        // skip if masked
            if(!TileMask[Cell]) continue;
        // just integrate the edge value for the entire image space
            LaplacianResults[Image] += List[Cell];
        // only integrate for valid cells
            if(TilePeakLocations[Cell] != -1)
                LaplacianTiledResults[Image] += List[Cell];
        } // all cells in an image
    } // all images // reset the Laplacian spline -- set up our DY terms first (Full image)
// 1) First round RMS of the first derivative
    double RMSdy = 0.0;
    for(int Image = 1; Image < ImagesCaptured; Image++)
    {
        double dy = (LaplacianResults[Image] - LaplacianResults[Image - 1]);
        RMSdy += dy * dy;
    }
    RMSdy = sqrt(RMSdy / (ImagesCaptured - 1));
// 2) Throw out the outliers
    double ValidPoints = 0.0;
    double SmoothSum = 0.0;
    for(int Image = 1; Image < ImagesCaptured; Image++)
    {
        double dy = (LaplacianResults[Image] - LaplacianResults[Image - 1]);
        dy = max(dy, -dy);
        if(dy < RMSdy)
        {
            SmoothSum += dy;
            ValidPoints++;
        }
    }
    if(ValidPoints)
    {
        SmoothSum /= ValidPoints;
        if(SmoothSum < 1.0)
            SmoothSum *= SmoothSum;
        else
            SmoothSum = sqrt(SmoothSum);
    }
    else
        SmoothSum = 1.0; // min will handle this in the set step
```

```
// 3) Set the DY terms -- don't allow to be more than 50% of the actual dy
  for(int Image = 1;Image < ImagesCaptured - 1; Image++)
    DY[Image] = SmoothSum / 100.0;
  // anchor the ends
    DY[0] = SmoothSum / 1000.0;
    DY[ImagesCaptured - 1] = SmoothSum / 1000.0;
// 4) finally allocate them if they don't exist, or just reset them if they do..
  if(!LaplacianSpline)
    LaplacianSpline=new SmoothSpline(TargetOffsets, LaplacianResults, DY, ImagesCaptured, ImagesCaptured);
  else
    LaplacianSpline->ResetSpline(TargetOffsets, LaplacianResults, DY, ImagesCaptured, ImagesCaptured);

// reset the Tiled Laplacian spline -- set up our DY terms first
// 1) First round RMS of the first derivative
  RMSdy = 0.0;
  for(int Image = 1; Image < ImagesCaptured; Image++)
  {
    double dy = (LaplacianTiledResults[Image] - LaplacianTiledResults[Image - 1]);
    RMSdy += dy * dy;
  }
  RMSdy = sqrt(RMSdy / (ImagesCaptured - 1));
// 2) Throw out the outliers -- take the MEAN of the remainder, not the RMS
  ValidPoints = 0.0;
  SmoothSum = 0.0;
  for(int Image = 1; Image < ImagesCaptured; Image++)
  {
    double dy = (LaplacianTiledResults[Image] - LaplacianTiledResults[Image - 1]);
    dy = max(dy, -dy);
    if(dy < RMSdy)
    {
      SmoothSum += dy * dy;
      ValidPoints++;
    }
  }
  if(ValidPoints)
  {
    SmoothSum /= ValidPoints;
    if(SmoothSum < 1.0)
      SmoothSum *= SmoothSum;
    else
      SmoothSum = sqrt(SmoothSum);
  }
  else
    SmoothSum = 1.0; // min will handle this in the set step
// 3) Set the DY terms -- don't allow to be more than 50% of the actual dy
  for(int Image = 1;Image < ImagesCaptured - 1; Image++)
    DY[Image] = SmoothSum / 100.0;
  // anchor the ends
    DY[0] = SmoothSum / 1000.0;
    DY[ImagesCaptured - 1] = SmoothSum / 1000.0;
// 4) finally allocate them if they don't exist, or just reset them if they do..
  if(!LaplacianTiledSpline)
    LaplacianTiledSpline = new SmoothSpline(TargetOffsets, LaplacianTiledResults, DY, ImagesCaptured, ImagesCaptured);
  else
    LaplacianTiledSpline->ResetSpline(TargetOffsets, LaplacianTiledResults, DY, ImagesCaptured, ImagesCaptured);

}

//--------------------------------------------------------------//
// int ReturnFocusImagePosition() -- returns the offset of the image slice //
//    that is the most in focus -- used for bright field construction    //
//--------------------------------------------------------------//
int AutoFocus::ReturnFocusImagePosition(void)
{
  int FocusPosition = 0;
  for(int i = 1; i < ImagesCaptured; i++)
    if(LaplacianResults[i] > LaplacianResults[FocusPosition])
      FocusPosition = i;

return FocusPosition;
```

}

Example 2. Image flat fielding code.

```
#include "FlattenMaster.h"

// Image tolerance levels
  #define SATURATION_POINT_12BIT  4095
  #define BIN_SIZE_12BIT          4096.0f  // allows some padding at the low end of a flattened 16 bit image
  #define SATURATION_POINT_16BIT  65535
  #define SUB_SAMPLE_SIZE         8        // bin down to 8 * 8 when using the Kappa interpolation library
  #define SCALE_FACTOR            10.0f    // scale data up by 10.0 (range is 0-4096 + Data * SCALE_FACTOR)

#define DARK_IMAGE_MODE_TOLERANCE 500   // if the mode of the dark image is above 500 -- we have a problem
                                          // print a message and resume as if no dark image exists
  #define VERBOSE_MODE 0    // 1 full output
                            // 0 Warnings, Errors and vital stats only
  #define FULL_OUTPUT 0     // 1 outputs individual interpolated images
                            // 0 Final images only (corrected,Sum)
// Interpolation KNOTS
  #define KNOTSX     5      // how many knots to use for 2D interpolation (X)
  #define KNOTSY     4      // how many knots to use for 2D interpolation (Y)
  #define SUM_KNOTSX 5      // do sum image smoothing with only 1 Knot
  #define SUM_KNOTSY 4

//============================ Flatten Base Class ============================//
// Flatten(ImageWidth, ImageHeight, DarkImage, IrisMask)                    //
//   DarkImage -- Background image that must be subtracted from each Data   //
//                image before correction                                    //
//   IrisMask -- Mask applied to images where intensity information is      //
//                unreliable in any statistical way (light was blocked      //
//                during imaging)                                            //
//---------------------------------------------------------------------------//
Flatten::Flatten(int ImageWidth, int ImageHeight, OMImage* DarkImage, OMImage* IrisMask)
  {
  // save
    this->IrisMask = IrisMask;
  // set
    this->ImageWidth = ImageWidth;
    this->ImageHeight = ImageHeight;
  // calculate
    CalculateDarkLevel(DarkImage);
  // Interpolation Buffer
    KappaBuffer = new KappaFill(ImageWidth, ImageHeight, SUB_SAMPLE_SIZE);
  }
//---------------------------------------------------------------------------//
// ~Flatten() -- destructor                                                  //
//---------------------------------------------------------------------------//
Flatten::~Flatten()
  {
  // clear
    this->IrisMask = NULL;
  // clean
    delete KappaBuffer;
    KappaBuffer = NULL;
  }
//---------------------------------------------------------------------------//
// CalculateDarkLevel(DarkImage) -- determines the amount to subtract from  //
//                  each Data image based on the collected                  //
//                  dark current image.                                     //
//---------------------------------------------------------------------------//
void Flatten::CalculateDarkLevel(OMImage* DarkImage)
  {
  // is there on?
```

```
if(!DarkImage)
   {
   DarkImageLevel = 0;
   return;
   }

// use a histogram to do analyze the bffers
  Histogram DarkImageHistogram(12, (unsigned short*)DarkImage->Data(),
                  DarkImage->Width()*DarkImage->Height(), true);
// Get the Dark level (Mode of image)
  DarkImageLevel = DarkImageHistogram.GetMode();

// is it out of the expected range?
  if(DarkImageLevel > DARK_IMAGE_MODE_TOLERANCE)
     {
     // this is an error! So always echo
       fprintf(stderr, "WARNING:: Dark Image tolerance error. Mode of the dark image (%i) is above %i\n",
             DarkImageLevel, DARK_IMAGE_MODE_TOLERANCE);
     // resume after a reset
       DarkImageLevel = 0;
     }
}
//----------------------------------------------------//
// SubtractDarkImage(DataImage) -- adjust the data image by the Dark Level //
//                   calculated from the dark current image.  //
// NOTE:: Points that were collected at SATURATION (4095) will be preserved //
//        as saturated pixels.                          //
//----------------------------------------------------//
void Flatten::SubtractDarkImage(OMImage* DataImage)
{
// if Darklevel is 0 early exit
  if(!DarkImageLevel) return;

// our input is 12 bits, so set our saturation point at 4095 (2^12)-1
  unsigned short* Data = (unsigned short*)DataImage->Data();
  long Points = ImageWidth * ImageHeight;
  while(Points)
    {
    // preserve saturated pixels
      if(*Data < SATURATION_POINT_12BIT)
        *Data = max(0, *Data - DarkImageLevel);
      else
        *Data = SATURATION_POINT_12BIT; // occasional blip OVER SaturationPoint, so lock it in
    // update the counters
      Data++;
      Points--;
    } //Points
}
//----------------------------------------------------//
// InterpolateBackground(DataImage) -- Fill the passed in Kappa   //
//        Object with the background interpolation of the Data Image //
//        and adjust for DC interpolation offset.           //
//----------------------------------------------------//
OMImage* Flatten::InterpolateBackground(OMImage* DataImage, float &InterpolatedDCDifference)
{
// Interpolate the background now
  OMImage* BackgroundImage = KappaBuffer->Execute(DataImage, // Data to interpolate
                   IrisMask,   // mask to apply during interpolation
                   SUB_SAMPLE_SIZE, // SubSampleSize
                      KNOTSX, // KnotsX
                      KNOTSY, // KnotsY
                        48, // TilesX
                        38, // TilesY
                        0.0, // SDiv1
                        0.0, // SDiv2
                        0.30); // KeepPercent // Advanced step #1) We have found that after interpolation there is sometimes
//         a remaining DC offset (although small). The following step
//         is run to determine the size of that offset and to adjust
```

```
//         the image and buffer for that amount.
Histogram DifferenceHistogram(16, NULL, 0, false);
long* DifferenceTable = DifferenceHistogram.GetTable();
if(IrisMask)
  {
  // Data
    unsigned short* IData = (unsigned short*)IrisMask->Data();
    unsigned short* Data = (unsigned short*)DataImage->Data();
    float* BData = (float*)BackgroundImage->Data();
  // fill the Difference Table
    int Points = ImageWidth * ImageHeight;
    while(Points)
      {
      if((*IData) && (*Data != SATURATION_POINT_12BIT))
        {
        // on the subtraction
        // a) add an offset so that there is room to fluctuate around a gaussian mode
        // b) use factor of 10 for a Mode calculation to within 0.1
        // c) round up
          int value = (int)((BIN_SIZE_12BIT + (*Data - *BData) * 10.0) + 0.50);
          if((value > 0) && (value < SATURATION_POINT_16BIT))
            DifferenceTable[value]++;
        }
      // update our pointers
        Data++;
        BData++;
        IData++;
      // and our counter
        Points--;
      } // cover entire space
  } // Have an Iris
else
  {
  // Data
    unsigned short* Data = (unsigned short*)DataImage->Data();
    float* BData = (float*)BackgroundImage->Data();
  // fill the Difference Table
    int Points = ImageWidth * ImageHeight;
    while(Points)
      {
      if(*Data != SATURATION_POINT_12BIT)
        {
        // on the subtraction
        // a) add an offset so that there is room to fluctuate around a gaussian mode
        // b) use factor of 10 for a Mode calculation to within 0.1
        // c) round up
          int value = (int)((BIN_SIZE_12BIT + (*Data - *BData) * 10.0) + 0.50);
          if((value > 0) && (value < SATURATION_POINT_16BIT))
            DifferenceTable[value]++;
        }
      // update our pointers
        Data++;
        BData++;
      // and our counter
        Points--;
      } // cover entire space
  } // No Iris
// Now the Histogram calculations
// set our range from 0 to 65534
  DifferenceHistogram.SetCutOff(-1, SATURATION_POINT_16BIT); // valid range is now 0-(SATURATION_POINT_16BIT-1)
// calculate the Gaussian Mode
  double SDev;   // Standard Deviation of the Subtracted image
// how much did it vary?
  InterpolatedDCDifference = (DifferenceHistogram.GetCalculatedGaussianMode(&SDev) - BIN_SIZE_12BIT) / 10.0;

// apply to the BackGround Image
  float* BData = (float*)BackgroundImage->Data();
  for(int Point = 0; Point < ImageWidth * ImageHeight; Point++)
    BData[Point] = max(0.0f, BData[Point] + InterpolatedDCDifference);
```

```
// for the Kappa Buffer allow a negative offset since we may need this
// to adjust in the BuildSumImage step used in Interpolative flattening
// in the BrightImage case the grid is no longer used
   float* FilledGrid = KappaBuffer->GetFilledGrid();
   int Points = KappaBuffer->GetGridWidth() * KappaBuffer->GetGridHeight();
   for(int Point = 0; Point < Points; Point++)
      FilledGrid[Point] += InterpolatedDCDifference;

// Done
   return BackgroundImage;
}
//------------------------------------------------------------//
// CalculateImageMean(Image) -- calculate the Mean of the image passed in    //
//------------------------------------------------------------//
float Flatten::CalculateImageMean(OMImage* Image)
{
// data type?
   if(Image->DataType() == OMI_UNSIGNED_SHORT)
   {
   //-calc mean..
      __int64 TotalIntensity = 0;
      int PointCount = 0;
      int Points = Image->Width() * Image->Height();
      unsigned short* Data = (unsigned short*)Image->Data();

if(IrisMask)
      {
         unsigned short* IrisData = (unsigned short*)IrisMask->Data();
         for(int point = 0; point < Points; point++)
         {
            if(IrisData[point])
            {
               TotalIntensity += Data[point];
               PointCount++;
            }
         }
      }
      else
      {
         for(int point = 0; point < Points; point++)
         {
            TotalIntensity += Data[point];
            PointCount++;
         }
      }
      return (float)((double)TotalIntensity / PointCount);
   }
   else if(Image->DataType() == OMI_FLOAT)
   {
   //-calc mean
      double TotalIntensity = 0;
      int PointCount = 0;
      int Points = Image->Width() * Image->Height();
      float* Data = (float*)Image->Data();

if(IrisMask)
      {
         unsigned short* IrisData = (unsigned short*)IrisMask->Data();
         for(int point = 0; point < Points; point++)
         {
            if(IrisData[point])
            {
               TotalIntensity += Data[point];
               PointCount++;
            }
         }
      }
      else
      {
         for(int point = 0; point < Points; point++)
```

```
        {
            TotalIntensity += Data[point];
            PointCount++;
        }
    }
    return (float)(TotalIntensity / PointCount);
}
// eh?
return 1.0;
}

//-----------------------------------------------------------//
// OMImage* FlattenImage(DataImage, BackGroundImage, BrightImage, TargetMean) //
// Now apply everything we have to construct the final Corrected image and //
// return that.                                              //
//-----------------------------------------------------------//
OMImage* Flatten::FlattenImage(OMImage* DataImage, OMImage* BackgroundImage,
                OMImage* BrightImage, float CorrectionFactor)
{
// INPUT:
//   DataImage our 12 bit image with data ranging from offset 0 to 4096
//   Background Image -- interpolation of the DataImage with the DNA removed
//   BrightImage -- Normalized Illumination profile
//
// OUTPUT:
//   CorrectImage -- a 16 bit image that is offset so that the mode (0 level)
//              starts at 4096. Data values are scaled by SCALE_FACTOR
//              above this bin. Typically 10 so that data ranges between
//              4096 and 4096 + 40960. This will prevent data bordering
//              on saturation from reaching saturation due to correction
//              alone. (Unless intensity is boosted by more than 30%)
// BASIS:
//   It is assumed that our Raw Data Image is constructed as follows
//   Data = (TargetIntensity + AdditiveError) * MultiplicativeError
//        = TargetIntensity * MultiplicativeError + AdditiveError * MultiplicativeError
//
//   The additive error (in the ideal case) is assumed to be a uniform
//   fluorescent layer that describes the illumination profile. Using this
//   assumption a series of backgrounds can be merged to form an approximation
//   of the illumination profile (used in Interpolative Flattening).
//
//   In either case, the AdditiveTerms contribution is completely removed during
//   the subtraction step. The only question the previouse assumption brings up,
//   is whether or not the (shape)MultiplicativeError == (shape)AdditiveError
//   and can therefore be used for the flat fielding step.
//
//   So now to recover the TargetIntensity Term do the following.
//     a) Subtract the InterpolatedBackground (Additive * Multiplicative)
//     b) Divide by the BrightImage
//     c) Adjust the final term based on intensity correction etc...
//
//   For example, when equalizing images, CorrectionFactor should be set as
//   follows. (Assume we are normalizing to the first image)
//              Mean    CorrectionFactor
//   Image1     1.3     1.0     (Maintain)
//   Image2     1.2     1.3 / 1.2 (Brighten)
//   Image3     1.1     1.3 / 1.1 (Brighten)
//   Image4     1.4     1.3 / 1.4 (Dim)
//       NOTE: if the BrightImage is NOT normalized, then the Correction Term must
//           be set to accomplish this (CorrectionTerm *= BrightImageMean)

// Set up some buffer access points
    OMImage* FlatImage = new OMImage(ImageWidth, ImageHeight, OMI_UNSIGNED_SHORT, OMI_INTENSITY);
    unsigned short* Flat = (unsigned short*)FlatImage->Data();
    unsigned short* Raw = (unsigned short*)DataImage->Data();
    float* Additive = (float*)BackgroundImage->Data();
    float* Multiplicative = (float*)BrightImage->Data();

//scaling
```

```
CorrectionFactor *= SCALE_FACTOR;
// traverse the image
 int Points = ImageWidth * ImageHeight;
 float FlatValue;
 while(Points)
  {
  // 1) If it's saturated, leave it there
   if(*Raw < SATURATION_POINT_12BIT)
    {
    // 2) subtract the background image from the raw image,
    //    adjust it by the mode correction
       FlatValue = (float)(*Raw) - (*Additive);
    // 3) divide by the SumImage
       FlatValue /= *Multiplicative;
    // 4) Equalize using Correction Term (also used to adjust for BrightProfileMean if
    //                    it was not normalized)
       FlatValue *= CorrectionFactor;
    // 5) line it up around the 4096.0 point
       FlatValue += BIN_SIZE_12BIT;
    // 6) clip it
       if(FlatValue < 0.0) FlatValue = 0.0;
       else if(FlatValue > SATURATION_POINT_16BIT) FlatValue = SATURATION_POINT_16BIT;
    // 7) save it
       *Flat = (unsigned short)(FlatValue + 0.5);
    }
   else
    *Flat = SATURATION_POINT_16BIT;
  // update pointers
   Flat++;
   Raw++;
   Additive++;
   Multiplicative++;
   Points--;
  } // points // return the corrected image
  return FlatImage;

} // proc

//*************************************************************************//
// Bright Image Flattening Processing Object                              //
//=========================================================================//
BrightImageFlatten::BrightImageFlatten(char* DarkImagePathName, char* BrightImagePathName,
                char* InputImagePath, char* OutputImagePath,
                char** ImageIDs, long ImageCount,
                bool CalculateIris, bool Equalize)
 {
 // For now let's do some timing too
   timeb StartTime,StopTime;
 // time tracking
   ftime(&StartTime);

// Useing
   Initialize(DarkImagePathName, BrightImagePathName, CalculateIris);

// Flatten each image
  char ImageName[1024];
   float CorrectionFactor = 1.0;
   float BaseCorrectionFactor = 1.0;
   for(int ImageNumber = 0; ImageNumber < ImageCount; ImageNumber++)
    {
    // Load this image
       sprintf(ImageName,"%s" DIR_SEP "raw%s.omi", InputImagePath, ImageIDs[ImageNumber]);

OMImage* RawImage = new OMImage(ImageName);

// Subtract the Dark Image level
       FlattenObject->SubtractDarkImage(RawImage);
```

```
// Interpolate the Background
  float DCError; // could track this in verbose mode?
  OMImage* BackgroundImage = FlattenObject->InterpolateBackground(RawImage, DCError);

// are we equalizing?
  if(Equalize)
    {
    // NOTE: This form of equalization is a bit naive. It assumes that
    //    there are no large additive errors (out of focus blobs) moving
    //    the image mean up or down.
    // Approach 1) Normalize and compare to the bright image to find an offset
    //       and throw out bad points (probably iterative, will not work
    //       when a better filter is used, thus eliminating the profile)
    // Apporoach 2) Clip top until SDev is some %of the image mean -- definitely iterative
    //       but can be speed up by using a Histogram.
    // calculate the Background Mean
      float ThisImageMean = FlattenObject->CalculateImageMean(BackgroundImage);
      if(ImageNumber == 0)
        BaseCorrectionFactor = ThisImageMean;
      CorrectionFactor = BaseCorrectionFactor / ThisImageMean; // 1.0 for first, adjust to first for the rest
    }

// now flatten it
  OMImage* CorrectImage = FlattenObject->FlattenImage(RawImage, BackgroundImage, BrightImage, CorrectionFactor);

// Write it
  // build name
    sprintf(ImageName,"%s" DIR_SEP "correct%s.omi", OutputImagePath, ImageIDs[ImageNumber]);
  // set the name
    CorrectImage->SetImageFilename(ImageName);
  // and write it out
    CorrectImage->WriteToFile(true); // yes -- we do want them compressed // clean up for this pass
    delete RawImage;
    delete BackgroundImage;
    delete CorrectImage;
  }

// Now save the BrightSmooth Image -- COMPATABILITY ISSUE -- CAN REMOVE AT SOME POINT
  sprintf(ImageName,"%s" DIR_SEP "brightsmooth.omi",OutputImagePath);
  BrightSmoothImage->SetImageFilename(ImageName);
  BrightSmoothImage->WriteToFile(true);

// timing output
  ftime(&StopTime);
  fprintf(stderr,"Total run time REAL:\n");
  long Total = (StopTime.time * 1000 + StopTime.millitm)
        -(StartTime.time * 1000 + StartTime.millitm);
  fprintf(stderr,"    Time: %ld.%ld Seconds\n", Total / 1000, Total % 1000);
}
//----------------------------------------------------------//
// ~BrightImageFlatten() -- destructor                      //
//----------------------------------------------------------//
BrightImageFlatten::~BrightImageFlatten()
{
delete DarkImage;
DarkImage = NULL;

delete IrisMaskImage;
IrisMaskImage = NULL;

delete BrightImage;
BrightImage = NULL;

delete BrightSmoothImage;
BrightSmoothImage = NULL;

delete FlattenObject;
```

```
    FlattenObject = NULL;
}

//------------------------------------------------//
// Initialize(BrightImagePathName, CalculateIris)  //
//------------------------------------------------//
void BrightImageFlatten::Initialize(char* DarkImagePathName, char* BrightImagePathName, bool CalculateIris)
{
// Step one - Load the Dark Image
  if(DarkImagePathName)
    DarkImage = new OMImage(DarkImagePathName);

// Load Bright Image
  BrightImage = new OMImage(BrightImagePathName);

// Calculate the iris mask
  if(CalculateIris)
    IrisMaskImage = FindImageFrame(BrightImage);

// Initialize a Flatten object
  FlattenObject = new Flatten(BrightImage->Width(), BrightImage->Height(),
              DarkImage, IrisMaskImage);

// Calculate the Background Mean
  float BrightImageMean = FlattenObject->CalculateImageMean(BrightImage);

// the new image
  OMImage* NormalizedBrightImage = new OMImage(BrightImage->Width(), BrightImage->Height(),
              OMI_FLOAT, OMI_INTENSITY);
  float* NormBuffer = (float*)NormalizedBrightImage->Data();
  unsigned short* BrightData = (unsigned short*)BrightImage->Data();
  int Points = BrightImage->Width() * BrightImage->Height();
  for(int point = 0; point < Points; point++)
  {
    float NormValue = BrightData[point] / BrightImageMean;
    if(!NormValue)
      NormBuffer[point] = 1000.0;   // let it dim to almost nothing if it's at zero (very rare, under the iris in any case)
    else
      NormBuffer[point] = BrightData[point] / BrightImageMean;
  }

// save the BrightImage (iris.omi most times) as brighsmooth.omi with the mask applied
// This is for compatability with the current processing. When/if this becomes a large
// processing object, drop this write stage.
  if(IrisMaskImage)
  {
    unsigned short* IData = (unsigned short*)IrisMaskImage->Data();
    unsigned short* SData = (unsigned short*)BrightImage->Data();
    int Points=IrisMaskImage->Width()*IrisMaskImage->Height();
    for(int i=0;i<Points;i++)
      SData[i]&=IData[i];
  }
  BrightSmoothImage = BrightImage;
  BrightImage = NormalizedBrightImage;
}

//*****************************************************************//
// Interpolative Bright Image Flattening Processing Object          //
//=================================================================//
//-----------------------------------------------//
// FlatMaster(DarkImagePathName,IrisImagePathName,BrightImagePathName, //
//      InputImagePath,OutputImagePath,ImageIDs[],ImageCount,       //
//      TargetMean,AutoProcess,Equalize,SubtractUsingSumImage)      //
// Initializer for the flattening object                            //
//   DarkImagePathName -- name and path of the darkimage to use     //
//   IrisImagePathName -- name and path of the irisimage to use     //
//   InputImagePath    -- Path to the list of input images          //
//   OutputImagePath   -- Path to the list of output images         //
```

```
// ImageIDs[]    - list of image ID's                              //
// ImageCount    - count of the images in the ImageIDs list        //
// PassCount     - how many passes was this collection run in?     //
// TargetMean    - Target Mean of all flattened images -- only set //
//                 when this object is initialized in a parallel   //
//                 setting. If in sequential mode let this object  //
//                 initialize this value. If in parallel mode, send//
//                 one group of images, use the TargetMean it      //
//                 generates, and pass it on to all subsequent     //
//                 FlatMaster objects.                             //
// AutoProcess   - if this flag is set, the object is constructed and //
//                 then immediately begins to process the data,    //
//                 otherwise processing must be coordinated externally//
//                 This feature is useful for the VisualFlattening //
//                 application.                                    //
// Equalize      - Set to true if want to use the Target Mean and also//
//                 equalize all of the images by aligning to the   //
//                 background average intensities                  //
//--------------------------------------------------------------//
FlatMaster::FlatMaster(char* DarkImagePathName,
            char* IrisImagePathName,
            char* InputImagePath, char* OutputImagePath,
            char** ImageIDs, long ImageCount,long PassCount,
            double TargetMean,
            bool AutoProcess,
            bool Equalize)
{
// copy all of our path/data since this is just a prep phase
  strcpy(this->DarkImagePathName, DarkImagePathName);
  strcpy(this->InputImagePath, InputImagePath);
  strcpy(this->OutputImagePath, OutputImagePath);

// optional field
  if(IrisImagePathName) strcpy(this->IrisImagePathName, IrisImagePathName);
  else this->IrisImagePathName[0] = 0;

// list of ImageIDs
  this->PassCount = PassCount;              // how many passes
  RawImageCount = ImageCount;               // how many images
  this->ImageIDs = new char*[ImageCount];   // generate a list of ID's
  for(int i = 0; i < ImageCount; i++)
    {
    this->ImageIDs[i] = new char[32];
    strcpy(this->ImageIDs[i], ImageIDs[i]);
    }
// our TargetMean -- should be 0 in sequential mode
  this->TargetMean = TargetMean;
  this->AutoProcess = AutoProcess;
  this->Equalize = Equalize;
// Initialize our Pass's List
  SetPassSizes();
// some initial pointer settings
  DarkImage = NULL;
  IrisImage = NULL;
  for(int i = 0; i < IMAGES_PER_PASS; i++)
    {
    RawImageList[i] = NULL;      // Raw images
    FlattenList[i] = NULL;       // Flattening object for corresponding Raw Image
    BackgroundList[i] = NULL;    // Interpolated backgrounds
    CorrectList[i] = NULL;       // Corrected images
    }
  IrisKappaMask = NULL;
// SumImage buffers
  SumImage = NULL;
  SumFill = NULL;
// Now if we're auto processing -- go for it
  if(AutoProcess)
    ProcessEntireImageSet();
}
//--------------------------------------------------------------//
```

```
// ~FlatMaster() -- object destructor                    //
//---------------------------------------------------//
FlatMaster::~FlatMaster()
{
// Clean up our ImageIDs list
  for(int i=0;i<RawImageCount;i++)
    delete ImageIDs[i];
  delete ImageIDs;
// clean up our pass list
  delete PassList;
// remove our Dark Image object
  delete DarkImage;
// remove our Iris Image object
  delete IrisImage;
// remove any raw images that were loaded and buffers used
  for(int i = 0; i < IMAGES_PER_PASS; i++)
  {
    delete RawImageList[i];
    delete BackgroundList[i];
    delete CorrectList[i];
    delete FlattenList[i];
  }
  delete IrisKappaMask;
// SumImage buffers
  delete SumImage;
  delete SumFill;
}
//---------------------------------------------------//
// ProcessEntireImageSet() -- when AutoProcess is set, no external methods are//
//                 being accessed, so process it all automatically //
//---------------------------------------------------//
void FlatMaster::ProcessEntireImageSet(void)
{
// For now let's do some timing too
  timeb StartTime,StopTime;
  #if VERBOSE_MODE
    timeb Time1,Time2;
  #endif
// time tracking
  ftime(&StartTime);
// Step one -- Load the Dark Image
  LoadDarkImage();
// Step two -- Load the Iris Image
  LoadIrisImage();
// Step four -- calculate the Iris Mask
  CalculateIrisImage();
// set up our loop of passes
  for(int i=0;i<NumberOfPasses;i++)
  {
    #if VERBOSE_MODE
      ftime(&Time1);
      fprintf(stderr,"Loading Images for Pass %i\n",i);
      LoadRawImages();    // Loads the Raw Images based on the pass
      ftime(&Time2);
      ReportTime(&Time1,&Time2);
      fprintf(stderr," Subtracting Dark Image\n");
      SubtractDarkImage(); // Subtract Dark Image data and apply the iris as well
      ftime(&Time1);
      ReportTime(&Time2,&Time1);
      fprintf(stderr," Interpolating Backgrounds\n");
      InterpolateImages();
      ftime(&Time2);
      ReportTime(&Time1,&Time2);
      fprintf(stderr," Building Sum Image\n");
      BuildSumImage();    // build the sum image out of the Filtered images
      ftime(&Time1);
      ReportTime(&Time2,&Time1);
      fprintf(stderr," Flattening Images\n");
      FlattenImages();    // Flatten the Images
      ftime(&Time2);
```

```
    ReportTime(&Time1,&Time2);
    fprintf(stderr," Save Images\n");
    SaveFlattenedImages(); // Write the data out
    SaveSumImage();
    ftime(&Time1);
    ReportTime(&Time2,&Time1);
    // set so top of loop is back in sync
    memmove(&Time2,&Time1,sizeof(timeb));
  #else
    LoadRawImages();      // Loads the Raw Images based on the pass
    SubtractDarkImage();  // Subtract Dark Image data and apply the iris as well
    InterpolateImages();  // uses the Kappa-lib routines to interpolate our backgrounds
    BuildSumImage();      // build the sum image out of the Filtered images
    FlattenImages();      // Flatten the Images
    SaveFlattenedImages(); // Write the data out
    SaveSumImage();       // write out the iris'd sum image for this set
  #endif
    NextImageSet(); // Handle internal pointers
  }
  ftime(&StopTime);
  fprintf(stderr,"Total run time REAL:\n");
  ReportTime(&StartTime,&StopTime);
}
//----------------------------------------------//
// ReportTime(StartTime,StopTime) - zap this later, but for now dumps time //
//       stats as we process. Real Time not process time.         //
//----------------------------------------------//
void FlatMaster::ReportTime(timeb* StartTime,timeb* StopTime)
{
  long Total=(StopTime->time*1000+StopTime->millitm)
       -(StartTime->time*1000+StartTime->millitm);
  fprintf(stderr,"    Time: %ld.%ld Seconds\n",Total/1000,Total%1000);
}

//----------------------------------------------//
// SetPassSizes()                               //
// This procedure determines the optimum number of passes and the size for //
// each pass. It saves this data in a list to be used for moving through //
// the images.                                  //
//----------------------------------------------//
void FlatMaster::SetPassSizes(void)
{
// allocate our PassList
  int PassLength = RawImageCount / PassCount;    // working on sub increments
// spot collection will use short passes with high depth
  if((PassLength < IMAGES_PER_PASS / 2) && (PassCount > 1))
  {
    PassLength = RawImageCount;
    PassCount = 1;
  }
// warning if this set is too small
  if(PassLength < IMAGES_PER_PASS / 2)
  {
    fprintf(stderr, "\nWARNING: Flatten\n");
    fprintf(stderr, "Flatten is operating on a reduced image set.\n");
    fprintf(stderr, "Only %i images supplied per pass where a range of\n", PassLength);
    fprintf(stderr, "%i to %i is desired.\n", IMAGES_PER_PASS / 2, IMAGES_PER_PASS);
  }
  int CollectionPasses = (PassLength + IMAGES_PER_PASS - 1) / IMAGES_PER_PASS; // each with this many passes
  NumberOfPasses = CollectionPasses * PassCount;   // and so our total is...
  PassList = new long[NumberOfPasses];             // allocate it
// traverse the list and fill -- only interested with the number of images
// per pass, not their actual ID's
  for(int FlatPass = 0; FlatPass < NumberOfPasses; FlatPass++)
  {
    // Which FlatPass are we in, in the collection pass -- confusing no? 8|
    int CollectionOffset = (FlatPass % CollectionPasses);
    PassList[FlatPass] = (PassLength / CollectionPasses);
    int Remainder = PassLength % CollectionPasses;
    if(Remainder && CollectionOffset < Remainder)
```

```
    PassList[FlatPass]++;
  }

// initialize our pass settings
  CurrentPass = 0;         // first pass offset
  CurrentStartImage = 0;   // First Image offset
} // proc
//---------------------------------------------------------------//
// LoadDarkImage() -- Loads the Dark image from disk. If not present, the //
//                    DarkImage object pointer is set to NULL              //
//---------------------------------------------------------------//
void FlatMaster::LoadDarkImage(void)
{
// see if the string is NULL or not
  if(!DarkImagePathName[0])
    DarkImage = NULL;
  else
    {
    DarkImage=new OMImage(DarkImagePathName);
    if(!DarkImage)
      {
      // report an error and exit -- processing will resume as if no image exists
      fprintf(stderr,"Unable to load the Dark Image\n");
      return;
      }
    }
}
//---------------------------------------------------------------//
// LoadIrisImage() -- Loads the Iris image from disk. If not present, the //
//                    IrisImage object pointer is set to NULL             //
//---------------------------------------------------------------//
void FlatMaster::LoadIrisImage(void)
{
// see if the string is NULL or not
  if(!IrisImagePathName[0])
    IrisImage = NULL;
  else
    {
    IrisImage = new OMImage(IrisImagePathName);
    if(!IrisImage || !IrisImage->Data())
      {
      // report an error and exit -- processing will resume as if no image exists
      fprintf(stderr,"Unable to load the Iris Image\n");
      IrisImage=NULL;
      return;
      }
    }
}
//---------------------------------------------------------------//
// CalculateIrisImage() -- processes the Iris image to find the intensity //
//                         cutoff and therefore the Iris border.          //
//---------------------------------------------------------------//
void FlatMaster::CalculateIrisImage(void)
{
// early exit if there is no image to calculate
  if(!IrisImage) return;
  #if VERBOSE_MODE
    fprintf(stderr,"Calculating the iris image.\n");
  #endif
// hold the old version so can delete when done with this routine
  OMImage* TImage = IrisImage;
// find the iris.. Iris image will contain 0's where the iris is and
// 0xffff where it isn't -- an AND mask
  IrisImage = FindImageFrame(IrisImage);
  delete TImage;

// Now we want to sub sample the grid so that it has the same "shape" in it's
// smaller form as it's corresponding source image
// To Optimize the SubSample algorithm, convert all 0xffff's to 0x00ff's
// so that the Histogram range is still within 12 bits
```

```
    unsigned short* IData = (unsigned short*) IrisImage->Data();
    int Points = IrisImage->Width() * IrisImage->Height();
    for(int p = 0; p < Points; p++) IData[p] &= 0x00ff;
// create an interpolation object to handle the sub-sampling
    KappaFill* KappaMask = new KappaFill(IrisImage->Width(), IrisImage->Height(), SUB_SAMPLE_SIZE);
    KappaMask->SubSample(IrisImage, IrisImage, SUB_SAMPLE_SIZE);
// convert back to 0xffff
// shift lower 8-bits over and or with original -- faster than if/then
    for(int p = 0; p < Points; p++) IData[p] |= (IData[p] << 8);

// now the clipped grid contains the Masked mask... dump from there to a
// local unsigned short buffer and delete the original buffer
// BAD_INTERPOLATION_VALUE set to 0
// Anything else         set to 0xffff
    IrisKappaMask = new unsigned short[KappaMask->GetGridWidth() * KappaMask->GetGridHeight()];
    Points = KappaMask->GetGridWidth() * KappaMask->GetGridHeight();
    float* KData = KappaMask->GetSubSampledGrid();
    for(int i = 0; i < Points; i++)
    {
      if(KData[i] == BAD_INTERPOLATION_VALUE) IrisKappaMask[i] = 0;
      else IrisKappaMask[i] = 0xffff;
    }
// don't need this object any longer
    delete KappaMask;
}
//---------------------------------------------------------//
// LoadRawImages() -- loads the list of raw images based on our current pass //
//---------------------------------------------------------//
void FlatMaster::LoadRawImages(void)
{
// a buffer for building our string name
    static char ImageName[1024];

// How many images should we load
    int PassSize = PassList[CurrentPass];
// load'm
    for(int i = 0; i < PassSize; i++)
    {
    // clean up -- maintain KappaFill Buffers
      delete RawImageList[i];
      delete BackgroundList[i];
      BackgroundList[i] = NULL;

// build the image name path
      sprintf(ImageName,"%s" DIR_SEP "raw%s.omi", InputImagePath, ImageIDs[CurrentStartImage+i]);
      RawImageList[i] = new OMImage(ImageName);
    }
// Initialize Width and Height and Flatten Buffers on first pass
    if(CurrentPass == 0)
    {
    // set up our global widths and heights
      Width = RawImageList[0]->Width();
      Height = RawImageList[0]->Height();
    // set up for the largest pass (first pass is always the largest)
      for(int i = 0; i < PassSize; i++)
        FlattenList[i] = new Flatten(Width, Height, DarkImage, IrisImage);
    // a buffer used to construct the Sum Image (Background)
      SumFill = new KappaFill(Width, Height, SUB_SAMPLE_SIZE);
    }
}
//---------------------------------------------------------//
// SubtractDarkImage() -- subtracts the dark image from the list of raw     //
// and applies the Iris Image if it exists as well.                          //
// Adjusted to use the DarkImageLevel variable instead of doing a true image //
// subtraction. Commented lines remain.                                      //
//---------------------------------------------------------//
void FlatMaster::SubtractDarkImage(void)
{
// now base on the pass size, subtract away...
    int ImagesInThisPass = PassList[CurrentPass];
```

```
    for(int i = 0; i < ImagesInThisPass; i++)
        FlattenList[i]->SubtractDarkImage(RawImageList[i]);
}
//----------------------------------------------------------//
// InterpolateImages() -- uses the Kappa Library Interpolation routine to   //
//             build an interpolated image of our background.    //
//             Find the amount that we'll need to adjust the     //
//             interpolated image so that they line up correctly. //
//----------------------------------------------------------//
void FlatMaster::InterpolateImages(void)
{
// how many images to process?
    int ImagesInThisPass = PassList[CurrentPass];

// 1: interpolate the RawImage and place the interpolated image
//    into the BufferList
    float InterpolatedDCDifference;  // good error reporting, but not used for now
    for(int i=0;i<ImagesInThisPass;i++)
        BackgroundList[i] = FlattenList[i]->InterpolateBackground(RawImageList[i], InterpolatedDCDifference);

} // proc
//----------------------------------------------------------//
// BuildSumImage() -- build the sum image out of the Filtered images   //
//----------------------------------------------------------//
void FlatMaster::BuildSumImage(void)
{
// Possible modes
// 1) Bright Image supplied
//    a) Interpolate the image to get in floating point format and smoothed
//    b) Place in the SumFill Buffer as would normally be
// 2) Bright Image not supplied
//    a) Create a best guess Bright image from what we have (Median of all works well)
//       do not clip for the iris as it has already been compensated for in the initial
//       background interpolation step
//    b) Find how much each interpolated image differs from this best guess at a shape
//    c) Create a Bright image applying these calculated differences so that they
//       all line up properly -- this is our SumImage
// 3) Get the Mean value of the SumImage
// 4) Equalization is on
//    a) Get the Mean value of each interpolated image by once again finding how much
//       each differs from the SumImage and applying that difference to the SumImage Mean
// How do we calculate the differences?
// -- Subtract the interpolated image from the target image, saving the difference in a buffer
// -- find the mode in this buffer -- this is the point where the majority of the differences
//    are in common.
// Use this method to prevent bright "dome" blobs from altering our ImageMean by too much // Step one -- build a buffer that contains the median of all the buffers
    // set up the Sum Image Interpolation object
    long GridWidth = SumFill->GetGridWidth();
    long GridHeight = SumFill->GetGridHeight();
// Pre-Step -- verify that the IrisKappaMask exists
    if(!IrisKappaMask)
    {
        // if not create it with all 0xffff values so the AND mask passes.
        IrisKappaMask = new unsigned short[GridWidth * GridHeight];
        memset(IrisKappaMask, 0xff, sizeof(unsigned short) * GridWidth * GridHeight);
    }
// now loop through our images and save the median of the set as our SumImage point
    float SortList[IMAGES_PER_PASS];        // Sort the list in this space
    float* BufferData[IMAGES_PER_PASS];     // our list of Buffers
    float temp;                             // temp variables for swapping etc..
// list of Difference Terms -- additive offsets between each image and the sumimage
    float Differences[IMAGES_PER_PASS];
// how many images in this pass
    int ImagesInThisPass = PassList[CurrentPass];
// only need to run this many passes to have the Median value
    long Middle = (ImagesInThisPass + 1) / 2;
// set up our Buffer pointers
    for(int i = 0; i < ImagesInThisPass; i++)
```

```
  BufferData[i] = FlattenList[i]->KappaBuffer->GetFilledGrid();
// and our SumFill pointer
  float *Fill = SumFill->GetClippedGrid();
// loop through for each point
  long Points = GridWidth * GridHeight;
  for(int p = 0; p < Points; p++)
  {
  // set our points into the Sort List
    for(int i = 0; i < ImagesInThisPass; i++)
    {
    // adjust for the difference at each point
      SortList[i] = *BufferData[i];
    // move to next point for next pass
      BufferData[i]++;
    }
  // Sort our list -- only need to go half way to get our Median
    bool Swap = true;
    long Count = 0;
    long Itterations;
    while(Swap && (Count <= Middle))
    {
    // set our swap count to none
      Swap = false;
    // now move through the list bubble sorting it
      Itterations = ImagesInThisPass - 1 - Count;
    // try some pointer tricks instead of using array dereferencing -- hopefully faster ???
      float* S = SortList;
      float* Sp1 = SortList + 1;
      while(Itterations)
      {
      if(*S > *Sp1)
        {
        // do a swap
          temp = *Sp1;
          *Sp1 = *S;
          *S = temp;
        // we did a swap
          Swap = true;
        }
      // update the two pointers
        S++;
        Sp1++;
      // next one
        Itterations--;
      } // Single Pass of the Bubble Sort
    // update our number of passes count
      Count++;
    } // Bubble Sort
  // and set the Median of the list into the SumFill Buffer
    Fill[p] = SortList[Middle];
  } // Points -- Image itteration // -- smooth this buffer (do a fill on it)
  SumFill->FillGrid( SUM_KNOTSX, // KnotsX
                     SUM_KNOTSY, // KnotsY
                     48, // TilesX
                     38, // TilesY
                     0.0, // SDiv1
                     0.0, // SDiv2
                     0.30); // KeepPercent // Now determine how much each image varies vs. the median image and adjust them again to line up
  Histogram DifferenceHist(16, NULL, 0, false);
  long* Table = DifferenceHist.GetTable();

// loop through the images
  for(int i = 0; i < ImagesInThisPass; i++)
  {
  // clear the Histogram
    memset(Table, 0, sizeof(long) * DifferenceHist.GetTableLength());
```

```
//·get the source pointer
  float* Source = SumFill->GetFilledGrid();
// get the Difference Image Pointer
  float* DImage = FlattenList[i]->KappaBuffer->GetFilledGrid();
// the mask buffer
  unsigned short* IKMask = IrisKappaMask;
// now itterate through all of the points
  long Points = GridWidth * GridHeight;
  for(int Point = 0; Point < Points; Point++)
  {
    // first see if we want to use this point at all!
    // here we can omit for the iris'd locations as strange artifacts may
    // still appear here (only a difference image so is for the best)
      if(IKMask[Point])
      {
        // problem with the interpolate grids sometimes coming back beyond saturation
        // -- so need to bounds check here
        // add an offset to keep our term always positive (Histogram limitation)
          int IDiff=(int)((Source[Point] - DImage[Point]) + 0.5 + 32000.0);
          IDiff = min(64001, max(0, IDiff));
          Table[IDiff]++;
      }
  }
// now return the Mode -- this is our offset term
  DifferenceHist.SetCutOff(-1,64001); // the 64001 points are excluded
  long Mode = DifferenceHist.GetMode();
 // do a second check to make sure we're getting something reasonable
 // find the points that are 20% of the Mode both above and below
 // and take the median in this range. With a mode value high enough
 // this shouldn't effect the final value...much
  long Low,High,Mode20;
  Low = High = Mode;
  Mode20 = Table[Mode] * 20 / 100;
// Low first
  while(Low && (Table[Low] > Mode20)) Low--;
// High next
  while(High<64001 && (Table[High] > Mode20)) High++;
// make it easy, just set our cut-offs
  DifferenceHist.SetCutOff(Low,High);
  long Median = DifferenceHist.GetMedian();
// set our Difference Term
  Differences[i] = (float)(Median - 32000.0);
} // Images // Now using our gathered list of differences, re-interpolate our final image
// set up our Buffer pointers
  for(int i = 0; i < ImagesInThisPass; i++)
    BufferData[i] = FlattenList[i]->KappaBuffer->GetFilledGrid();
// and our SumFill pointer
  Fill = SumFill->GetClippedGrid();
// loop through for each point
  Points = GridWidth * GridHeight;
  for(int p = 0; p < Points; p++)
  {
    // set our points into the Sort List
      for(int i = 0; i < ImagesInThisPass; i++)
      {
        // adjust for the difference at each point
          SortList[i] = *BufferData[i] + Differences[i];
        // move to next point for next pass
          BufferData[i]++;
      }
    // Sort our list -- only need to go half way to get our Median
      bool Swap = true;
      long Count = 0;
      long Iterations;
      while(Swap && (Count <= Middle))
      {
        // set our swap count to none
          Swap = False;
```

```
// now move through the list bubble sorting it
   Itterations = ImagesInThisPass - 1 - Count;
// try some pointer tricks instead of using array dereferencing -- hopefully faster ???
   float* S = SortList;
   float* Sp1 = SortList + 1;
   while(Itterations)
     {
     if(*S > *Sp1)
       {
       // do a swap
          temp = *Sp1;
          *Sp1 = *S;
          *S = temp;
       // we did a swap
          Swap = true;
       }
     // update the two pointers
        S++;
        Sp1++;
     // next one
        Itterations--;
     } // Single Pass of the Bubble Sort
   // update our number of passes count
     Count++;
   } // Bubble Sort
 // and set the Median of the list into the SumFill Buffer
   Fill[p] = SortList[Middle];
 } // Points -- Image itteration
// -- smooth this median image as well
   SumFill->FillGrid( SUM_KNOTSX, // KnotsX
              SUM_KNOTSY, // KnotsY
                 48, // TilesX
                 38, // TilesY
                 0.0, // SDiv1
                 0.0, // SDiv2
                 0.30); // KeepPercent
// now build the SumImage
   if(SumImage) delete SumImage;
   SumImage = SumFill->GetInterpolatedImage();

// Find our SumImage Average
SumImageAverage = FlattenList[0]->CalculateImageMean(SumImage);

// Are we equzlizing the set? By equalizing we mean that we'll normalize each image one to
// the other assuming that any change in background levels indicates a difference in exposure times
// (more light received) so that each image must be normalize for this difference in light
// If we don't equalize (now the default) this means we pass each image as is to the next stage
// We're repeating the first pass algorithm again because the interpolated image is likely slightly
// different and may cause a small shift
   if(Equalize)
     {
     // loop through the images
       for(int i = 0; i < ImagesInThisPass; i++)
         {
         // clear the Histogram
            memset(Table, 0, sizeof(long) * DifferenceHist.GetTableLength());
         // get the source pointer
            float* Source = SumFill->GetFilledGrid();
         // get the Difference Image Pointer
            float* DImage = FlattenList[i]->KappaBuffer->GetFilledGrid();
         // the mask buffer
            unsigned short* IKMask = IrisKappaMask;
         // now iterate through all of the points
            long Points = GridWidth * GridHeight;
            for(int Point = 0; Point < Points; Point++)
              {
              // first see if we want to use this point at all!
              // here we can omit for the iris'd locations as strange artifacts may
              // still appear here (only a difference image so is for the best)
                 if(IKMask[Point])
```

```
    {
    // problem with the interpolate grids sometimes coming back beyond saturation
    // - so need to bounds check here
    // add an offset to keep our term always positive (Histogram limitation)
        int IDiff = (int)((Source[Point] - DImage[Point]) +0.5 + 32000.0);
        IDiff = min(64001, max(0, IDiff));
        Table[IDiff]++;
        }
    }
    // now return the Mode - this is our offset term
        DifferenceHist.SetCutOff(-1,64001); // the 64001 points are excluded
        long Mode = DifferenceHist.GetMode();
    // do a second check to make sure we're getting something reasonable
    // find the points that are 20% of the Mode both above and below
    // and take the median in this range. With a mode value high enough
    // this should't effect the final value...much
        long Low,High,Mode20;
        Low = High = Mode;
        Mode20 = Table[Mode] * 20 / 100;
    // Low first
        while(Low && (Table[Low] > Mode20)) Low--;
    // High next
        while(High<64001 && (Table[High] > Mode20)) High++;
    // make it easy, just set our cut-offs
        DifferenceHist.SetCutOff(Low,High);
        long Median = DifferenceHist.GetMedian();
    // set our Difference Term
        float Difference = (float)(Median - 32000.0);
        ImageMeans[i] = SumImageAverage - Difference;
        } // Images
    } // EQUALIZING // now range check the SumImage so we don't a: divide by 0
//                                      b: divide by number < 0
//                                      c: anything over saturation -- clip it here
    float* SumData = (float*)SumImage->Data();
    Points = SumImage->Width() * SumImage->Height();
    for(int p = 0; p < Points; p++)
        SumData[p] = min( max(SumData[p], 16.0f), 4095.0f);
} // proc
//----------------------------------------------------------//
// FlattenImages() - finally get to do some work and flatten our images    //
//----------------------------------------------------------//
void FlatMaster::FlattenImages(void)
{
// line them all up on the first SumImage set
    if(TargetMean == 0.0)
        TargetMean = SumImageAverage;

int ImagesInThisPass = PassList[CurrentPass];
    for(int ImageNumber = 0; ImageNumber < ImagesInThisPass; ImageNumber++)
    {
    // remove any previouse image
        delete CorrectList[ImageNumber];
    // The correction factor
        float CorrectionFactor;
        if(Equalize)
        {
            float CorrectionFactor = TargetMean / ImageMeans[ImageNumber];
            CorrectionFactor = (SumImageAverage * CorrectionFactor);
        }
        else CorrectionFactor = SumImageAverage;
    // flatten'm
        CorrectList[ImageNumber] = FlattenList[ImageNumber]->FlattenImage(RawImageList[ImageNumber], BackgroundList[ImageNumber],
SumImage, CorrectionFactor);
    }
} // proc
//----------------------------------------------------------//
// SaveFlattenedImages() - Saves the list of flattened images      //
//----------------------------------------------------------//
```

```
void FlatMaster::SaveFlattenedImages(void)
{
// a buffer for building our string name
  static char ImageName[1024];
// How many images should we save
  int PassSize = PassList[CurrentPass];
// write'm
  for(int i = 0; i < PassSize; i++)
  {
  // build the image name path
    sprintf(ImageName,"%s" DIR_SEP "correct%s.omi", OutputImagePath, ImageIDs[CurrentStartImage + i]);
  // set the name
    CorrectList[i]->SetImageFilename(ImageName);
  // and write it out
    CorrectList[i]->WriteToFile(true);  // yes -- we do want them compressed
  }
}
//---------------------------------------------------------------//
// SaveSumImages() -- Saves the Sum Image                        //
//---------------------------------------------------------------//
void FlatMaster::SaveSumImage(void)
{
// a buffer for building our string name
  static char ImageName[1024];
// Save our SumImage too
  sprintf(ImageName,"%s" DIR_SEP "SumImage%s.omi", OutputImagePath, ImageIDs[CurrentStartImage]);
// now convert to unsigned shorts and save
  OMImage* uSumImage = SumImage->CopyAsUShort();
  uSumImage->SetImageFilename(ImageName);
// apply the mask if it exists
  if(IrisImage)
    {
    unsigned short* IData = (unsigned short*)IrisImage->Data();
    unsigned short* SData = (unsigned short*)uSumImage->Data();
    int Points = IrisImage->Width() * IrisImage->Height();
    for(int i = 0; i < Points; i++)
       SData[i] &= IData[i];
    }
// only save it with the given name
  uSumImage->WriteToFile(true);
// now if this is the midle image, save it as brightsmooth.omi as well
  if(CurrentPass == NumberOfPasses/2)
    {
    sprintf(ImageName, "%s" DIR_SEP "brightsmooth.omi",OutputImagePath);
    uSumImage->SetImageFilename(ImageName);
    uSumImage->WriteToFile(true);
    }
  delete uSumImage;
}
//---------------------------------------------------------------//
// NextImageSet() -- Updates our pass settings                   //
//---------------------------------------------------------------//
void FlatMaster::NextImageSet(void)
{
// update our Pass settings
  int PassSize = PassList[CurrentPass];
  CurrentStartImage += PassSize;
  CurrentPass++;
}
```

EXAMPLE 3

Code for the Overlap Program of the System and Method Disclosed

The command line used to run the program for sub-images S1 and S2, and CCF region shown in FIGS. 3A-C and discussed below is:

overlap raw1-2212017.omi raw1-2212016.omi -13 810 where (-13, 810) is the initial overlap estimate, meaning (0,0) in S1 is at (-13, 810) in S2. The output is:

raw1-2212017.omi raw1-2212016.omi -35 774 0
-35.22 774.42 0.700 0.361 which indicates that the true offset is (-35, 774) and overlap is good (with zero status). The sub-pixel alignment from fitting the two-dimensional parabola is (-35.22, 774.42) with a correlation peak of 0.700 and a total variance of 0.361. Note that (-13, 810) minus (-35, 774) equals (22, 36) which is the (sub-)offset of the correlation peak from the center of the cross-hairs.

```c
#include <assert.h>
#include <math.h>
#include <sys/types.h>
#include <sys/stat.h>
#include <stdio.h>
#include <memlintok.h>
#include <limits.h>
#include <float.h>
#if USE_FLOAT
#include <srfftw.h>
#else /* USE_FLOAT */
#include <drfftw.h>
#endif /* USE_FLOAT */
#include <netinet/in.h>
#include "fit_2d_parabola.h"

#include <string.h>
#include <X11/Xlib.h>
#include <X11/Xutil.h>
include <X11/cursorfont.h> define CHARNULL (char *) NULL
define DISPLAYNULL (Display *) NULL
define VISUALNULL (XVisualInfo *) NULL define BUTTONEVENT ((XButtonEvent *) &event)
define CONFIGEVENT ((XConfigureEvent *) &event)
#define MOTIONEVENT ((XMotionEvent *) &event)

#define BUTTONEVENTS (ButtonPressMask | ButtonReleaseMask)
#define MOTIONEVENTS (ButtonMotionMask)
#define OTHEREVENTS  (ExposureMask | StructureNotifyMask | \
                      PointerMotionHintMask | LeaveWindowMask)
#define EVENTS       (BUTTONEVENTS | MOTIONEVENTS | OTHEREVENTS)

#define FALSE_COLOR 0
#define DISPLAY_BUFFERS 1
```

```
#define PRIME_TRIM 1
#define ZERO_FILL 0
#define PHASE_CORRELATION 1
#define LAPLACIAN 1
#define USE_WISDOM 0
#define FILL_PAD 100
#define FILL_SMOOTH 1
#define FILL_WEIGHTED 1
#define FILL_HALVES 1
define FILL_BOTH 0 define EXIT1(X, Y) { (void) fprintf(stderr, X, Y); exit(1); }
define EXIT2(X, Y, Z) { (void) fprintf(stderr, X, Y, Z); exit(1); } define   min(a, b)        ((a) > (b) ? (b) : (a))
define   max(a, b)        ((a) < (b) ? (b) : (a))

#define NC 256
#define MC (NC - 3)

#if FILL_PAD
#if FILL_SMOOTH
static void      smooth(arr, len, stride, width)
fftw_real        *arr;
unsigned int     len;
unsigned int     stride;
int              width;
{
  fftw_real       *work;
  int             i;
  int             j;
#if FILL_WEIGHTED
  int             k = width;
#endif /* FILL_WEIGHTED */
  fftw_real       sum = 0.0;
  int             cnt = 0;

MALLOC_OR_ELSE_LINTOK(work, len, fftw_real);
  for (i = j = 0; i < (int) len; ++i, j += stride)
    work[i] = arr[j];
  for (i = 0; i < width; ++i) {
#if FILL_WEIGHTED
    for (j = i; j < width; ++j) {
#endif /* FILL_WEIGHTED */
        sum += work[i];
        cnt++;
#if FILL_WEIGHTED
    }
#endif /* FILL_WEIGHTED */
  }
  for (i = j = 0; i < (int) len; ++i, j += stride) {
#if FILL_WEIGHTED
    for (width = 0; width <= k && i + width < (int) len; ++width) {
#else /* FILL_WEIGHTED */
    if (i + width < (int) len) {
#endif /* FILL_WEIGHTED */
        sum += work[i + width];
        cnt++;
    }
    arr[j] = sum / cnt;
#if FILL_WEIGHTED
    for (width = 0; width <= k && i - width >= 0; ++width) {
#else /* FILL_WEIGHTED */
    if (i - width >= 0) {
#endif /* FILL_WEIGHTED */
        sum -= work[i - width];
        cnt--;
    }
  }
  FREE_LINTOK(work);
```

```c
}
#endif /* FILL_SMOOTH */
endif /* FILL_PAD */ static char     *ominum(name)
char            *name;
{
  char          *ptr;
  int           n;

if ((ptr = strchr(name, '/')) != NULL)
    name = ++ptr;
  if (((n = strlen(name) - 4) < 0) || (strcmp(name + n, ".omi") != 0))
    return (name);
  name[n] = '\0';
  for (ptr = NULL; --n >= 0; ptr = name + n) {
    if (((name[n] < '0') || (name[n] > '9')) && (name[n] != '-'))
            break;
  }
  return (ptr ? ptr : name);
} int             main(argc, argv)
int             argc;
char            **argv;
{
  char          *file;
  struct stat    buf;
  char           pipe[80];
  long           id;
  long           type;
  long           sizey;
  long           sizex;
  long           nbyte;
  long           sizey0;
  long           sizex0;
  long           sizey1;
  long           sizex1;
  unsigned short        *amap;
  unsigned short        *bmap;
  FILE          *input;
  int           offx;
  int           offy;
  int           xmin0;
  int           xmax0;
  int           ymin0;
  int           ymax0;
  int           xmin1;
  int           xmax1;
  int           ymin1;
  int           ymax1;
  fftw_real     *a;
  fftw_real     *b;
  fftw_real      suma;
  fftw_real      sumb;
  int            cnta;
  int            cntb;
  fftw_real      norm;
  rfftwnd_plan   p;
  fftw_complex   *A;
  fftw_complex   *B;
  fftw_complex   *C;
  rfftwnd_plan   q;
  fftw_real     *c;
  fftw_real      lo;
  fftw_real      hi;
#define NPTS 29
  fftw_real      X[NPTS];
  fftw_real      Y[NPTS];
  fftw_real      Z[NPTS];
```

```
fftw_real       V[NPTS];
fftw_real       A0;
fftw_real       A1;
fftw_real       X0;
fftw_real       Y0;
fftw_real       Z0;
fftw_real       ZV;
unsigned int    width;
unsigned int    height;
unsigned int    fill_width;
unsigned int    fill_height;
int             dummy;
int             i;
int             j;
int             k;
int             l;
int             m;
unsigned char   *map;
Display         *dpy;
XVisualInfo     template;
int             nitems;
XVisualInfo     *visinfo;
Visual          *visual;
unsigned int    depth;
Screen          *screen;
Colormap        colormap;
XSetWindowAttributes xswa;
unsigned long   mask;
Window          window;
XGCValues       values;
GC              gc;
Cursor          cursor;
Atom            wm_protocols;
Atom            wm_delete_window;
XSizeHints      sizehints;
XClassHint      classhints;
XEvent          event;
XImage          *image;
unsigned long   *map32;
Pixmap          pixmap;
int             min;
int             max;
int             done = 0;
int             update = 0;
int             x;
int             y;
int             dx = 0;
int             dy = 0;
int             cmap = 1;
int             mx = 0;
int             my = 0;
int             off_x = 0;
int             off_y = 0;
#if DISPLAY_BUFFERS
fftw_real       *d;
int             e = 0;
#else /* DISPLAY_BUFFERS */
int             bx;
int             by;
#endif /* DISPLAY_BUFFERS */
Window          root;
Window          child;
int             root_x;
int             root_y;
int             win_x;
int             win_y;
unsigned int    keys_buttons;
float           scale;
#if !FALSE_COLOR
unsigned short  value;
```

```
#endif /* !FALSE_COLOR */
    XColor        cells[NC];

/*
 * Check argument list
 */
    if((argc != 5) && ((argc != 6) || (*argv[5] != '=')))
        EXIT1("usage: %s <file1> <file2> <offx> <offy>\n", argv[0]);

/*
 * Read in map file
 */
    file = argv[1];
    if(stat(file, &buf) < 0)
        EXIT2("%s: unable to stat %s\n", argv[0], file);
    (void) sprintf(pipe, "zcat -f %s", file);
    if((input = popen(pipe, "r")) == (FILE *) NULL)
        EXIT2("%s: error opening %s\n", argv[0], pipe);
    if(fread(&id, sizeof(id), 1, input) != 1)
        EXIT1("%s: error reading id\n", argv[0]);
    if(fread(&type, sizeof(type), 1, input) != 1)
        EXIT1("%s: error reading type\n", argv[0]);
    type = ntohl(type);
    if(fread(&sizey, sizeof(sizey), 1, input) != 1)
        EXIT1("%s: error reading sizey\n", argv[0]);
    sizey0 = ntohl(sizey);
    if(fread(&sizex, sizeof(sizex), 1, input) != 1)
        EXIT1("%s: error reading sizex\n", argv[0]);
    sizex0 = ntohl(sizex);
    if(fread(&nbyte, sizeof(nbyte), 1, input) != 1)
        EXIT1("%s: error reading nbyte\n", argv[0]);
    nbyte = ntohl(nbyte);
    (void) fprintf(stderr, "id=%.4s, type=%ld, "
                           "sizey=%ld, sizex=%ld, nbyte=%ld\n",
                           (char *) &id, type, sizey0, sizex0, nbyte);
    assert(nbyte == sizeof(*amap));
    buf.st_size = sizey0 * sizex0;
    MALLOC_OR_ELSE_LINTOK(amap, buf.st_size, unsigned short);
    if(fread(amap, nbyte, buf.st_size, input) != (size_t) buf.st_size)
        EXIT2("%s: error reading %s\n", argv[0], pipe);
    if(pclose(input))
        EXIT2("%s: error closing %s\n", argv[0], pipe);

file = argv[2];
    if(stat(file, &buf) < 0)
        EXIT2("%s: unable to stat %s\n", argv[0], file);
    (void) sprintf(pipe, "zcat -f %s", file);
    if((input = popen(pipe, "r")) == (FILE *) NULL)
        EXIT2("%s: error opening %s\n", argv[0], pipe);
    if(fread(&dummy, sizeof(dummy), 1, input) != 1)
        EXIT1("%s: error reading id\n", argv[0]);
    assert(dummy == id);
    if(fread(&dummy, sizeof(dummy), 1, input) != 1)
        EXIT1("%s: error reading type\n", argv[0]);
    dummy = ntohl(dummy);
    assert(dummy == type);
    if(fread(&dummy, sizeof(dummy), 1, input) != 1)
        EXIT1("%s: error reading sizey\n", argv[0]);
    sizey1 = ntohl(dummy);
    if(fread(&dummy, sizeof(dummy), 1, input) != 1)
        EXIT1("%s: error reading sizex\n", argv[0]);
    sizex1 = ntohl(dummy);
    if(fread(&dummy, sizeof(dummy), 1, input) != 1)
        EXIT1("%s: error reading nbyte\n", argv[0]);
    dummy = ntohl(dummy);
    assert(dummy == nbyte);
    assert(nbyte == sizeof(*bmap));
    buf.st_size = sizey1 * sizex1;
    MALLOC_OR_ELSE_LINTOK(bmap, buf.st_size, unsigned short);
    if(fread(bmap, nbyte, buf.st_size, input) != (size_t) buf.st_size)
```

```c
    EXIT2("%s: error reading %s\n", argv[0], pipe);
if (pclose(input))
    EXIT2("%s: error closing %s\n", argv[0], pipe);

sizey = max(sizey0, sizey1);
sizex = max(sizex0, sizex1);
offx = atoi(argv[3]);
offy = atoi(argv[4]);
xmin0 = max(0, -offx);
xmax0 = min(sizex0, sizex1 - offx) - 1;
ymin0 = max(0, -offy);
ymax0 = min(sizey0, sizey1 - offy) - 1;
xmin1 = max(0, offx);
xmax1 = min(sizex1, sizex0 + offx) - 1;
ymin1 = max(0, offy);
ymax1 = min(sizey1, sizey0 + offy) - 1;
(void) fprintf(stderr, "(%d,%d) to (%d,%d)\n",
                    xmin0, ymin0, xmax0, ymax0);
(void) fprintf(stderr, "(%d,%d) to (%d,%d)\n",
                    xmin1, ymin1, xmax1, ymax1);

assert(xmax0 - xmin0 == xmax1 - xmin1);
assert(ymax0 - ymin0 == ymax1 - ymin1);
if ((xmax0 <= xmin0) || (ymax0 <= ymin0)) {
    FREE_LINTOK(amap);
    FREE_LINTOK(bmap);
    if (xmax0 <= xmin0)
            (void) fprintf(stderr, "width=%d!\n", xmax0 - xmin0);
    if (ymax0 <= ymin0)
            (void) fprintf(stderr, "height=%d!\n", ymax0 - ymin0);
    (void) printf("%s %s %5d %5d 3\n", argv[1], argv[2], offx, offy);
    return (3);
} width = xmax0 - xmin0;
if PRIME_TRIM
m = 0;
for (i = 1; i <= (int) width; i *= 2)
    for (j = i; j <= (int) width; j *= 3)
            for (k = j; k <= (int) width; k *= 5)
                for (l = k; l <= (int) width; l *= 7)
                    if (l > m)
                        m = l;
if ((int) width != m) {
    xmax0 = (xmin0 += (width - m) / 2) + m;
    xmax1 = (xmin1 += (width - m) / 2) + m;
    (void) fprintf(stderr, "width trimmed from %d to %d\n", width, m);
    width = m;
}
endif /* PRIME_TRIM */
height = ymax0 - ymin0;
#if PRIME_TRIM
m = 0;
for (i = 1; i <= (int) height; i *= 2)
    for (j = i; j <= (int) height; j *= 3)
            for (k = j; k <= (int) height; k *= 5)
                for (l = k; l <= (int) height; l *= 7)
                    if (l > m)
                        m = l;
if ((int) height != m) {
    ymax0 = (ymin0 += (height - m) / 2) + m;
    ymax1 = (ymin1 += (height - m) / 2) + m;
    (void) fprintf(stderr, "height trimmed from %d to %d\n",
                    height, m);
    height = m;
}
endif /* PRIME_TRIM */ if ZERO_FILL
    fill_height = height * 2;
```

```c
    fill_width = width * 2;
#else /* ZERO_FILL */
    fill_height = (((int) height * 5 > sizey) ? (int) height :
                   ((int) height * 10 > sizey) ? sizey / 5 :
                   (int) height * 2);
#if FILL_PAD
    if ((fill_height < height + FILL_PAD) && (height > FILL_PAD))
        fill_height = height + FILL_PAD;
#endif /* FILL_PAD */
#if PRIME_TRIM
    m = INT_MAX;
    for (i = 1; i < m; i *= 2)
      for (j = i; j < m; j *= 3)
          for (k = j; k < m; k *= 5)
              for (l = k; l < m; l *= 7)
                  if (l >= (int) fill_height)
                      m = l;
    if ((int) fill_height != m) {
        (void) fprintf(stderr, "fill_height padded from %d to %d\n",
                       fill_height, m);
        fill_height = m;
    }
endif /* PRIME_TRIM */
    fill_width = (((int) width * 5 > sizex) ? (int) width :
                  ((int) width * 10 > sizex) ? sizex / 5 :
                  (int) width * 2);
#if FILL_PAD
    if ((fill_width < width + FILL_PAD) && (width > FILL_PAD))
        fill_width = width + FILL_PAD;
#endif /* FILL_PAD */
#if PRIME_TRIM
    m = INT_MAX;
    for (i = 1; i < m; i *= 2)
      for (j = i; j < m; j *= 3)
          for (k = j; k < m; k *= 5)
              for (l = k; l < m; l *= 7)
                  if (l >= (int) fill_width)
                      m = l;
    if ((int) fill_width != m) {
        (void) fprintf(stderr, "fill_width padded from %d to %d\n",
                       fill_width, m);
        fill_width = m;
    }
endif /* PRIME_TRIM */
#endif /* ZERO_FILL */
    CALLOC_OR_ELSE_LINTOK(a, fill_height * fill_width, fftw_real);
    CALLOC_OR_ELSE_LINTOK(b, fill_height * fill_width, fftw_real);
    suma = 0.0;
    sumb = 0.0;
    cnta = height * width;
    cntb = height * width;
    k = ymin0 * sizex0 + xmin0;
    l = ymin1 * sizex1 + xmin1;
    m = 0;
    for (j = 0; j < (int) height; ++j) {
        for (i = 0; i < (int) width; ++i, ++m, ++l, ++k) {
            suma += a[m] = ntohs(amap[k]);
            sumb += b[m] = ntohs(bmap[l]);
        }
        k += sizex0 - width;
        l += sizex1 - width;
        m += fill_width - width;
    }
    FREE_LINTOK(amap);
    FREE_LINTOK(bmap);
    suma /= cnta;
    sumb /= cntb;

m = 0;
    for (j = 0; j < (int) height; ++j) {
```

```
            for (i = 0; i < (int) width; ++i, ++m) {
                    a[m] = a[m] > suma ? log(a[m] / suma) : a[m] / suma - 1.0;
                    b[m] = b[m] > sumb ? log(b[m] / sumb) : b[m] / sumb - 1.0;
            }
#if FILL_PAD
      lo = a[m - width];
      hi = a[m - 1];
      for (i = width; i < (int) fill_width; ++i, ++m)
#if FILL_HALVES
              if (i < (int) (width + fill_width) / 2)
                   a[m] = (hi * (width + fill_width - 1 - i - i) /
                              (fill_width - 1 - width));
              else
                   a[m] = (lo * (i + i + 1 - fill_width - width) /
                              (fill_width - 1 - width));
#else /* FILL_HALVES */
              a[m] = (hi * (fill_width - 1 - i) +
                      lo * (i - width)) / (fill_width - 1 - width);
#endif /* FILL_HALVES */
#if FILL_BOTH
      m -= fill_width - width;
      lo = b[m - width];
      hi = b[m - 1];
      for (i = width; i < (int) fill_width; ++i, ++m)
#if FILL_HALVES
              if (i < (int) (width + fill_width) / 2)
                   b[m] = (hi * (width + fill_width - 1 - i - i) /
                              (fill_width - 1 - width));
              else
                   b[m] = (lo * (i + i + 1 - fill_width - width) /
                              (fill_width - 1 - width));
#else /* FILL_HALVES */
              b[m] = (hi * (fill_width - 1 - i) +
                      lo * (i - width)) / (fill_width - 1 - width);
#endif /* FILL_HALVES */
#endif /* FILL_BOTH */
#else /* FILL_PAD */
      m += fill_width - width;
#endif /* FILL_PAD */
    }
#if FILL_PAD
    for (i = 0; i < (int) width; ++i, ++m) {
      lo = b[m - height * fill_width];
      hi = b[m - fill_width];
      for (j = height; j < (int) fill_height; ++j, m += fill_width)
#if FILL_HALVES
              if (j < (int) (height + fill_height) / 2)
                 b[m] = (hi * (height + fill_height - 1 - j - j) /
                              (fill_height - 1 - height));
              else
                 b[m] = (lo * (j + j + 1 - fill_height - height) /
                              (fill_height - 1 - height));
#else /* FILL_HALVES */
              b[m] = (hi * (fill_height - 1 - j) +
                      lo * (j - height)) / (fill_height - 1 - height);
#endif /* FILL_HALVES */
#if FILL_BOTH
      m -= (fill_height - height) * fill_width;
      lo = a[m - height * fill_width];
      hi = a[m - fill_width];
      for (j = height; j < (int) fill_height; ++j, m += fill_width)
#if FILL_HALVES
              if (j < (int) (height + fill_height) / 2)
                 a[m] = (hi * (height + fill_height - 1 - j - j) /
                              (fill_height - 1 - height));
              else
                 a[m] = (lo * (j + j + 1 - fill_height - height) /
                              (fill_height - 1 - height));
#else /* FILL_HALVES */
              a[m] = (hi * (fill_height - 1 - j) +
```

```
                           lo * (j - height)) / (fill_height - 1 - height);
#endif /* FILL_HALVES */
#endif /* FILL_BOTH */
    m = (fill_height - height) * fill_width;
  }
#if FILL_SMOOTH
  for(i = width; i < (int) fill_width; ++i) {
    if (i > (int) (fill_width - 1 + width) / 2)
          j = fill_width - i;
    else
          j = i + 1 - width;
//  j = height * j / (fill_width - width + 1);
    smooth(a + i, height, fill_width, j);
#if FILL_BOTH
    smooth(b + i, height, fill_width, j);
#endif /* FILL_BOTH */
  }
  for(j = height; j < (int) fill_height; ++j) {
    if (j > (int) (fill_height - 1 + height) / 2)
          i = fill_height - j;
    else
          i = j + 1 - height;
//  i = width * i / (fill_height - height + 1);
    smooth(b + j * fill_width, width, 1, i);
#if FILL_BOTH
    smooth(a + j * fill_width, width, 1, i);
#endif /* FILL_BOTH */
  }
#endif /* FILL_SMOOTH */
endif /* FILL_PAD */
  sizey = fill_height;
  sizex = fill_width;

#if USE_WISDOM
  if ((input = fopen("fft.wisdom", "r")) != NULL) {
    (void) fftw_import_wisdom_from_file(input);
    (void) fclose(input);
  }
  p = rfftw2d_create_plan(sizey, sizex, FFTW_REAL_TO_COMPLEX,
                          FFTW_MEASURE | FFTW_USE_WISDOM);
#else /* USE_WISDOM */
  p = rfftw2d_create_plan(sizey, sizex, FFTW_REAL_TO_COMPLEX,
                          FFTW_ESTIMATE);
#endif /* USE_WISDOM */
  MALLOC_OR_ELSE_LINTOK(A, sizey * (sizex / 2 + 1), fftw_complex);
  rfftwnd_one_real_to_complex(p, a, A);
#if !DISPLAY_BUFFERS
  FREE_LINTOK(a);
#endif /* !DISPLAY_BUFFERS */
  MALLOC_OR_ELSE_LINTOK(B, sizey * (sizex / 2 + 1), fftw_complex);
  rfftwnd_one_real_to_complex(p, b, B);
#if !DISPLAY_BUFFERS
  FREE_LINTOK(b);
#endif /* !DISPLAY_BUFFERS */
  rfftwnd_destroy_plan(p);

MALLOC_OR_ELSE_LINTOK(C, sizey * (sizex / 2 + 1), fftw_complex);
  norm = 1.0 / (sizey * sizex);
#if PHASE_CORRELATION
#if LAPLACIAN
#define Q sqrt(20.0 * NPTS)
#define Q2 (20.0 * NPTS)
  norm *= Q2 / 2.0 / M_PI;
#endif /* LAPLACIAN */
#endif /* PHASE_CORRELATION */
  m = 0;
  for (j = 0; j < sizey; ++j) {
#if PHASE_CORRELATION
#if LAPLACIAN
    sumb = (fftw_real) ((j > sizey / 2) ? sizey - j : j) / sizey;
```

```c
        sumb *= sumb;
#endif /* LAPLACIAN */
#endif /* PHASE_CORRELATION */
    for (i = 0; i < sizex / 2 + 1; ++i, ++m) {
        fftw_real     scale;

#if PHASE_CORRELATION
        if ((scale = sqrt(A[m].re * A[m].re + A[m].im * A[m].im) *
                     sqrt(B[m].re * B[m].re + B[m].im * B[m].im)) != 0)
            scale = norm / scale;
#if LAPLACIAN
        suma = (fftw_real) i / sizex;
        suma *= suma;
        scale *= exp(-sqrt(Q2 * (suma + sumb)));
#endif /* LAPLACIAN */
#else /* PHASE_CORRELATION */
        scale = norm;
#endif /* PHASE_CORRELATION */
        C[m].re = (A[m].re * B[m].re + A[m].im * B[m].im) * scale;
        C[m].im = (A[m].im * B[m].re - A[m].re * B[m].im) * scale;
    }
}
FREE_LINTOK(A);
FREE_LINTOK(B);
#if USE_WISDOM
    q = rfftw2d_create_plan(sizey, sizex, FFTW_COMPLEX_TO_REAL,
                            FFTW_MEASURE | FFTW_USE_WISDOM);
#else /* USE_WISDOM */
    q = rfftw2d_create_plan(sizey, sizex, FFTW_COMPLEX_TO_REAL,
                            FFTW_ESTIMATE);
#endif /* USE_WISDOM */
    MALLOC_OR_ELSE_LINTOK(c, sizey * sizex, fftw_real);
    rfftwnd_one_complex_to_real(q, C, c);
    FREE_LINTOK(C);
    rfftwnd_destroy_plan(q);
#if USE_WISDOM
    if ((input = fopen("fft.wisdom", "w")) != NULL) {
        (void) fftw_export_wisdom_to_file(input);
        (void) fclose(input);
    }
endif /* USE_WISDOM */ buf.st_size = sizey * sizex;
if USE_FLOAT
    lo = FLT_MAX;
    hi = -FLT_MAX;
    for (i = 0; i < NPTS; ++i)
        V[i] = -FLT_MAX;
#else /* USE_FLOAT */
    lo = DBL_MAX;
    hi = -DBL_MAX;
    for (i = 0; i < NPTS; ++i)
        V[i] = -DBL_MAX;
#endif /* USE_FLOAT */
    m = height * width / 2;
    for (i = 0; i < buf.st_size; ++i) {
        if ((j = i / sizex) > sizey / 2)
            j -= sizey;
        if ((k = i % sizex) > sizex / 2)
            k -= sizex;
        if (((j < 0 ? -j : j) * width +
             (k < 0 ? -k : k) * height) > (unsigned) m)
            continue;
        if (lo > c[i])
            lo = c[i];
        if (hi < c[i])
            hi = c[i];
        X0 = k;
        Y0 = j;
        Z0 = c[i];
```

```
    suma = X0 / (sizex / 2);
    sumb = Y0 / (sizey / 2);
    norm = Z0 * (1.0 - suma * suma) * (1.0 - sumb * sumb);
    for (l = NPTS - 1; l >= 0; --l)
            if (norm < V[l])
                break;
    while(++l < NPTS) {
            fftw_real      temp;

temp = X[l];
            X[l] = X0;
            X0 = temp;
            temp = Y[l];
            Y[l] = Y0;
            Y0 = temp;
            temp = Z[l];
            Z[l] = Z0;
            Z0 = temp;
            temp = V[l];
            V[l] = norm;
            norm = temp;
    }
}
suma = 0.0;
sumb = 0.0;
norm = 0.0;
Z0 = *Z;
if (Z0 > 0.03) {
  for (m = 0; m < NPTS; ++m) {
    if (Z[m] < 0.5 * Z0)
            break;
    suma += X[m] * Z[m];
    sumb += Y[m] * Z[m];
    norm += Z[m];
  }
  suma /= norm;
  sumb /= norm;
}
for (i = 0; i < NPTS; ++i) {
  if (Z[i] < 0.5 * Z0) {
            V[i] = 0.0;
            continue;
  }
  norm = ((X[i] - suma) * (X[i] - suma) +
            (Y[i] - sumb) * (Y[i] - sumb));
  if (norm < NPTS * M_2_PI * Z[i] / Z0)
            V[i] = 1.0;
  else
            V[i] = 0.0;
}
m = fit_2d_parabola(NPTS, Z, V, X, Y, &A0, &A1, &X0, &Y0, &Z0, &ZV);
if ((m < 0) || (Z0 < 0.1)) {
  A0 = *Z;
  A1 = -A0 * M_PI_2 / Q;
  X0 = suma;
  Y0 = sumb;
  Z0 = *Z;
}
ZV = 0.0;
j = 0;
for (i = 0; i < NPTS; ++i) {
  if (Z[i] < 0.5 * Z0) {
            V[i] = -V[i];
            continue;
  }
  norm = (X[i] - X0) * (X[i] - X0) + (Y[i] - Y0) * (Y[i] - Y0);
  if ((norm > NPTS * M_2_PI) && (Z[i] < 0.85 * Z0))
            continue;
  norm = A0 + A1 * norm - Z[i];
  ZV += norm * norm;
```

```
        j++;
    }
    ZV = sqrt(ZV / (j - 1));
    if ((m >= 0) && (Z0 >= 0.1) && (Z0 < ZV * (Q / 3.0))) {
        A0 = *Z;
        A1 = -A0 * M_PI_2 / Q;
        X0 = suma;
        Y0 = sumb;
        Z0 = *Z;
    }
    (void) fprintf(stderr, "x0=%g, y0=%g, z0=%g, zv=%g, zv/z0=%g\n",
                    X0, Y0, Z0, ZV, ZV / Z0);
    for (i = NPTS - 1; i >= 0; --i) {
        if (Z[i] < 0.95 * Z0)
            continue;
        if ((X[i] == rint(X0)) && (Y[i] == rint(Y0)))
            break;
    }
    if (Z0 < 0.2)
        (void) fprintf(stderr, "**** Z0 = %g\n", Z0);
    if (ZV > 0.2 * (1.5 / Q))
        (void) fprintf(stderr, "**** ZV = %g\n", ZV);
    if (i < 0)
        (void) fputs("**** WHAT!? ****\n", stderr);
    else if (i != 0)
        (void) fprintf(stderr, "**** peak at (%g,%g) not (%g,%g)\n",
                    X[i], Y[i], *X, *Y);
    if ((i < 0) || (Z0 < 0.1) || (Z0 < ZV * (Q / 3.0)))
        m = 1;
    else if ((Z0 < 0.2) || (Z0 < ZV * (Q / 1.5)))
        m = 2;
    else
        m = 0;
    (void) printf("%s %s %5.0f %5.0f %d %8.2f %8.2f %.3f %.3f\n",
                    argv[1], argv[2], offx - rint(X0), offy - rint(Y0),
                    m, offx - X0, offy - Y0, Z0, ZV * (Q / 1.5) / Z0);
    (void) fputs("**** PHOOEY ****\n", stderr);
    for (i = 0; i < NPTS; ++i) {
        norm = A0 + A1 * ((X[i] - X0) * (X[i] - X0) +
                    (Y[i] - Y0) * (Y[i] - Y0));
        (void) fprintf(stderr, "v=%3g, x=%3g, y=%3g, z=%.6f ",
                    V[i], X[i], Y[i], Z[i]);
        (void) fprintf(stderr, "p=%.6f d=%6.3f\n",
                    norm, 100.0 * (Z[i] - norm));
    }
    norm = (10.0 - 0.1) / (hi - lo);
    (void) fprintf(stderr, "lo=%g, hi=%g, norm=%g\n", lo, hi, norm);
    MALLOC_OR_ELSE_LINTOK(map, buf.st_size, unsigned char);
    for (i = 0; i < buf.st_size; ++i) {
        j = (i / sizex + sizey / 2) % sizey;
        k = (i % sizex + sizex / 2) % sizex;
        l = ((j > sizey / 2 ? sizey - j : j) * width +
                    (k > sizex / 2 ? sizex - k : k) * height);
        l = (l - height * width / 2 + height + width) / (height + width);
        if (((j == 0) && (k > 20) && (k < sizex - 20)) ||
                    ((k == 0) && (j > 20) && (j < sizey - 20)))
            map[i] = NC - 2;
        else if (l == 1)
            map[i] = NC - 1;
        else {
            l = j * sizex + k;
            l = ((MC / M_LN10 / 2.0) *
                    (log((c[l] - lo) * norm + 0.1) + M_LN10));
            map[i] = (l < 0) ? 0 : (l > MC) ? MC : (unsigned char) l;
        }
    }
}

/*
 * Open connection to X-Server
 */
```

```c
if ((dpy = XOpenDisplay(CHARNULL)) == DISPLAYNULL)
    EXIT1("%s: unable to connect to X-Windows server\n", argv[0]);

/*
 * Get a pseudo-color visual
 */
template.class = PseudoColor;
visinfo = XGetVisualInfo(dpy, (long) VisualClassMask,
                         &template, &nitems);
if (visinfo == VISUALNULL)
    EXIT1("%s: unable to get pseudo-color visual\n", argv[0]);
visual = visinfo->visual;
depth = visinfo->depth;

/*
 * Get our own colormap
 */
screen = DefaultScreenOfDisplay(dpy);
colormap = XCreateColormap(dpy, RootWindowOfScreen(screen),
                           visual, AllocAll);

/*
 * Calculate the sizehints
 */
width = sizex > 640 ? 640 : sizex;
height = sizey > 512 ? 512 : sizey;
sizehints.flags = PSize | PPosition;
if (argc == 6) {
    i = XParseGeometry(argv[5], &dx, &dy, &width, &height);
    if (i & (WidthValue | HeightValue)) {
        sizehints.flags &= ~PSize;
        sizehints.flags |= USSize;
    }
    if (width > (unsigned) sizex)
        width = sizex;
    else if (width < (unsigned) sizex / 4)
        width = sizex / 4;
    width = (width + 0xf) & ~0xf;
    if (height > (unsigned) sizey)
        height = sizey;
    else if (height < (unsigned) sizey / 4)
        height = sizey / 4;
    height = (height + 0xf) & ~0xf;
    if (i & (XValue | YValue)) {
        sizehints.flags &= ~PPosition;
        sizehints.flags |= USPosition;
    }
    if (i & XNegative)
        dx += WidthOfScreen(screen) - width - 12;
    if (i & YNegative)
        dy += HeightOfScreen(screen) - height - 35;
}
else {
    width = (width + 0xf) & ~0xf;
    height = (height + 0xf) & ~0xf;
}

/*
 * Create a window on the screen
 */
xswa.border_pixel = MC;
xswa.background_pixel = 0;
xswa.colormap = colormap;
mask = CWColormap | CWBackPixel | CWBorderPixel;
window = XCreateWindow(dpy, RootWindowOfScreen(screen), dx, dy,
                       width, height, 3, (int) depth, InputOutput,
                       visual, mask, &xswa);

/*
 * Create our own graphics context
```

```
 */
  values.foreground = MC;
  values.background = 0;
  mask = GCForeground | GCBackground;
  gc = XCreateGC(dpy, window, mask, &values);

/*
 * Define our own cursor
 */
  cursor = XCreateFontCursor(dpy, XC_crosshair);
  XDefineCursor(dpy, window, cursor);

/*
 * Setup for ICCCM delete window
 */
  wm_protocols = XInternAtom(dpy, "WM_PROTOCOLS", False);
  wm_delete_window = XInternAtom(dpy, "WM_DELETE_WINDOW", False);
  (void) XSetWMProtocols(dpy, window, &wm_delete_window, 1);

/*
 * Set hints and properties
 */
  sizehints.x = dx;
  sizehints.y = dy;
  sizehints.width = width;
  sizehints.height = height;
  sizehints.min_width = (sizex / 4 + 0xf) & ~0xf;
  if (sizehints.min_width > 640)
     sizehints.min_width = 640;
  sizehints.min_height = (sizey / 4 + 0xf) & ~0xf;
  if (sizehints.min_height > 512)
     sizehints.min_height = 512;
  sizehints.max_width = ((unsigned) sizex + 0xf) & ~0xf;
  width = DisplayWidth(dpy, DefaultScreen(dpy)) - 16;
  if (sizehints.max_width > (int) width)
     sizehints.max_width = width;
  sizehints.max_height = ((unsigned) sizey + 0xf) & ~0xf;
  height = DisplayHeight(dpy, DefaultScreen(dpy)) - 32;
  if (sizehints.max_height > (int) height)
     sizehints.max_height = height;
  sizehints.width_inc = 16;
  sizehints.height_inc = 16;
  sizehints.flags = (PSize | PPosition |
                     PMinSize | PMaxSize | PResizeInc);
  (void) sprintf(pipe, "%s * %s", ominum(argv[1]), ominum(argv[2]));
  XSetStandardProperties(dpy, window, pipe, pipe,
                         None, argv, argc, &sizehints);
  classhints.res_class = "view";
  classhints.res_name = "view";
  XSetClassHint(dpy, window, &classhints);

/*
 * Wait for window to be mapped
 */
  XSelectInput(dpy, window, EVENTS);
  XMapWindow(dpy, window);
  XWindowEvent(dpy, window, ExposureMask, &event);
  (void) XGetGeometry(dpy, window, &root, &dummy, &dummy,
                      &width, &height, (unsigned *) &dummy, &depth);

/*
 * Create an image
 */
  image = XCreateImage(dpy, visual, depth, ZPixmap, 0,
                       (char *) map, sizex, sizey, 8, 0);
  if (image->bytes_per_line == 4 * sizex) {
    MALLOC_OR_ELSE_LINTOK(map32, buf.st_size, unsigned long);
    for (i = 0; i < buf.st_size; ++i)
         map32[i] = map[i];
    image->data = (char *) map32;
```

```
  }
  else if (image->bytes_per_line != sizex)
    EXIT2("%s: I can't deal with %d bytes per line!\n",
          argv[0], image->bytes_per_line);

/*
 * Create a large pixmap
 */
  pixmap = XCreatePixmap(dpy, window, sizex, sizey, depth);
  XPutImage(dpy, pixmap, gc, image, 0, 0, 0, 0, sizex, sizey);

/*
 * Loop forever
 */
  x = (sizex - width) / 2;
  y = (sizey - height) / 2;
  x += (int) rint(X0);
  y += (int) rint(Y0);
  min = 0;
  max = height;
  while (!done) {
    XNextEvent(dpy, &event);
    switch (event.type) {
    case ClientMessage:
            if (event.xclient.message_type == wm_protocols &&
                (Atom) event.xclient.data.l[0] == wm_delete_window)
              done = 1;
            else
              XBell(dpy, 0);
            break;
    case Expose:
            update = 1;
            break;
    case ConfigureNotify:

/*
 * Save new window size
 */
            if (CONFIGEVENT->width > sizex)
              CONFIGEVENT->width = sizex;
            min = min * CONFIGEVENT->width / (int) width;
            width = CONFIGEVENT->width;
            if (CONFIGEVENT->height > sizey)
              CONFIGEVENT->height = sizey;
            max = max * CONFIGEVENT->height / (int) height;
            height = CONFIGEVENT->height;
            update = 1;
            cmap = 1;
            break;
    case ButtonPress:
    case ButtonRelease:
            switch (BUTTONEVENT->button) {
            case Button1:
              if (event.type == ButtonRelease) {

/*
 * Make any final movement
 */
                x = BUTTONEVENT->x - dx;
                if (x < 0)
                  x = 0;
                else if (x > sizex - (int) width)
                  x = sizex - width;
                y = BUTTONEVENT->y - dy;
                if (y < 0)
                  y = 0;
                else if (y > sizey - (int) height)
                  y = sizey - height;
                update = 1;
              }
```

```
/*
 * Save location where button pressed
 */
    dx = BUTTONEVENT->x;
    dy = BUTTONEVENT->y;
    break;
case Button2:
    if (event.type == ButtonRelease) {

/*
         * Make any final movement
         */
        min += BUTTONEVENT->x - mx;
        max += BUTTONEVENT->y - my;
        cmap = 1;
    }

/*
     * Save location where button pressed
     */
    mx = BUTTONEVENT->x;
    my = BUTTONEVENT->y;
    break;
case Button3:
    if (event.type == ButtonPress) {
#if DISPLAY_BUFFERS
        e = (e + 1) % 3;
        d = (e ? e == 1 ? a : b : c);
        lo = DBL_MAX;
        hi = -DBL_MAX;
        for (i = 0; i < buf.st_size; ++i) {
            if (lo > d[i])
                lo = d[i];
            if (hi < d[i])
                hi = d[i];
        }
        norm = (10.0 - 0.1) / (hi - lo);
        (void) fprintf(stderr, "lo=%g, hi=%g, norm=%g\n",
                        lo, hi, norm);
        for (i = 0; i < buf.st_size; ++i) {
            if (e == 0) {
                j = (i / sizex + sizey / 2) % sizey;
                k = (i % sizex + sizex / 2) % sizex;
                if (((j == 0) && (k > 20) && (k < sizex - 20)) ||
                    ((k == 0) && (j > 20) && (j < sizey - 20))) {
                    map[i] = NC - 2;
                    continue;
                }
                l = j * sizex + k;
            }
            else
                l = i;
            l = ((MC / M_LN10 / 2.0) *
                (log((d[l] - lo) * norm + 0.1) + M_LN10));
            map[i] = ((l < 0) ? 0 :
                        (l > MC) ? MC : (unsigned char) l);
        }
        XPutImage(dpy, pixmap, gc, image,
                    0, 0, 0, 0, sizex, sizey);
        update = 1;
        min = 0;
        max = height;
        cmap = 1;
#else /* DISPLAY_BUFFERS */
        bx = off_x + BUTTONEVENT->x;
        by = off_y + BUTTONEVENT->y;
        j = (by + sizey / 2) % sizey;
        k = (bx + sizex / 2) % sizex;
        l = j * sizex + k;
```

```
            (void) fprintf(stderr, "x = %ld, y = %ld, p = %g (%d)\n",
                        bx - sizex + sizex / 2,
                        by - sizey + sizey / 2,
                        bx < sizex ? by < sizey ?
                        c[1] : 0.0 : 0.0,
                        bx < sizex ? by < sizey ?
                        map[by * sizex + bx] : 0 : 0);
            XDrawPoint(dpy, window, gc,
                        BUTTONEVENT->x, BUTTONEVENT->y);
#endif /* DISPLAY_BUFFERS */
            }
            break;
        }
        break;
    case MotionNotify:
        if (MOTIONEVENT->state & Button1Mask) {

/*
             * Only do this for button 1
             */
            while (XCheckMaskEvent(dpy, Button1MotionMask, &event))
                continue;
            (void) XQueryPointer(dpy, window, &root, &child,
                        &root_x, &root_y,
                        &win_x, &win_y, &keys_buttons);
            if (keys_buttons & Button1Mask) {

/*
                 * Only if button is still pressed
                 */
                x -= win_x - dx;
                dx = win_x;
                y -= win_y - dy;
                dy = win_y;
                update = 1;
            }
        }
        if (MOTIONEVENT->state & Button2Mask) {

/*
             * Only do this for button 2
             */
            while (XCheckMaskEvent(dpy, Button2MotionMask, &event))
                continue;
            (void) XQueryPointer(dpy, window, &root, &child,
                        &root_x, &root_y,
                        &win_x, &win_y, &keys_buttons);
            if (keys_buttons & Button2Mask) {

/*
                 * Only if button is still pressed
                 */
                min += win_x - mx;
                mx = win_x;
                max += win_y - my;
                my = win_y;
                cmap = 1;
            }
        }
        break;
    case LeaveNotify:
        XUninstallColormap(dpy, colormap);
        break;
    }
    if (update) {
        if ((off_x = x) < 0)
            off_x = 0;
        else if (off_x > sizex - (int) width)
            off_x = sizex - width;
        if ((off_y = y) < 0)
```

```
                off_y = 0;
            else if (off_y > sizey - (int) height)
                off_y = sizey - height;
            XCopyArea(dpy, pixmap, window, gc,
                      off_x, off_y, width, height, 0, 0);
            update = 0;
        }
        if (cmap) {
#define LN100 (2 * M_LN10)
            (void) fprintf(stderr, "min = %.6f, max = %.6f \r",
                           0.1 * expm1(min * LN100 / width) / norm + lo,
                           0.1 * expm1(max * LN100 / height) / norm + lo);
            scale = 65535.0 * height / (MC * (max * width - min * height));
            for (i = 0; i <= MC; ++i) {
                if (i * (int) width <= MC * min) {
                    cells[i].red = cells[i].green = 0x0000;
#if FALSE_COLOR
                    cells[i].blue = 0x0000;
#else /* FALSE_COLOR */
                    cells[i].blue = 0x7fff;
#endif /* FALSE_COLOR */
                }
                else if (i * (int) height >= MC * max) {
                    cells[i].red = 0xffff;
#if FALSE_COLOR
                    cells[i].green = cells[i].blue = 0xffff;
#else /* FALSE_COLOR */
                    cells[i].green = cells[i].blue = 0x0000;
#endif /* FALSE_COLOR */
                }
                else {
#if FALSE_COLOR
                    j = 6 * scale * (i * width - MC * min);
                    switch (j / 65536) {
                    case 0:
                        cells[i].red = 1 * 0xffff - j;
                        cells[i].green = 0x0000;
                        cells[i].blue = 0xffff;
                        break;
                    case 1:
                        cells[i].red = 0x0000;
                        cells[i].green = j - 1 * 0xffff;
                        cells[i].blue = 0xffff;
                        break;
                    case 2:
                        cells[i].red = 0x0000;
                        cells[i].green = 0xffff;
                        cells[i].blue = 3 * 0xffff - j;
                        break;
                    case 3:
                        cells[i].red = j - 3 * 0xffff;
                        cells[i].green = 0xffff;
                        cells[i].blue = 0x0000;
                        break;
                    case 4:
                        cells[i].red = 0xffff;
                        cells[i].green = 5 * 0xffff - j;
                        cells[i].blue = 0x0000;
                        break;
                    case 5:
                        cells[i].red = 0xffff;
                        cells[i].green = 0x0000;
                        cells[i].blue = j - 4 * 0xffff;
                        break;
                    }
#else /* FALSE_COLOR */
                    value = scale * (i * width - MC * min);
                    cells[i].red = cells[i].green = cells[i].blue = value;
#endif /* FALSE_COLOR */
                }
```

```
            cells[i].pixel = i;
            cells[i].flags = DoRed | DoGreen | DoBlue;
        }
        cells[NC - 1].red = 0x0000;
        cells[NC - 1].green = 0x7fff;
        cells[NC - 1].blue = 0x0000;
        cells[NC - 1].pixel = NC - 1;
        cells[NC - 1].flags = DoRed | DoGreen | DoBlue;
        cells[NC - 2].red = 0x0000;
        cells[NC - 2].green = 0x0000;
        cells[NC - 2].blue = 0x0000;
        cells[NC - 2].pixel = NC - 2;
        cells[NC - 2].flags = DoRed | DoGreen | DoBlue;
        XStoreColors(dpy, colormap, cells, NC);
        cmap = 0;
    }
}
XCloseDisplay(dpy);
#if DISPLAY_BUFFERS
    FREE_LINTOK(a);
    FREE_LINTOK(b);
#endif /* DISPLAY_BUFFERS */
    FREE_LINTOK(c);
    return (m);
}
```

It should be understood that the description, specific examples and data, while indicating exemplary embodiments, are given by way of illustration and are not intended to limit the present invention(s) in this disclosure. All references cited herein for any reason, are specifically and entirely incorporated by reference. Various changes and modifications which will become apparent to a skilled artisan from this disclosure are considered part of the invention(s) of this disclosure.

In the appended claims, the articles such as "a," "an," "the" and the like can mean one or more than one, and are not intended in any way to limit the terms that follow to their singular form, unless expressly noted otherwise. Unless otherwise indicated, any claim which contains the word "or" to indicate alternatives shall be satisfied if one, more than one, or all of the alternatives denoted by the word "or" are present in an embodiment which otherwise meets the limitations of such claim.

We claim:

1. A computer-implemented method for processing a series of overlapping optical images, comprising:
    flattening a first optical image and a second optical image;
    aligning overlapping regions of said first optical image and said second optical image, wherein said aligning comprises:
        determining an initial offset estimate of alignment between said first optical image and said second optical image based on initial scale and angle values;
        calculating a pair of sub-offsets to determine an error of said initial offset estimate comprising identifying a location of the best correlation (peak) within data patterns of a first sub-image and a second sub-image, wherein said first sub-image and said second sub-image are regions of said first optical image and said second optical image, respectively, that overlap as determined by said initial offset estimate, said identifying comprising the ordered steps of:
            1) copying said first sub-image into a first work area;
            2) copying said second sub-image into a second work area;
            3) calculating an average intensity and normalizing pixel intensity values within each of said first sub-image and said second sub-image;
            4) adding a pad-area along a first edge of each of said first sub-image and said second sub-image;
            5) adding a fill-area along a second edge of each of said first sub-image and said second sub-image, wherein said second edge is adjacent to said first edge on each of said first sub-image and said second sub-image;
            6) filling each of said pad-areas and said fill-areas with predetermined values in a predetermined manner; and
            7) calculating a Cross Correlation Function for each image of said first sub-image and said second sub-image, comprising the steps of:
                a) transforming said image data from intensity to frequency space to produce transform coefficients;
                b) multiplying, in a point-wise fashion, said transform coefficients to produce point-wise multiplication results;
                c) frequency whitening said point-wise multiplication results to produce frequency whitening results;
                d) applying a Laplacian filter to said frequency whitening results to produce Laplacian filter results; and
                e) transforming said Laplacian filter results from frequency to intensity space to produce said Cross-Correlation Function, wherein said Cross Correlation Function provides said pair of sub-offsets; and
    producing adjusted element and line distances for more precise alignment of said overlapping regions of said first optical image and said second optical image by adding said sub-offsets to said initial offset estimate;
    overwriting and merging said first optical image and said second optical image to create a merged image, wherein said order of said steps of said flattening and said overlapping are order-independent when both of said steps occur prior to said-overwriting and merging; and
    displaying said merged image on a user interface.

2. The computer-implemented method of claim 1, wherein said first optical image and said second optical image are collected in series within a column or row that overlap one another, or are collected in series within a column or row that overlap one another within the column or row and also overlap with other images in adjacent columns or rows, said other images flanking either or both sides of said first optical image and said second optical image.

3. The computer-implemented method according to claim 2, wherein said initial offset estimate of alignment is based on the LUDL motor movement, the skew between the axes of a microscope stage and a camera detector, and scaling wherein said scaling is the difference in size between one step of said LUDL motor movement and the number of pixels a detected image moves across the camera detector.

4. The method according to claim 1, wherein said adding of said pad-areas and said fill-areas and said filling of each of said pad-areas and said fill-areas comprises the ordered steps of:
    1) appending a pad-area and a fill-area respectively along two adjacent sides of each of said first sub-image and said second sub-image such that said pad-area extends as a border along the edge of one side of the first sub-image and abuts and is adjacent to said fill-area bordering along the entire, adjacent, second side of said first-sub-image, and the positions of said adjacent pad-area and fill-area on said first sub image are switched with respect to each other on the second sub image, wherein said fill-area on said second sub-image borders along the entire side adjacent to said pad-area for said first sub-image;
    2) filling said pad-area vertically with smoothly interpolated values that range between the top and bottom edges of said first sub-image;
    3) filling said fill-area of said first sub-image with zeros;
    for said second sub-image, filling said pad-area horizontally with smoothly interpolated values that range between those along the right and left edges of said second sub-image; and
    4) filling said fill-area of said second sub-image with zeros.

5. The method of claim 4, wherein each of said pad-area and fill-area represents a border wherein the width of said border is equal to no more than twice the mechanical error associated with optical image collection in the system.

6. The method according to claim 5, wherein said normalizing pixel intensity values comprises for each pixel:
  if an intensity value of said pixel is greater than said average intensity, a natural log-transformation of the ratio of said intensity value of said pixel to said average intensity; and
  if said intensity value of said pixel is less than said average intensity, subtracting 1.0 from said ratio of said intensity value of said pixel to said average intensity.

7. The method according to claim 6, wherein said overwriting and merging comprises:
  for each of said first optical image and said second optical image, overwriting bleached pixel intensity data within a region of overlap exposed to a light source more than once with the stronger pixel intensity data from the identical region of overlap on either said flattened first optical image or said flattened second optical image exposed to said light source only once to produce a first overwritten image and a second overwritten image to replace said flattened first optical image and flattened second optical image, respectively; and
  merging of said first overwritten image and said second overwritten image to produce a single merged image for visualization in the system;
  merging said single merged image with a series of overwritten optical images in the sequential order in which said series of overwritten optical images were initially collected to produce a single virtual superimage.

8. The method according to claim 7, wherein a linear blending of intensity values is achieved in a transition region between said overwritten regions and non-overwritten regions, wherein said intensity values at the edge of said overwritten regions are identical to those in said non-overwritten regions and wherein said transition region is 20 pixels in width.

9. The method according to claim 8, wherein each image within said series of overwritten optical images is retained as a separate file on a processing computer, despite said merging for visualization of contents of said microchannel or other area.

* * * * *